United States Patent
Ishii

(10) Patent No.: US 11,979,881 B2
(45) Date of Patent: May 7, 2024

(54) UPDATE APPARATUS AND METHOD FOR ON-DEMAND SYSTEM INFORMATION IN WIRELESS COMMUNICATIONS

(71) Applicant: Sharp Kabushiki Kaisha, Sakai (JP)

(72) Inventor: Atsushi Ishii, Vancouver, WA (US)

(73) Assignee: SHARP KABUSHIKI KAISHA, Sakai (JP)

(*) Notice: Subject to any disclaimer, the term of this patent is extended or adjusted under 35 U.S.C. 154(b) by 94 days.

(21) Appl. No.: 16/244,908

(22) Filed: Jan. 10, 2019

(65) Prior Publication Data

US 2019/0215858 A1    Jul. 11, 2019

Related U.S. Application Data

(60) Provisional application No. 62/616,260, filed on Jan. 11, 2018.

(51) Int. Cl.
| H04W 72/23 | (2023.01) |
| H04W 8/22  | (2009.01) |
| H04W 48/12 | (2009.01) |
| H04W 48/14 | (2009.01) |
| H04W 76/25 | (2018.01) |
| H04W 76/27 | (2018.01) |

(52) U.S. Cl.
CPC ............ *H04W 72/23* (2023.01); *H04W 8/22* (2013.01); *H04W 48/12* (2013.01); *H04W 48/14* (2013.01); *H04W 76/25* (2018.02); *H04W 76/27* (2018.02)

(58) Field of Classification Search
CPC . H04W 72/1289; H04W 76/25; H04W 76/27; H04W 8/22; H04W 48/12; H04W 48/14
See application file for complete search history.

(56) References Cited

U.S. PATENT DOCUMENTS

| 2009/0181661 A1 | 7/2009 | Kitazoe et al. |
| 2010/0075625 A1 | 3/2010 | Wu |

(Continued)

OTHER PUBLICATIONS

International Search Report and Written Opinion dated Apr. 15, 2019 in PCT application PCT/US2019/013016.

(Continued)

*Primary Examiner* — Ian N Moore
*Assistant Examiner* — Brian T Le
(74) *Attorney, Agent, or Firm* — NIXON & VANDERHYE P.C.

(57) ABSTRACT

A wireless terminal comprises receiver circuitry and processor circuitry. The receiver circuitry is configured to receive, from a base station apparatus, a first type system information (SI) block including scheduling information used for configuring SI window(s), the SI window(s) being periodic broadcast occasion(s) for corresponding one or more second type system information blocks (SIBs). The processor circuitry is configured to determine the SI window(s) based on the scheduling information. The receiver circuitry is further configured to perform a reception procedure to attempt to receive at least one of the second type SIBs within the SI window(s) of a current modification period. In a case that the at least one of the second type SIBs is not received within the SI window(s), the receiver circuitry is configured to continue the reception procedure in the current modification period.

12 Claims, 42 Drawing Sheets

(56) References Cited

U.S. PATENT DOCUMENTS

| | | | |
|---|---|---|---|
| 2011/0002250 | A1 | 1/2011 | Wang et al. |
| 2011/0205982 | A1 | 8/2011 | Yoo et al. |
| 2012/0039171 | A1 | 2/2012 | Yamada et al. |
| 2013/0010619 | A1* | 1/2013 | Fong ................ H04W 72/0453 370/252 |
| 2015/0038142 | A1 | 2/2015 | Wang et al. |
| 2016/0212664 | A1 | 7/2016 | Uemura et al. |
| 2017/0064764 | A1* | 3/2017 | Ke .......................... H04W 4/06 |
| 2017/0205982 | A1 | 7/2017 | Zhang et al. |
| 2017/0251500 | A1 | 8/2017 | Agiwal et al. |
| 2018/0255529 | A1* | 9/2018 | Yu ......................... H04W 68/02 |

OTHER PUBLICATIONS

International Preliminary Report on Patentability dated Jul. 14, 2020 in PCT application PCT/US2019/013016.
R2-1712227, 3GPP TSG-RAN WG2 Meeting #100, OPPO, "Discussion on NR SI Modification", Reno, USA, Nov. 27-Dec. 1, 2017.
R2-1712420, 3GPP TSG-RAN WG2 Meeting #100, CATT, "Si Modification", Reno, USA, Nov. 27-Dec. 1, 2017.
R2-1712486, 3GPP TSG-RAN WG2 Meeting #100, Ericsson, "Change of System information in NR", Reno, USA, Nov. 27-Dec. 1, 2017.
R2-1712769, 3GPP TSG-RAN WG2 Meeting #100, vivo, "SI Change Notification", Reno, USA, Nov. 27-Dec. 1, 2017.
R2-1712800, 3GPP TSG-RAN WG2 Meeting #100, InterDigital Inc., "SI Modification Procedure in NR", Reno, USA, Nov. 27-Dec. 1, 2017.
R2-1713074, 3GPP TSG-RAN WG2 Meeting #100, MediaTek Inc., "NR SI Modificaiton", Reno, USA, Nov. 27-Dec. 1, 2017.
R2-1713286, 3GPP TSG-RAN WG2 Meeting #100, Huawei, HiSilicon, "SI Update proceedure", Reno USA, Nov. 27-Dec. 1, 2017.
R2-1713375, 3GPP TSG-RAN WG2 Meeting #100, Samsung, "System Information Update in NR", Reno, USA, Nov. 27-Dec. 1, 2017.
R2-1713557, 3GPP TSG-RAN WG2 Meeting #100, Nokia, Nokia Shanghai Bell, "System Information Modification in NR", Reno, USA, Nov. 27-Dec. 1, 2017.
R2-1713570, 3GPP TSG-RAN WG2 Meeting #100, ITRI, "Discussion on the granularity of SI change notification", Reno, USA, Nov. 27-Dec. 1, 2017.
R2-1713698, 3GPP TSG-RAN WG2 Meeting #100, LG Electronics Inc., "System information modification", Reno, USA, Nov. 27-Dec. 1, 2017.
R2-1713861, 3GPP TSG-RAN WG2 Meeting #100, ITL, "SI modification for Stored SI", Reno, USA, Nov. 27-Dec. 1, 2017.
R2-1712230, 3GPP TSG-RAN WG2 Meeting #100, OPPO, "Consideration on NR SI Scheduling", Reno, USA, Nov. 27-Dec. 1, 2017.
R2-1712487, 3GPP TSG-RAN WG2 Meeting #100, Ericsson, "System information scheduling", Reno, USA, Nov. 27-Dec. 1, 2017.
R2-1712770, 3GPP TSG-RAN WG2 Meeting #100, vivo, "Scheduling of Other SI", Reno, USA, Nov. 27-Dec. 1, 2017.
R2-1713287, 3GPP TSG-RAN WG2 Meeting #100, Huawei, HiSilicon, "Considerations on System Information scheduling", Reno, USA, Nov. 27-Dec. 1, 2017.
R2-1713373, 3GPP TSG-RAN WG2 Meeting #100, Samsung, "SI Message TX/RX in NR", Reno, USA, Nov. 27-Dec. 1, 2017.
R2-1713554, 3GPP TSG-RAN WG2 Meeting #100, Nokia, Nokia Shanghai Bell, "Indication for On-Demand SI Broadcast", Reno, USA, Nov. 27-Dec. 1, 2017.
R2-1713577, 3GPP TSG-RAN WG2 Meeting #100, ETRI, "Details of Other SI scheduling information", Reno, USA, Nov. 27-Dec. 1, 2017.
R2-1713704, 3GPP TSG-RAN WG2 Meeting #100, LG Electronics Inc., "System information scheduling", Reno, USA, Nov. 27-Dec. 1, 2017.
U.S. Appl. No. 62/616,260, filed Jan. 11, 2018, entitled "Update Apparatus and Method for On-Demand System Information in Wireless Communications".
U.S. Appl. No. 62/640,482, filed Apr. 2, 2018, entitled "Apparatus and Method for Combined Area Update and Request for On-Demand System Information in Wireless Communications".
U.S. Appl. No. 62/669,838, filed May 10, 2018, entitled "Apparatus and method for acquisition of on-demand system information".
U.S. Appl. No. 62/685,541, filed Jun. 15, 2018, entitled "Apparatus and Method For Acquisition of System Information In Wireless Communications".
U.S. Appl. No. 62/685,561, filed Jun. 15, 2018, entitled "Apparatus and Method For Acquisition of System Information In Wireless Communications".
R2-1701327, 3GPP TSG-RAN2 #97 Meeting, MediaTek Inc., "NR SI broadcast", 3GPP draft; Athens, Greece, Feb. 13-17, 2017.

* cited by examiner

UPDATE APPARATUS AND METHOD FOR ON-DEMAND SYSTEM INFORMATION IN WIRELESS COMMUNICATIONS

This application claims the priority and benefit of U.S. provisional application 62/616,260 filed Jan. 11, 2018, which is incorporated herein by reference in its entirety.

TECHNICAL FIELD

The technology relates to wireless communications, and particularly to methods, apparatus, and techniques for requesting, transmitting, updating, and using system information (SI) in wireless communications.

BACKGROUND

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

In typical cellular mobile communication systems, the base station broadcasts on the radio channels certain information which is required for mobile stations to access to the network. In Long-Term Evolution (LTE) and LTE Advanced (LTE-A), such information is called "system information" ("SI"). Each access node, such as an evolved NodeB ("eNB") or a gNB in the 5G New Radio (NR) System, broadcasts such system information to its coverage area via a Master Information Block (MIB) and several System Information Blocks (SIBs) on downlink radio resources allocated to the access node.

A wireless terminal ("UE"), after entering a coverage area of an eNB or gNB, is required to obtain all the MIB/SIBs which are necessary to access to the system. For sake of UEs under coverage, the eNB or gNB periodically broadcasts all MIB/SIBs relevant for offered services, where each type of MIB or SIBs is transmitted in a designated radio resource(s) with its own pre-determined/configurable frequency.

This all-broadcast-based periodic delivery method (e.g., collective broadcast of all SIBs, not just those necessary for system access) is efficient under a condition where many UEs are almost always flowing into the coverage area (such as a macro cell). However, this approach may result in wasting valuable radio resources in case of small cell deployment. Therefore, more efficient methods of SIB transmission are desired.

What is needed, therefore, and an example object of the technology disclosed herein, are methods, apparatus, and techniques for more efficient transmission of system information blocks (SIBs).

SUMMARY

In one of its example aspects, the technology disclosed herein concerns a wireless terminal which comprises receiver circuitry and processor circuitry. The receiver circuitry is configured to receive, from a base station apparatus, a first type system information (SI) block including scheduling information used for configuring SI window(s), the SI window(s) being periodic broadcast occasion(s) for corresponding one or more second type system information blocks (SIBs). The processor circuitry is configured to determine the SI window(s) based on the scheduling information. The receiver circuitry is further configured to perform a reception procedure to attempt to receive at least one of the second type SIBs within the SI window(s) of a current modification period. In a case that the at least one of the second type SIBs is not received within the SI window(s), the receiver circuitry is configured to continue the reception procedure in the current modification period.

In an example embodiment and mode the current modification period is one of plural modification periods configured by the base station apparatus, the plural modification periods being repeating time durations.

In an example embodiment and mode the receiver circuitry is further configured to abort the reception procedure at a next modification period.

In an example embodiment and mode the receiver circuitry is configured to continue the reception procedure in the current modification period, even if the receiver circuitry receives a notification message notifying a change in the content of the first type system information (SI) block or one or more of the second type system information blocks (SIBs).

In another of its example aspects the technology disclosed herein concerns a base station apparatus comprising processor circuitry and transmitter circuitry. The processor circuitry is configured to generate a first type system information (SI) block including scheduling information used for configuring SI window(s), the SI window(s) being periodic broadcast occasion(s) for corresponding one or more second type system information blocks (SIBs). The SI window(s) of a current modification period is/are configured to enable a wireless terminal to attempt to receive at least one of the second type SIBs during a reception procedure performed by the wireless terminal, and in a case that the at least one of the second type SIBs is not received within one or more SI window(s), the reception procedure may be continued by the wireless terminal in the current modification period. The transmitter circuitry is configured to transmit the first type system information (SI) block and the one more second type system information blocks (SIBs) to the wireless terminal.

In an example embodiment and mode, the current modification period is one of plural modification periods configured by the base station apparatus, the plural modification periods being repeating time durations.

In another of its example aspects the technology disclosed herein concerns a method in a wireless terminal. In a basic mode the method comprises receiving, from a base station apparatus, a first type system information (SI) block including scheduling information used for configuring SI window(s), the SI window(s) being periodic broadcast occasion(s) for corresponding one or more second type system information blocks (SIBs); determining the SI window(s) based on the scheduling information; and performing a reception procedure to attempt to receive at least one of the second type SIBs within the SI window(s) of a current modification period. The method further comprises, in a case that the at least one of the second type SIBs is not received within the SI window(s), continuing the reception procedure in the current modification period.

In an example embodiment and mode the current modification period is one of plural modification periods configured by the base station apparatus, the plural modification periods being repeating time durations.

In an example embodiment and mode the method further comprises aborting the reception procedure at the next modification period.

In an example embodiment and mode the method further comprises continuing the reception procedure in the current modification period, even if receiving a notification message notifying a change in the content of the first type SI block or the second type SIBs.

In yet another example embodiment and mode, the technology disclosed herein concerns a method in a base station apparatus. In a basic mode the method comprises transmitting, to a wireless terminal, a first type system information (SI) block including scheduling information used for configuring SI window(s), the SI window(s) being periodic broadcast occasion(s) for corresponding one or more second type system information blocks (SIBs); wherein the SI window(s) is determined, by the wireless terminal, based on the scheduling information. A reception procedure to attempt to receive at least one of the second type SIBs within the SI window(s) of a current modification period is performed by the wireless terminal. In a case that the at least one of the second type SIBs is not received within the SI window(s), the reception procedure is continued, by the wireless terminal, in the current modification period.

In an example embodiment and mode the current modification period is one of plural modification periods configured by the base station apparatus, the plural modification periods being repeating time durations.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 32 is a schematic view showing a sixth embodiment of a communications system comprising a radio access node and a wireless terminal, and wherein a Paging message notifying changes of membership of Minimum SI is received after an SIB request procedure requesting the same on-demand SIB(s) and the wireless terminal aborts the SIB reception procedure upon receipt of the Paging message.

DETAILED DESCRIPTION

Figure 1:
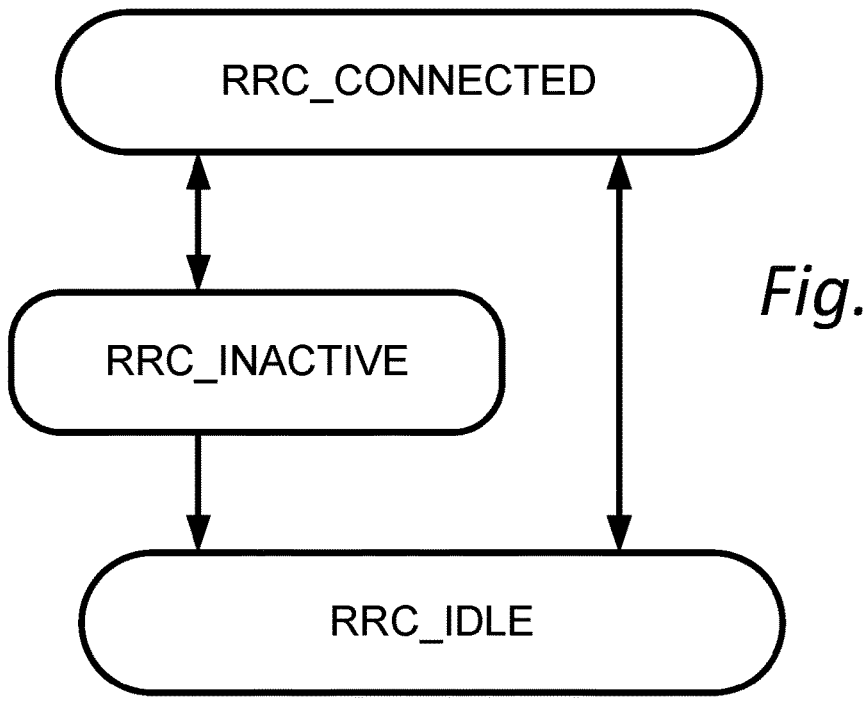
FIG. 1 is a diagrammatic view showing transition states of a Radio Resource Control RRC state machine.
Figure 40:
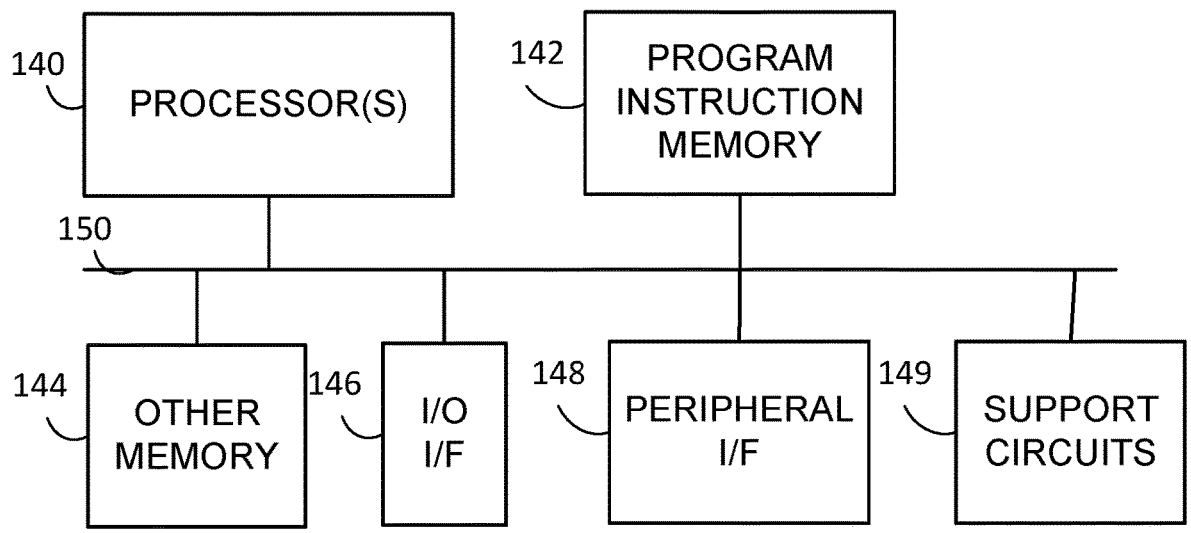
FIG. 40 is a diagrammatic view showing example electronic machinery which may comprise node electronic machinery or terminal electronic machinery.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a 5G (New Radio [NR]) gNB, or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, 12, or higher), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IM-TAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

As used herein, "system information" ("SI") may include a Master Information Block (MIB) and several System Information Blocks (SIBs) which are provided on downlink radio resources allocated to a access node. The system information may be broadcast, and some types of system information may be provided on demand, e.g., upon receipt of a request for system information from a wireless terminal.

In various aspects of the technology disclosed herein, system information is classified into plural categories or types. In an example embodiment and mode, a first type of the system information is Minimum System Information (Minimum SI), minimally containing information required for UEs initially access to the network, periodically broadcasted by each access node (e.g. eNB for LTE, gNB for 5G Radio System). In some configurations, Minimum System SI may consist of MIB and a limited number of SIBs. The Minimum SI may be also referred as "essential SI", or first type system information.

A second type of system information, e.g., "Other system information, "Other SI", or second type system information contains all the other types of information, i.e., all types of system information except the Minimum System Information. The Other SI may comprise several system information blocks (SIBs) that are not categorized as Minimum SI. The Other SI may be also referred as "non-essential SI". However, the second type system information is not to be confused with SIB Type 2, which is a particular (second) system information block (SIB) that may be included in the Minimum System Information.

In some example embodiment and modes described herein, for each of the SIBs belongings to Other SI, the access node may choose to broadcast the SIB periodically, similar to the SIBs in Minimum SI. Alternatively, the access node may choose to refrain from transmitting the SIB until receiving a request of on-demand delivery from a UE. In this case, the access node may advertise the availability of on-demand delivery using Minimum SI.

As described herein, both an access node and a wireless terminal may manage respective Radio Resource Control (RRC) state machines. The RRC state machines transition between several RRC states including RRC_IDLE, RRC_INACTIVE and RRC_CONNECTED. FIG. 1 depicts the state transition diagram of the RRC states. From the vantage point of a wireless terminal e.g., user equipment (UE), the RRC states may be briefly characterized as follows:

RRC_IDLE:
  A UE specific DRX (discontinuous reception) may be configured by upper layers;
  UE controlled mobility based on network configuration;
  The UE:
    Monitors a Paging channel;
    Performs neighboring cell measurements and cell (re-) selection;
    Acquires system information.

RRC_INACTIVE:
  A UE specific DRX may be configured by upper layers or by RRC layer;
  UE controlled mobility based on network configuration;
  The UE stores the Access Stratum (AS) context;
  The UE:
    Monitors a Paging channel;
    Performs neighboring cell measurements and cell (re-) selection;
    Performs RAN-based notification area updates when moving outside the RAN-based notification area;
    Acquires system information.

RRC_CONNECTED:
  The UE stores the AS context.
  Transfer of unicast data to/from UE.
  At lower layers, the UE may be configured with a UE specific DRX;
  Network controlled mobility, i.e. handover within NR and to/from E-UTRAN.;
  The UE:
    Monitors a Paging channel;
    Monitors control channels associated with the shared data channel to determine if data is scheduled for it;
    Provides channel quality and feedback information;
    Performs neighboring cell measurements and measurement reporting;
    Acquires system information.

The technology disclosed herein concerns, e.g., apparatus, methods, and procedures for obtaining and/or updating SIBs in/of Other SI (Other SI SIBs) in an on-demand basis, and particularly but not exclusively to the timing for initiating/stopping SIB request and/or SIB reception procedures.

Figure 2:
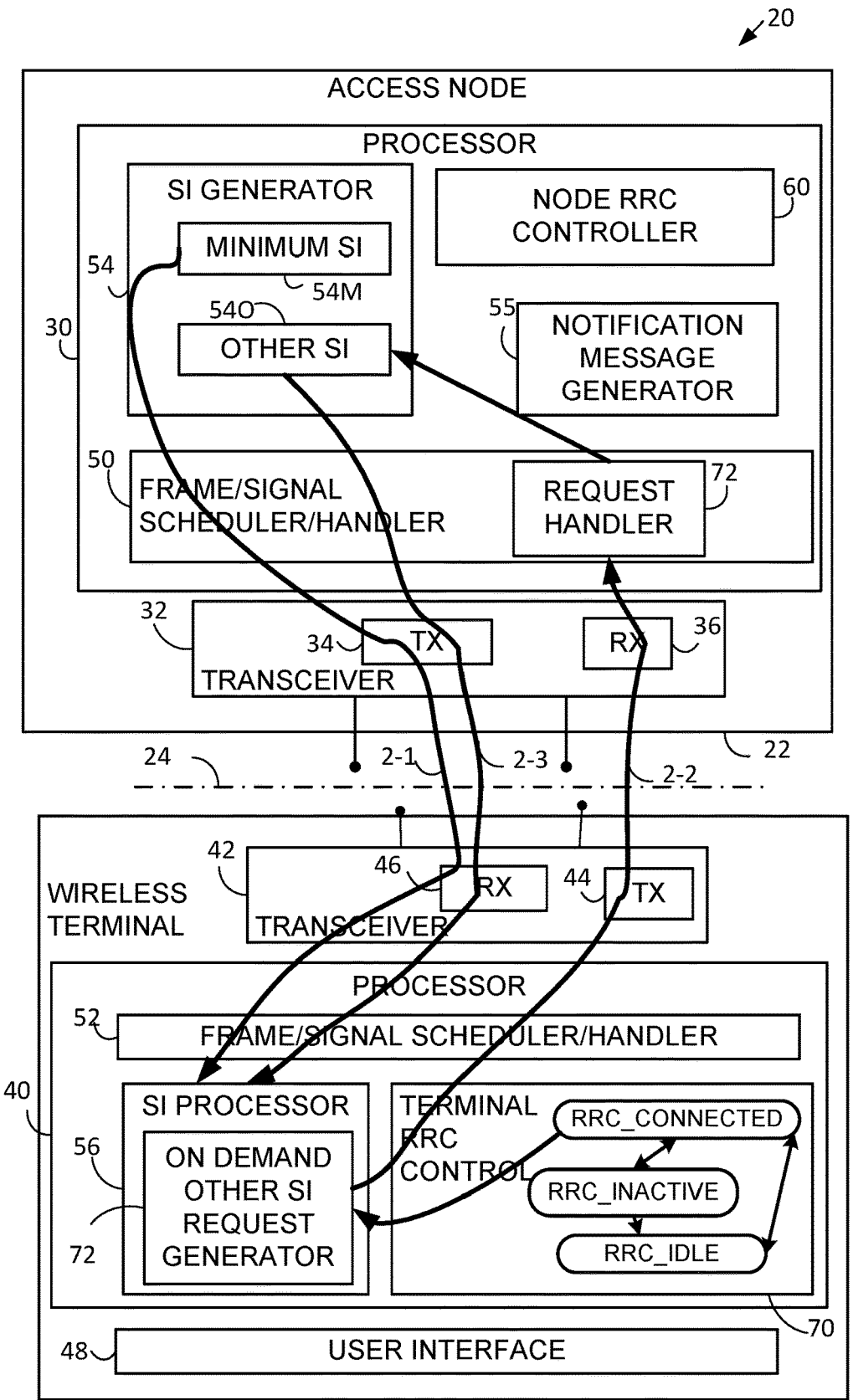
FIG. 2 is a schematic view showing an example generic communications system comprising a radio access node and a wireless terminal, wherein the wireless terminal requests, and the radio access node provides, Other system information (Other SI) when the wireless terminal is in a RRC_CONNECTED state.

FIG. 2 shows an example communications system 20 wherein radio access node 22 communicates over air or radio interface 24 (e.g., Uu interface) with wireless terminal 26. As mentioned above, the radio access node 22 may be any suitable node for communicating with the wireless terminal 26, such as a base station node, or eNodeB ("eNB") or gNB, for example. The node 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and radio interface 24, the respective transceiver circuitries 22 include antenna(s). The transmitter circuit 34 and transmitter circuit 44 may comprise, e.g., amplifier(s), modulation circuitry and other conventional transmission equipment. The receiver circuit 36 and receiver circuit 46 may comprise, e.g., e.g., amplifiers, demodulation circuitry, and other conventional receiver equipment.

In general operation node, 22 and wireless terminal 26 communicate with each other across radio interface 24 using predefined configurations of information. By way of non-limiting example, the radio access node 22 and wireless terminal 26 may communicate over radio interface 24 using "frames" of information that may be configured to include various channels. In Long Term Evolution (LTE), for example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, for example).

To cater to the transmission of information between radio access node 22 and wireless terminal 26 over radio interface 24, the node processor 30 and terminal processor 40 of FIG. 2 are shown as comprising respective information handlers. For an example implementation in which the information is communicated via frames, the information handler for radio access node 22 is shown as node frame/signal scheduler/handler 50, while the information handler for wireless terminal 26 is shown as terminal frame/signal handler 52.

The node processor 30 of radio access node 22 also includes system information (SI) generator 54. As described above, at least some of the system information generated and provided by the node radio resource controller 54 is Minimum System Information (Minimum SI), also known as first type system information, represented by Minimum SI handler 54M. Some of the system information may be Other system information (Other SI), also known as second type system information, represented by Other SI handler 54O in FIG. 2. The wireless terminal 26 uses the system information (SI) generated by radio access node 22. Some of the Minimum SI may inform the wireless terminal 26 of the availability of the Other IS. FIG. 2 illustrates a generic message 2-1 by which the node radio resource controller 54 may supply the Minimal SI to wireless terminal 26. In some example implementations, upon knowing of the availability of the Other IS, due to the message 2-1, for example, the wireless terminal 26 specifically requests the Other system information, in on-demand fashion, as described herein. The terminal processor 40 of wireless terminal 26 comprises, e.g., SI processor 56, to facilitate obtaining and use of system information.

The technology disclosed herein concerns, e.g., apparatus, methods, and procedures for obtaining and/or updating system information blocks (SIBs) in/of the Other SI (Other SI SIBs) in on-demand basis, and particularly but not exclusively to the timing for initiating/stopping SIB request and/or SIB reception procedures. Since in at least some of the example embodiments and modes the technology disclosed herein involves the Radio Resource Control (RRC) procedures, FIG. 2 shows each of node processor 30 as comprising node radio resource control (RRC) controller 60, e.g., node RRC controller 60. The node RRC controller 60 may execute an instance of the RRC state machine for each wireless terminal in which the access node 20 is in communication, with each instance keeping track of the RRC state transitions experienced by the wireless terminal associated with the respective instance.

FIG. 2 also shows the terminal processor 40 of wireless terminal 26 as comprising, in addition to terminal SI processor 56, a terminal RRC controller 70. The terminal RRC controller 70 includes or executes the RRC state machine discussed above, which transitions through the RRC states (as described above and shown in FIG. 2) for a communication involving wireless terminal 26.

FIG. 2 thus shows that the access node 22 comprises node processor 30 (e.g., node processor circuitry 30), transmitter circuit 34, and, receiver circuit 36. The transmitter circuit 34 is configured to transmit the first type system information over a radio interface, the first type system information including availability of a second type system information block (SIB). The receiver circuit 36 is configured to receive from the wireless terminal a request message to request delivery of the second type SIB which is available by on-demand basis. The transmitter circuit 34 is further configured to transmit the second type SIB to the wireless terminal.

FIG. 2 thus shows that the wireless terminal 26 communicates over radio interface 24 with access nodes, such as access node 22, of a radio access network (RAN). The wireless terminal 26 comprises receiver circuit 46, transmitter circuit 44, and terminal processor 40, e.g., terminal processor circuitry. The receiver circuit 46 is configured to receive first type system information over the radio interface. The terminal processor circuitry is configured to generate a request message to request the second type SIB available in an on-demand basis. The transmitter circuit 44 is configured to transmit the request message over the radio interface while in the connected state. The receiver circuit 46 is also configured to receive the second type SIB while in the connected state.

Figure 3:
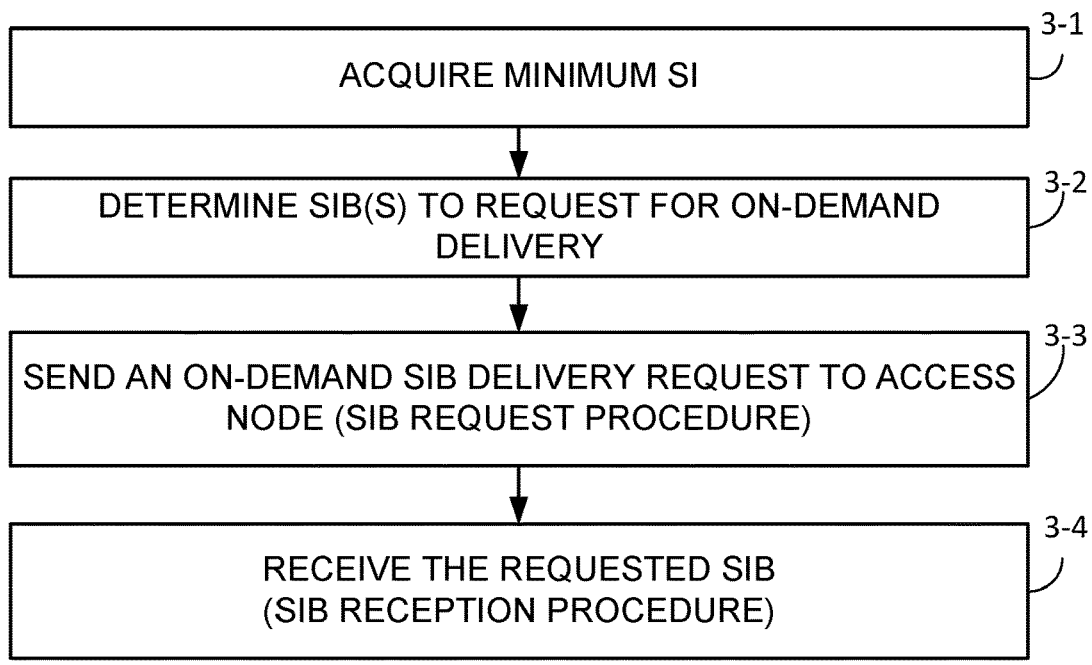
FIG. 3 is a flowchart showing example, basic example acts or steps performed by a wireless terminal of the example generic communications system of FIG. 2.

FIG. 3 shows example, representative acts or steps performed in conjunction with a generic method of operating a wireless terminal of a radio access network (RAN), such as wireless terminal 26 of FIG. 2. Act 3-1 comprises the wireless terminal receiving the Minimum SI that is broadcasted from the currently serving access node, e.g., access node 22. The Minimum SI may be broadcast in a message such as message 2-1 of FIG. 2. The Minimum SI may contain information about the Other SI, including the delivery method (periodic broadcast/on-demand), scheduling information, validity information, etc. Based on the information, the wireless terminal in act 3-2 may determine which SIB(s) to acquire by on-demand. As act 3-3, the wireless terminal may send a request message (depicted as message 2-2 of FIG. 2) to the access node, the request message indicating the SIB(s) that the wireless terminal desires to obtain. As act 3-4 the wireless terminal 26 may attempt to receive the requested SIB(s) (sent using message 2-3 of FIG. 2).

It was mentioned above that the first type system information includes availability of a second type system information block (SIB), that the request message requests delivery of a second type SIB which is available by on-demand basis, and that the second type SIB is transmitted to the wireless terminal. It should be understood that reference herein to "a second type system information block (SIB)", or "a second type SIB", means one or more pieces of Other system information (Other SI), e.g., one or more second type system information blocks (SIBs). In some example situations indeed only one second type SIB may be advertised as available and accordingly requested on-demand. But in other example situations plural second type SIBs (e.g., plural pieces of Other SI) are advertised as available and requested on-demand.

Figure 4:
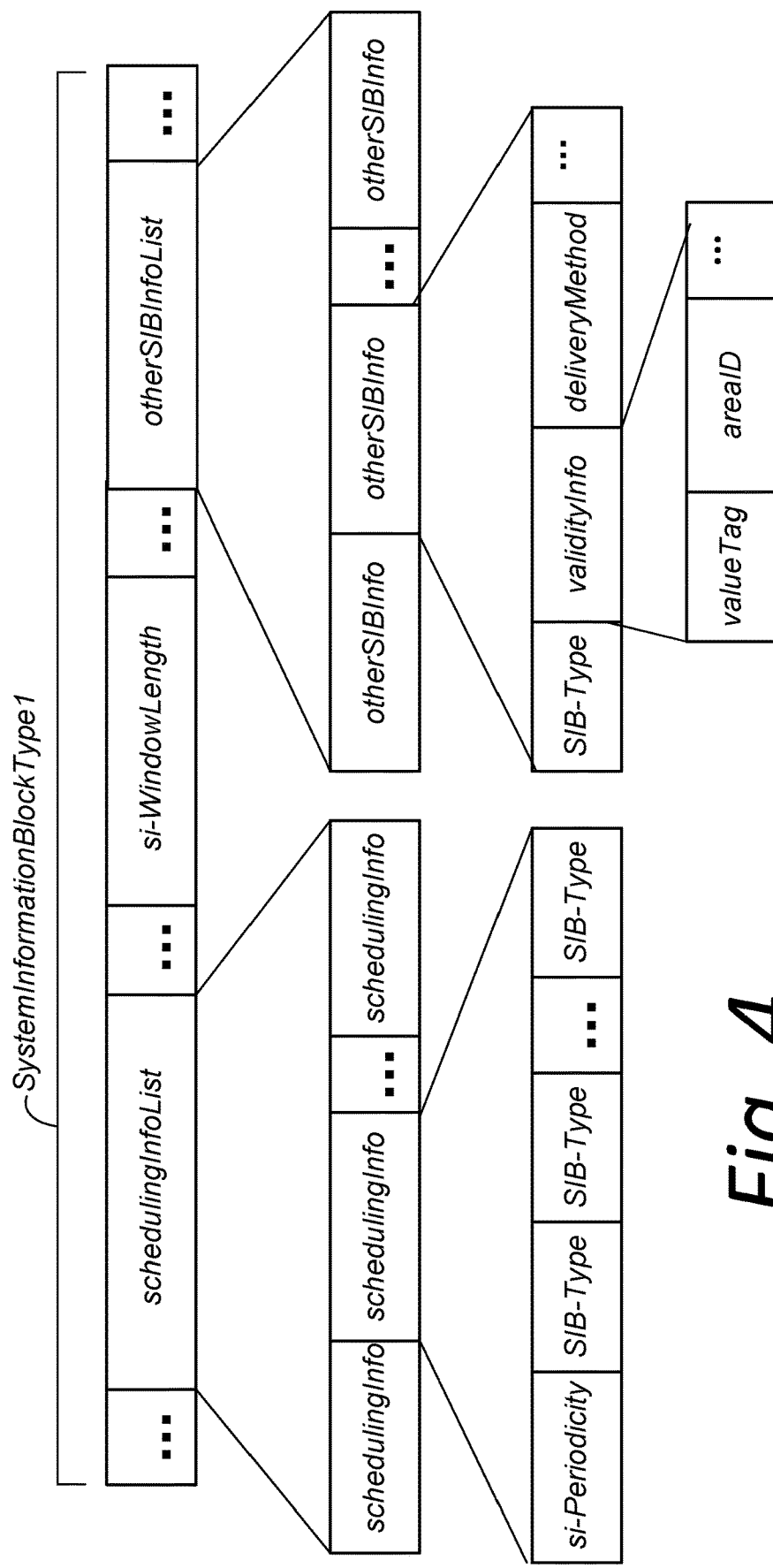
FIG. 4 is a diagrammatic view illustrating example format of a system information block (SIB) which comprises the Minimal SI and which carries availability of Other system information (Other SI).

In some configurations, the availability and delivery method information for Other SI SIBs may be included in SIB Type 1, one of the SIBs in the Minimum SI. FIG. 4 shows an example format of SIB Type 1, including schedulingInfoList, si-WindowLength, otherSIBInfoList and possibly other configuration parameters. The otherSIBInfoList is a list of otherSIBInfo, which in turn comprises SIB-Type, an identifier of a SIB, validityInfo, validity information of the SIB (a value tag [valueTag], validity area identification [areaID] and other parameters, such as validity timer, etc.) and deliveryMethod indicating if this SIB is periodically broadcasted or to be transmitted upon request (on-demand).

The schedulingInfoList comprises a list of scheduling information elements (schedulingInfo), each element comprising the periodicity and corresponding SIB types (si-Periodicity and one or more SIB-Type's). The actual broadcast opportunity (i.e. timing/resources) of a given SIB may be determined by a pre-determined or a network-configured formula as a function of at least the corresponding periodicity. At each opportunity the broadcast of the SIB may occur within the duration of the window length (si-WindowLength). Hereafter a broadcast opportunity is also referred as a SI window. More than one SIB may be possibly transmitted on a same SI window.

Figure 5:
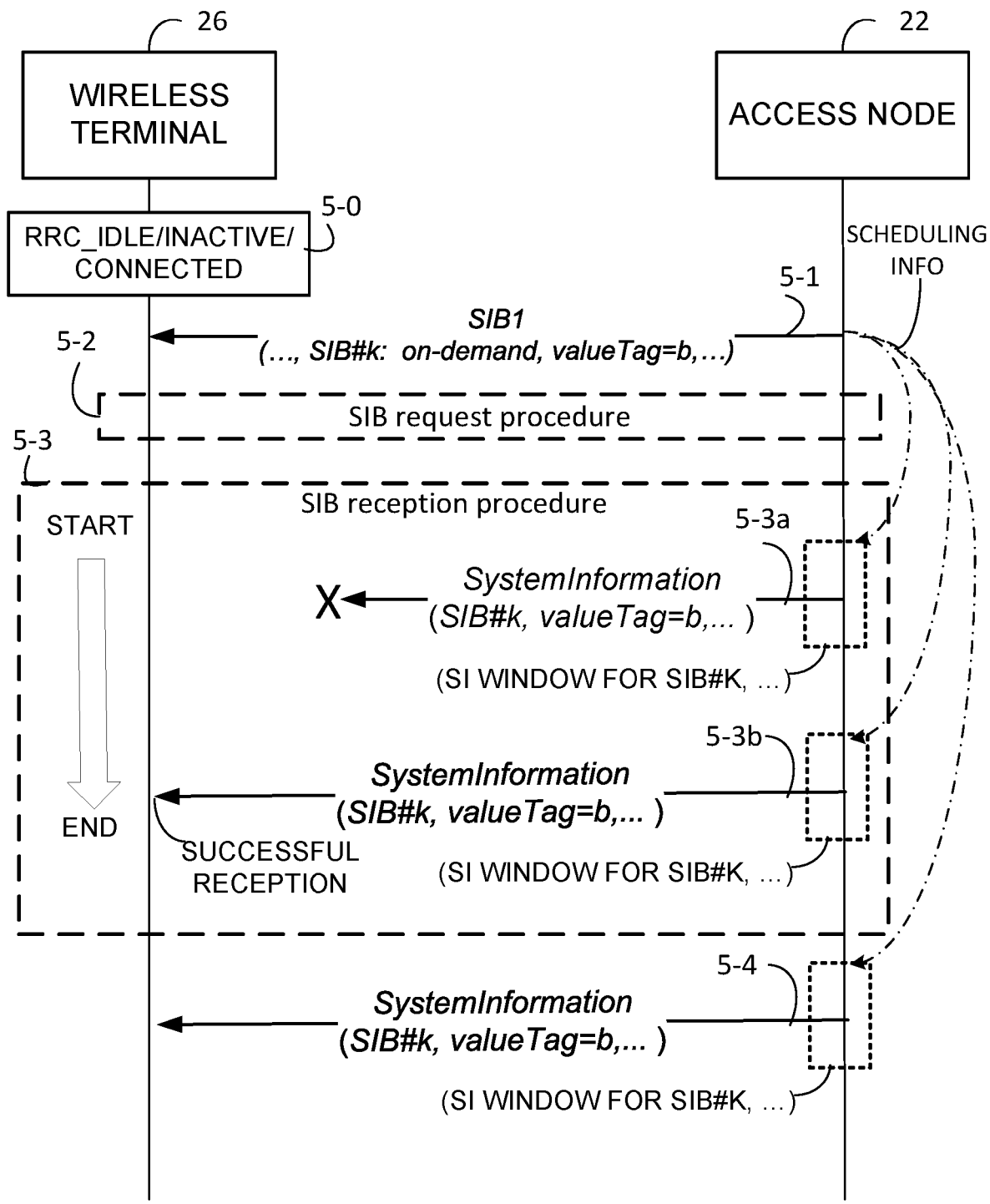
FIG. 5 is a diagrammatic view illustrating an exemplary message flow of on-demand based SIB acquisition procedure.

FIG. 5 is an exemplary message flow diagram of on-demand based SIB acquisition procedure. As shown by act 5-0, wireless terminal 26 in either RRC_IDLE, RRC_INACTIVE or RRC_CONNECTED state stores the content of SIB#k with valueTag=a, which the wireless terminal has previously received. From the currently serving access node, as act 5-1 the wireless terminal may obtain SIB1 as Minimum SI, which indicates that SIB#k with valueTag=b is available by on-demand delivery. It is assumed hereafter that whenever the wireless terminal receives SIB1, it has already received MIB beforehand. Knowing that the stored SIB#k is now obsolete (since it had valueTag=a), the wireless terminal may decide to obtain the up-to-date version of SIB#k, and may initiate the SIB request procedure represented by act 5-2 and explained herein. After the SIB request procedure has a successful resulting, the wireless terminal may start the SIB reception procedure, shown generally as act 5-3 in FIG. 5. In the SIB reception procedure the wireless terminal monitors signals from the access node in the designated SI windows (shown by dotted rectangles in FIG. 5) derived from the scheduling information (scheduleInfo) in the SIB1, and thereby attempt to receive the requested SIB#k. FIG. 5 shows by act 5-3a a first transmission of the requested SIB# (which is unsuccessful) and by act 5-3b a second transmission of the requested SIB# (which is successful). A tail of a vertical down-pointing arrow in the SIB reception procedure depiction of FIG. 5 is associated with start of the SIB reception procedure, while the head of the same vertical down-pointing arrow is associated with end of the SIB reception procedure (at successful reception of the SIB#k. FIG. 5 also shows by act 5-4 that other transmissions of the requested system information may also be made even after the wireless terminal has successfully received the sought SIB#k. Accordingly, during the SIB reception procedure, if SIB#k is not successfully received in an SI window, the wireless terminal may repeat reception of SIB#k at the next SI window.

In one configuration, the wireless terminal may use a counter, which is incremented at every SI window of a particular SIB (e.g. SIB#k). In this configuration, the SIB reception procedure may end when the requested SIB(s) are successfully received, or when the counter reaches a maximum counter value. In another configuration the wireless terminal starts a timer at the beginning of the SIB reception procedure. In this configuration, the SIB reception procedure may end when the requested SIB(s) are successfully received, or when the timer expires. The maximum counter value, or the timer value, which may be common for all SIB types or per-SIB type basis, may be pre-configured or configured by network via system information. The conditions for the wireless terminal to end the SIB reception process is referred as "termination conditions" herein.

Figure 6A:
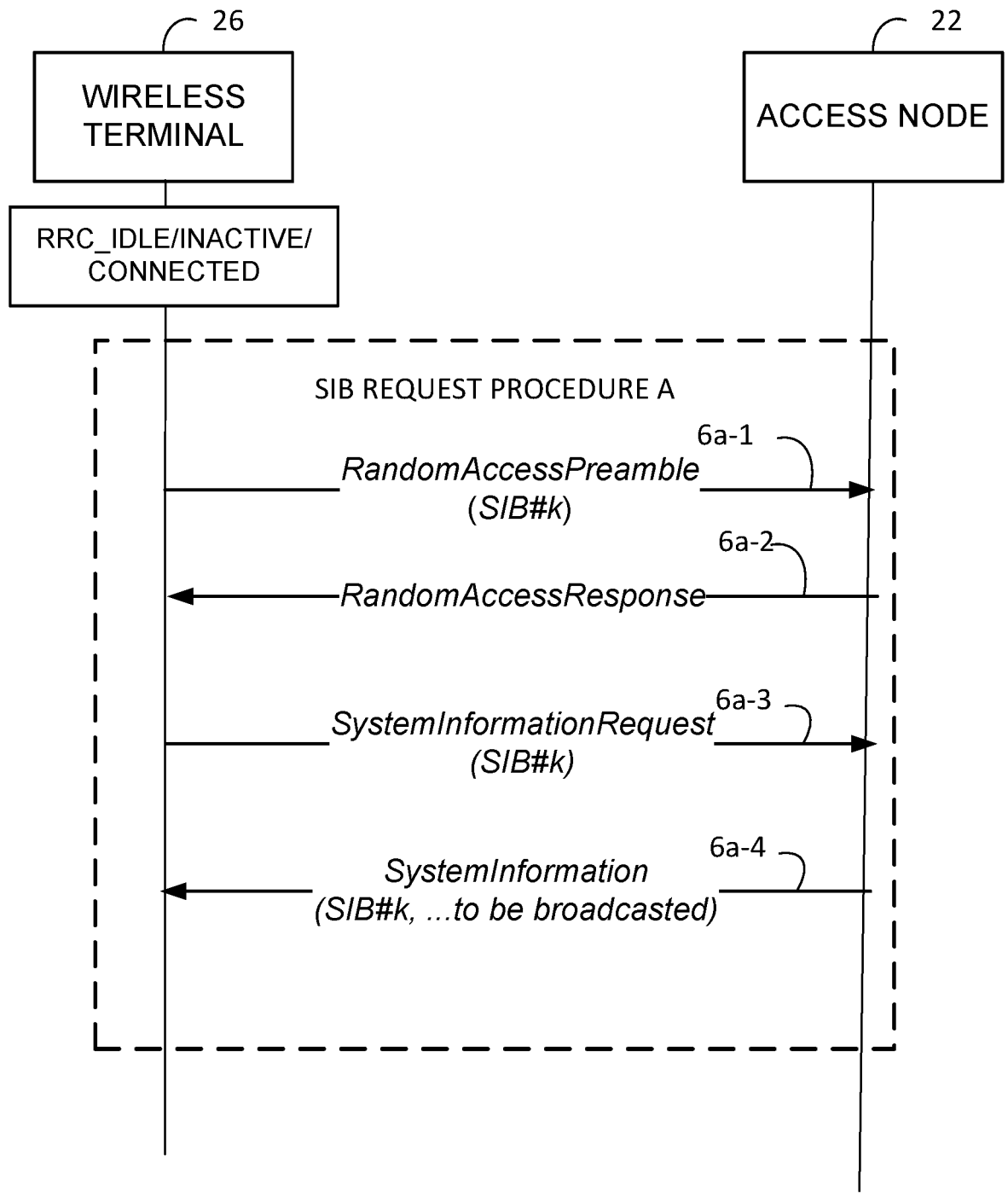
FIGS. 6A, 6B and 6C diagrammatic views illustrating three options for an SIB request procedure.
Figure 6B:
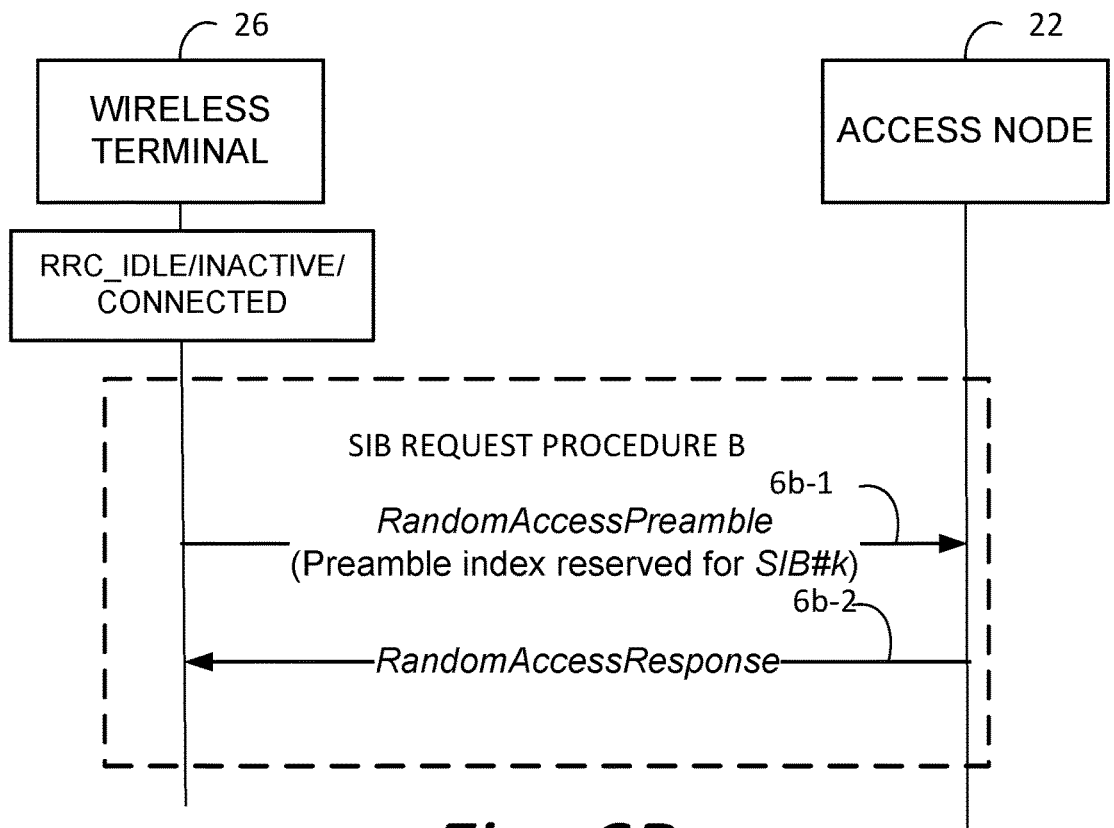
Figure 6C:
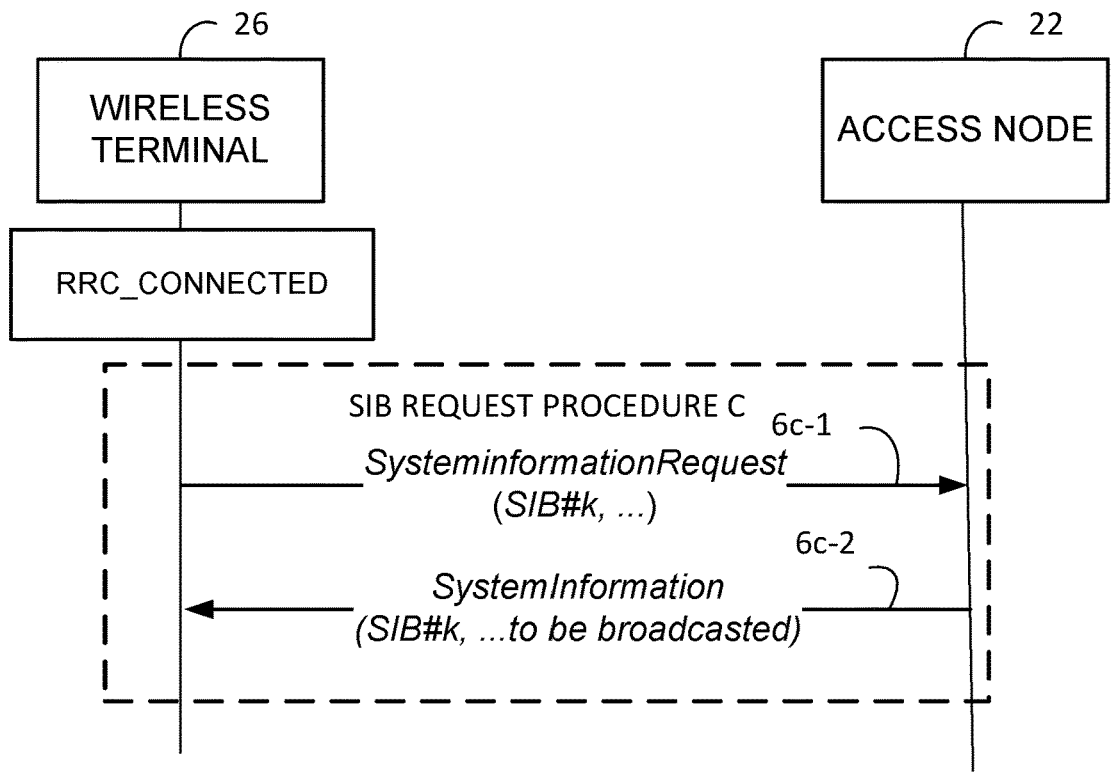

FIGS. 6A, 6B and 6C show three options for the SIB request procedure. In FIG. 6A, which may be applicable to wireless terminals in any of the RRC states, as shown by act 6a-1 the request of on-demand delivery for Other SI SIBs may be accomplished by sending a Random Access Preamble, which may comprise a sequence selected from a set of available sequences configured by the access node via Minimum SI. A given sequence is identified by a Preamble Index. When the access node detects the transmission of a preamble sequence, it may respond to it with Random Access Response, which includes the Preamble Index corresponding to the sequence (see act 6a-2). Upon receiving the Random Access Response, the wireless terminal may validate that the Preamble index in the Random Access Response matches the one associated with the preamble sequence, and then as act 6a-3 send to the access node SystemInformationRequest message that includes the identity of the SIB(s) (e.g. SIB#k) that the wireless terminal desires to receive. In response, as act 6a-4 the access node may send a SystemInformation message acknowledging to the request, indicating that the requested SIB(s) will be broadcasted from the next SI window scheduled for the requested SIB(s).

In one configuration, the access node may include in Minimum SI a set of Preamble indices, each of which is designated for requesting on-demand delivery of one or more specific Other SI SIBs. FIG. 6B illustrates an example SIB request procedure using this configuration, where the wireless terminal in any RRC state may transmit Random Access Preamble sequence given by the Preamble Index associated with the SIB(s) that the wireless terminal has selected (as shown by act 6b-1). When the wireless terminal receives Random Access Response (act 6b-2) including the Preamble Index, it may consider that the request procedure is successful.

The SIB request procedure in FIG. 6C may be applicable to wireless terminals in RRC_CONNECTED, wherein the SystemInformationRequest message of act 6c-1 is sent without the random access preamble/response.

In any of the three options disclosed above, the wireless terminal may proceed to the SIB reception procedure if the SIB request procedure is successful. Otherwise, the wireless terminal may think that the serving cell (controlled by the access node) is barred, which will invoke a cell reselection.

Figure 7:
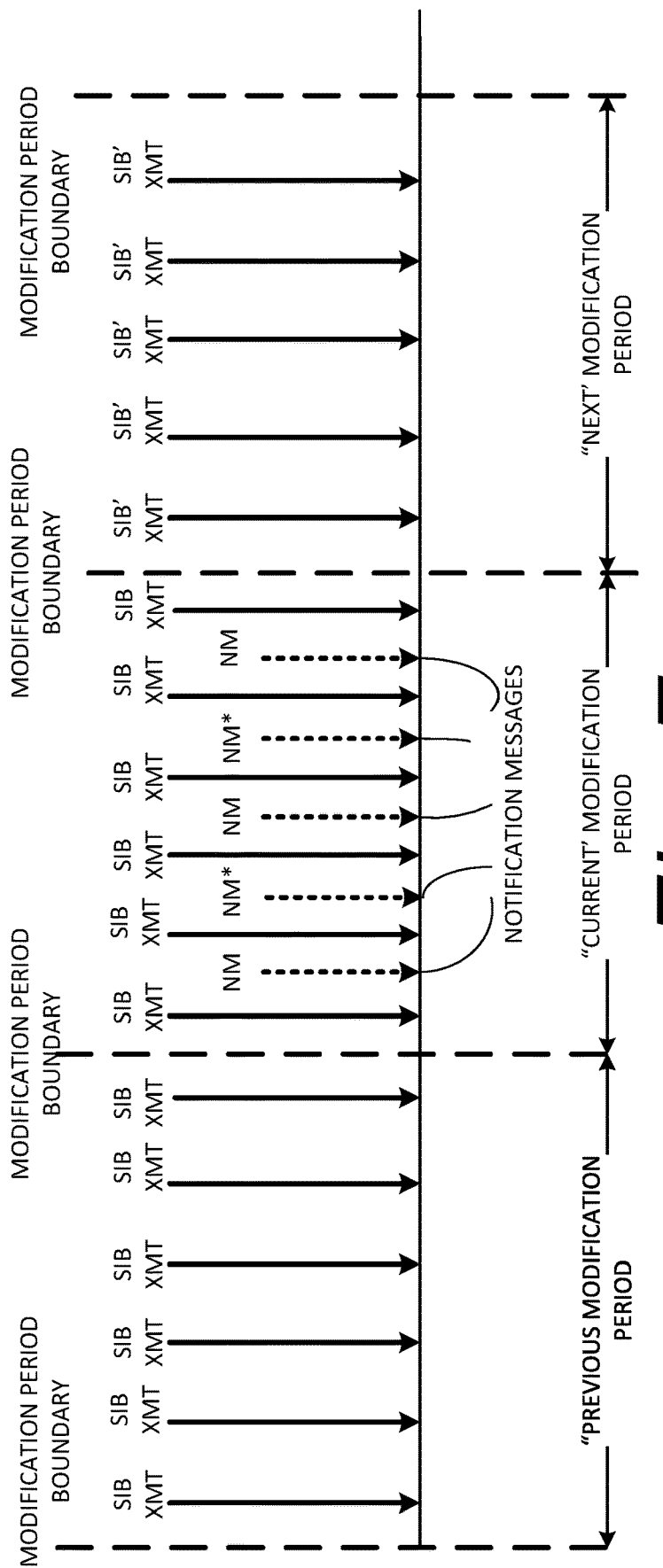
FIG. 7 is a diagrammatic view of a series of modification periods and showing generation and transmission of system information messages in the modification periods and generation and transmission of notification messages in a "current" modification period.

FIG. 7 is a diagrammatic view of an example operation and mode for updating the content of at least one periodically broadcasted SIB. FIG. 7 depicts by solid vertical arrows the generation and transmission of system information messages, each solid vertical arrow being a separate system information message containing at least one specific type of SIB. The system information messages are shown in FIG. 7 as being generated over a horizontal axis depicting time, and in particular over three "modification periods". The modification periods occur between modification period boundaries. The modification period boundaries are depicted in FIG. 7 by vertical dashed lines. FIG. 7 specifically shows four modification period boundaries: a first or left most modification period boundary which marks or delineates a beginning of a "previous" modification period; a second (from the left of FIG. 7) modification period boundary which marks an end of the "previous" modification period and a beginning of a "current" modification period; a third modification period boundary which marks an end of the "current" modification period and beginning of a "next" modification period; and, a fourth modification period boundary which marks an end of the "next" modification period. It should be understood that other modification periods may have occurred prior to the "previous" modification period, and that in the future further modification periods may occur after the "next" modification period.

A "modification period" can be any predefined time duration established by any predetermined convention. For example, the modification periods may be the same or akin to the concept of modification period as defined for LTE in 3GPP TS 36.304 as well as 36.331, both of which are incorporated herein by reference. It is anticipated that a similar time delineation may be used in future generations of technology, such as Fifth generation, and accordingly the modification period as used herein encompasses such similar time periods whether explicitly labeled as "modification period" or not.

The system information messages of FIG. 7 are shown as being periodic, with (for sake of example illustration) six system information messages transmitted between adjacent modification period boundaries. The number of system information messages between modification period boundaries is not confined or limited to six, since a greater or lesser number of system information messages may be transmitted. FIG. 7 depicts the system information messages of the "previous" modification period and the "current" modification period as "SIB XMT", but the system information messages of the "next" modification period as "SIB' XMT". The unprimed reference to the system information messages of the "previous" modification period and the "current" modification period reflects the fact that the contents of the system information blocks of those system information messages do not change during the "previous" modification period and the "current" modification period. For example, for which ever of the system information messages in the "previous" modification period and the "current" modification period carry contents of SIB Type 2 (SIB2), the contents of each transmission of SIB #2 is the same as the other transmissions of SIB2. Likewise, for which ever of the system information messages in the "previous" modification period and the "current" modification period carry contents of SIB3, the contents of each transmission of SIB #3 is the same as the other transmissions of SIB3. Of course, differently number system information blocks have different contents, but similarly numbered system information blocks have the same content in each of the "previous" modification period and "current" modification period of FIG. 7.

FIG. 7 differently depicts the system information messages of the "next" modification period as "SIB' XMT". The primed notation "SIB'" indicates that the contents of at least one of the system information blocks carried in at least one of the system information messages has changed since a former modification period, e.g., since the current" modification period in the FIG. 7 scenario. For example, in the "next" modification period the content of the system information block SIB2 may be changed from the content of the similarly numbered system information block SIB2 of the "current" modification period. The change of content of any field or information element of the SIB2 results in a "changed" SIB2. Moreover, it is possible that, at the time that one type of system information block changes content (e.g., SIB2), another system information block (e.g., SIB4) may also have changed content.

The wireless terminal may be able to discern or detect that content of a system information block has changed after the content has in fact been changed, e.g., after transmission of a system information message that includes the changed content of a system information block. For example, after the "next" modification period of FIG. 7 has begun, the wireless terminal may be able to determine or detect the changed content of one or more system information blocks. Such retroactive or reactionary detection of changed content of a system information block and switching over to the new system information block content may, however, require additional power consumption on the wireless terminal. In contrast, the access node may broadcast a notification message which is configured to prospectively indicate a change of the content of at least one of the system information blocks. The node processor 30 of access node 22 comprises notification message generator 55. The notification message generator 55 generates a notification message which is configured to prospectively indicate a change of the content of at least one of the system information blocks. The notification message generator 55 generates notification messages NM which serve to alert one or more wireless terminals that the content of one or more system information blocks will change at the next modification period boundary. The notification message NM serves to alert one or more wireless terminals that the content of one or more SIBs will change at the next modification period boundary. Preferably the notification message generator 55 is configured to schedule transmission of plural notification messages. For example, in the context of FIG. 7 the access node transmits notification messages NM during the "current" modification period, thereby alerting the one or more wireless terminals that a change of content of one or more system information blocks will occur at the next modification period boundary, e.g., for the "next" modification period. The notification messages NM may be generated in advance of a predetermined modification period boundary, in advance of the initial modification period boundary of the "next" modification period. In such case, the predetermined modification period boundary marks a beginning of a period in which the content of the at least one of the system information blocks changes from a previous modification period. The notification messages NM are shown by vertically dotted arrow in FIG. 7. For sake of example FIG. 7 illustrates five such notification messages NM, but a greater or lesser number may be generated.

The notification messages NM may also be referred to herein as "paging messages", and as such the notification message generator may also be known as paging generator 55. As such, the notification messages NM may, in some example embodiments and modes, take the form of conventional paging messages as understood in 3GPP. However, the notification messages NM are not limited to conventional paging messages and need not take the form of any specific type of message. In at least some example embodiments and modes the notification messages NMs may be broadcasted messages, not necessarily directed or confined to any particular wireless terminal and not necessarily intended for dissemination to plural wireless terminals served by the access node. Moreover, it should be understood (like conventional paging messages), that the radio resources that on which the access node may transmit paging messages may be pre-determined and periodic. In fact, whether the access node actually transmits on such a scheduled resource (e.g., at a particular time) is up to the access node: if there is nothing to send, then the access node may send nothing at that particular time. In some configuration there is an agreement between the access node and the wireless terminal(s) as to which resources the access node 22 uses for sending paging messages (if any) to that particular wireless terminal. Further, in some example embodiments and modes the wireless terminal is supposed to monitor at least the agreed resources (paging occasions) to see if there is a paging message addressed to that particular wireless terminal. For example, in the example scenario of FIG. 7 the particular wireless terminal knows, by pre-arranged convention, that the wireless terminal is supposed to monitor the notification messages that are denoted by an asterisk, i.e., notification messages NM*.

Figure 8A:
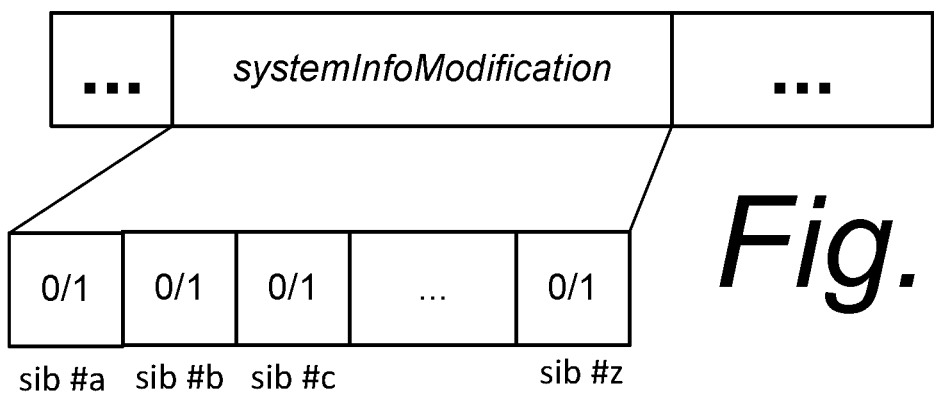
FIG. 8A is a diagrammatic view showing an example format of a paging message which comprises a bitmap.
Figure 8B:
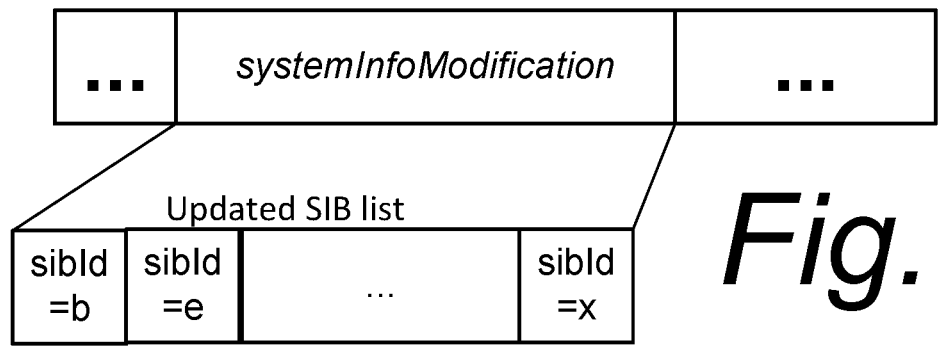
FIG. 8B is a diagrammatic view showing an example format of a paging message which comprises a list of identifiers of system information blocks having changed content.

In some configurations, the notification message NM may specifically indicate specifically which SIBs are to be updated. For example, in an implementation in which the notification message NM comprises the paging message PM, the systemInfoModification information element in the Paging message may specifically indicate which SIBs are to be updated. FIG. 8A shows an example format of a paging message which comprises a bitmap. Members of the bitmap correspond to respective system information block numbers and indicate by a binary value (e.g., either "1" or "0") whether there will be a content change of the respective system information block at the next modification period boundary. Alternatively, the notification message may comprise a field (e.g., systemInfoModification) which prospectively identifies (e.g., by name or SIB block number or SIB identifier) the particular system information blocks that will have changed content. For example, in the example paging message of FIG. 8B the information element systemInfoModification lists system information blocks having identifiers sibid=b, sibid=e, and sibid=x among those with changed content.

Figure 9:
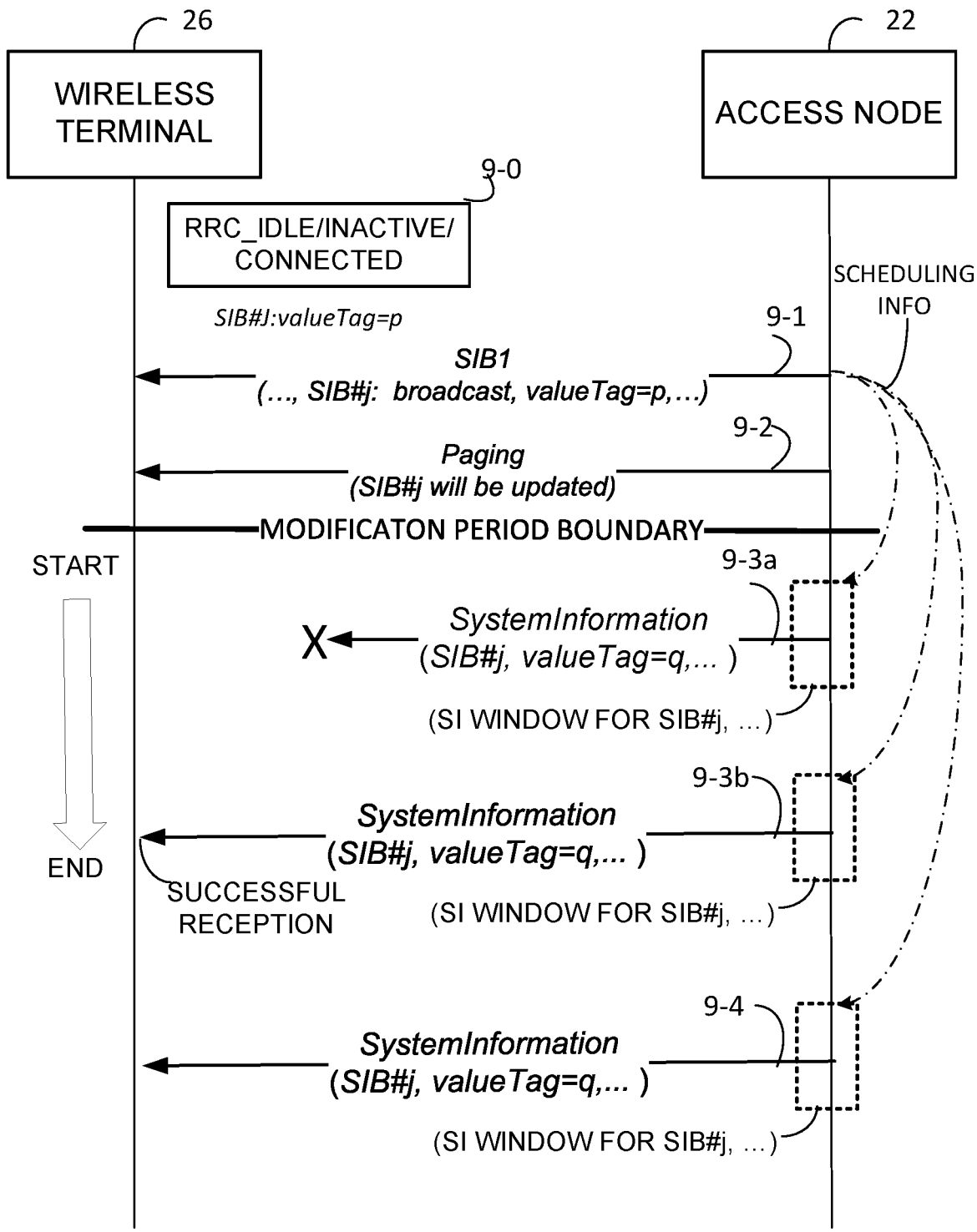
FIG. 9 is a diagrammatic view illustrating an exemplary message flow for a SIB update notified via a Paging message.

FIG. 9 is an exemplary message flow for a SIB update notified via Paging message, wherein the SIB#j to be updated is periodically broadcasted. As reflected by act 9-1, prior to receiving the Paging message the wireless terminal in any of the RRC states has already acquired an up-to-date Minimum SI, which indicates that the SIB#j with valueTag=p is periodically broadcasted. The wireless terminal eventually receives the Paging message of act 9-2 that informs the wireless terminal of the upcoming change on SIB#j after the next modification period boundary. The wireless terminal may wait for the next modification period boundary, then start the SIB reception process comprising monitoring the SI windows for SIB#j (indicated by scheduleInfo of the Minimum SI) until one of the aforementioned termination conditions. The SIB reception process is denoted by the vertical arrow whose tail marks the start of the SBI reception process and whose head marks the end of the SIB reception process, which is at the successful reception of the SystemInformation message 9-3b.

Figure 10:
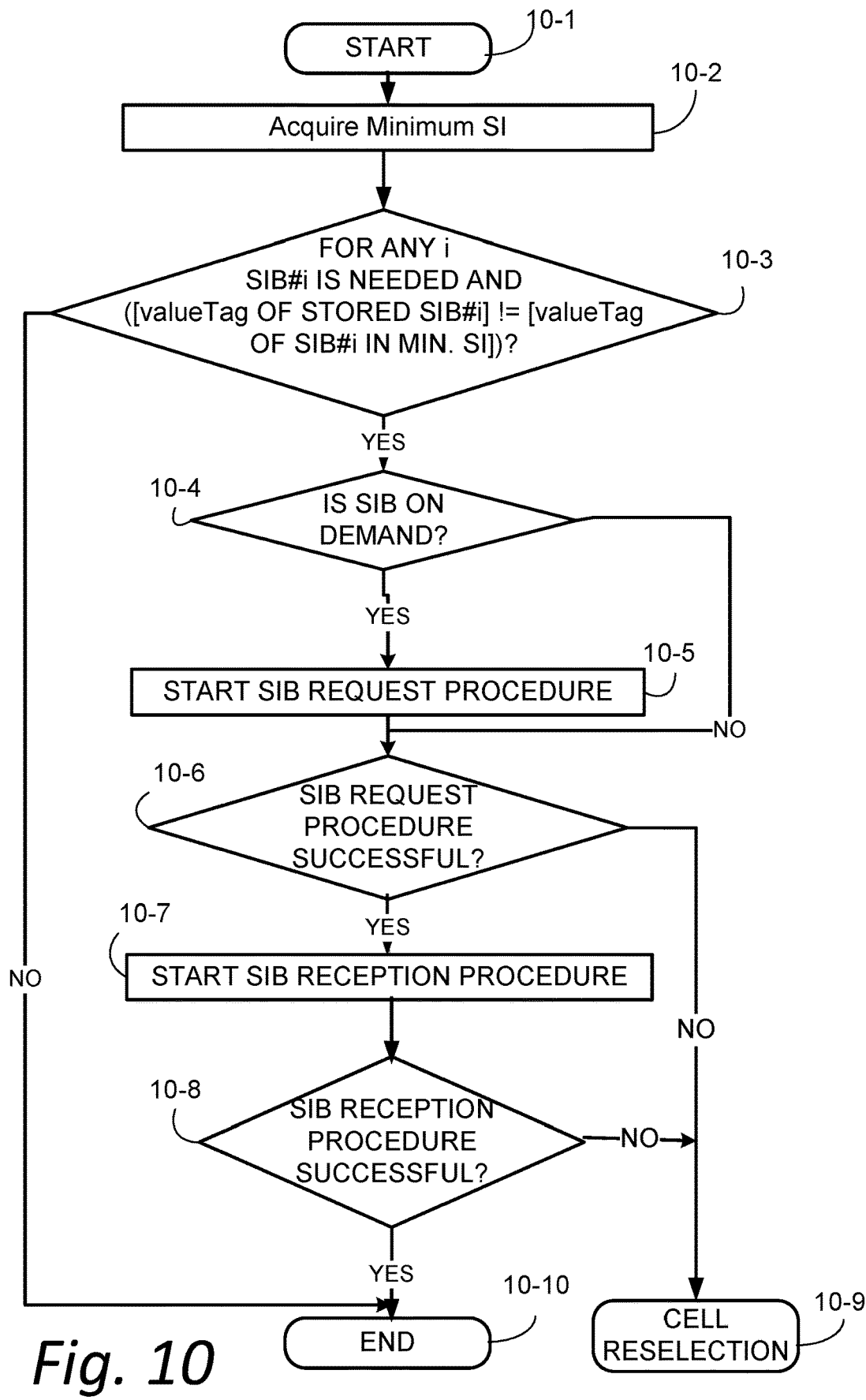
FIG. 10 is a flowchart depicting basic acts or steps comprising a wireless terminal procedure upon receiving Minimum SI.

The procedure of the wireless terminal 26 upon receiving Minimum SI is illustrated in FIG. 10. The wireless terminal 26 in any of the RRC states receives Minimum SI from the currently serving access node via signaling messages, as shown for example by act 10-2. For each SIB type that the wireless terminal needs for desired services, it compares the corresponding value tag in the Minimum SI with the value tag of the stored SIB (if any) (see act 10-3). If the two value tags match, then no action may be taken (go to step 10-10). Otherwise, a check is made at act 10-4 whether the SIB is an on demand SIB. If the SIB is an on demand SIB, as act 10-5 the aforementioned SIB request procedure may be initiated. If the SIB reception procedure result is successful, as act 10-7 the wireless terminal may proceed to the aforementioned SIB reception procedure. The wireless terminal may also being the SIB reception procedure if the check of act 10-4 is negative. If the SIB reception procedure result as checked at act 10-6 is not successful, the wireless terminal may consider the serving cell to be barred, resulting in a cell reselection process (act 10-9). In the SIB reception procedure (act 10-7) the wireless terminal monitors one or more SI windows of the requested SIB(s) (see FIG. 9) occurring after the end of the SIB request procedure, until one of the aforementioned termination conditions satisfies (e.g., the SIB reception procedure is deemed successful at act 10-8).

Figure 11:
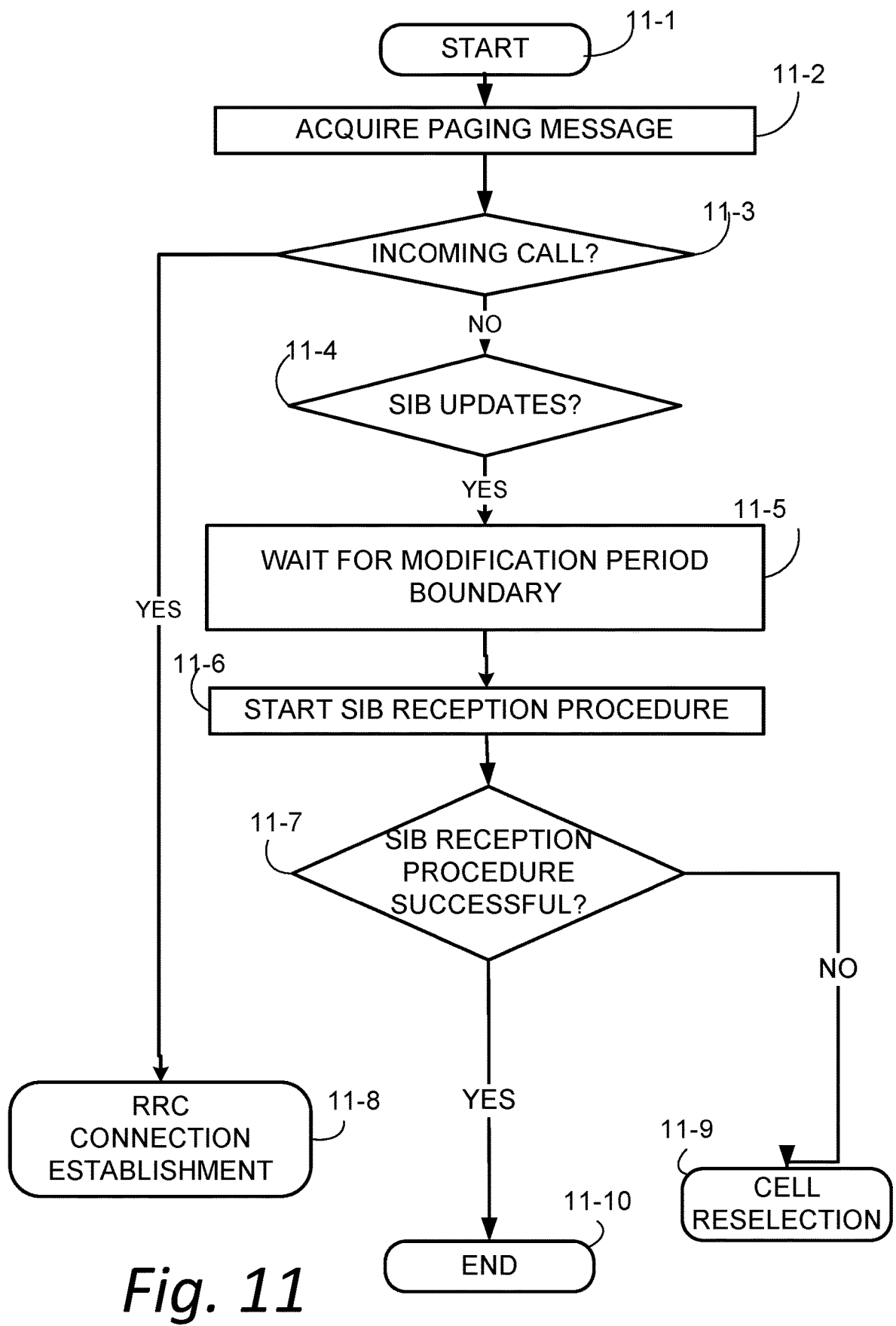
FIG. 11 is a flowchart depicting basic acts or steps comprising a wireless terminal procedure upon receiving a Paging message

FIG. 11 illustrates one example operation of the wireless terminal 26 receiving a Paging message (shown as act 11-2). As act 11-3 the wireless terminal checks if the Paging message indicates an incoming call to this wireless terminal. If so, then the wireless terminal may proceed to RRC connection establishment (act 11-8). Otherwise as act 11-4 the wireless terminal may further check if the message indicates any SIB changes to be scheduled. If it is determined at act 11-4 that at least one SIB type will be changed, as act 11-5 the wireless terminal may wait until the next modification period boundary and then start the SIB reception procedure (as act 11-6) as disclosed earlier. This operation of FIG. 11 is aimed for periodically broadcasted SIBs; the operations for on-demand based SIBs are disclosed in following embodiments.

Figure 12:
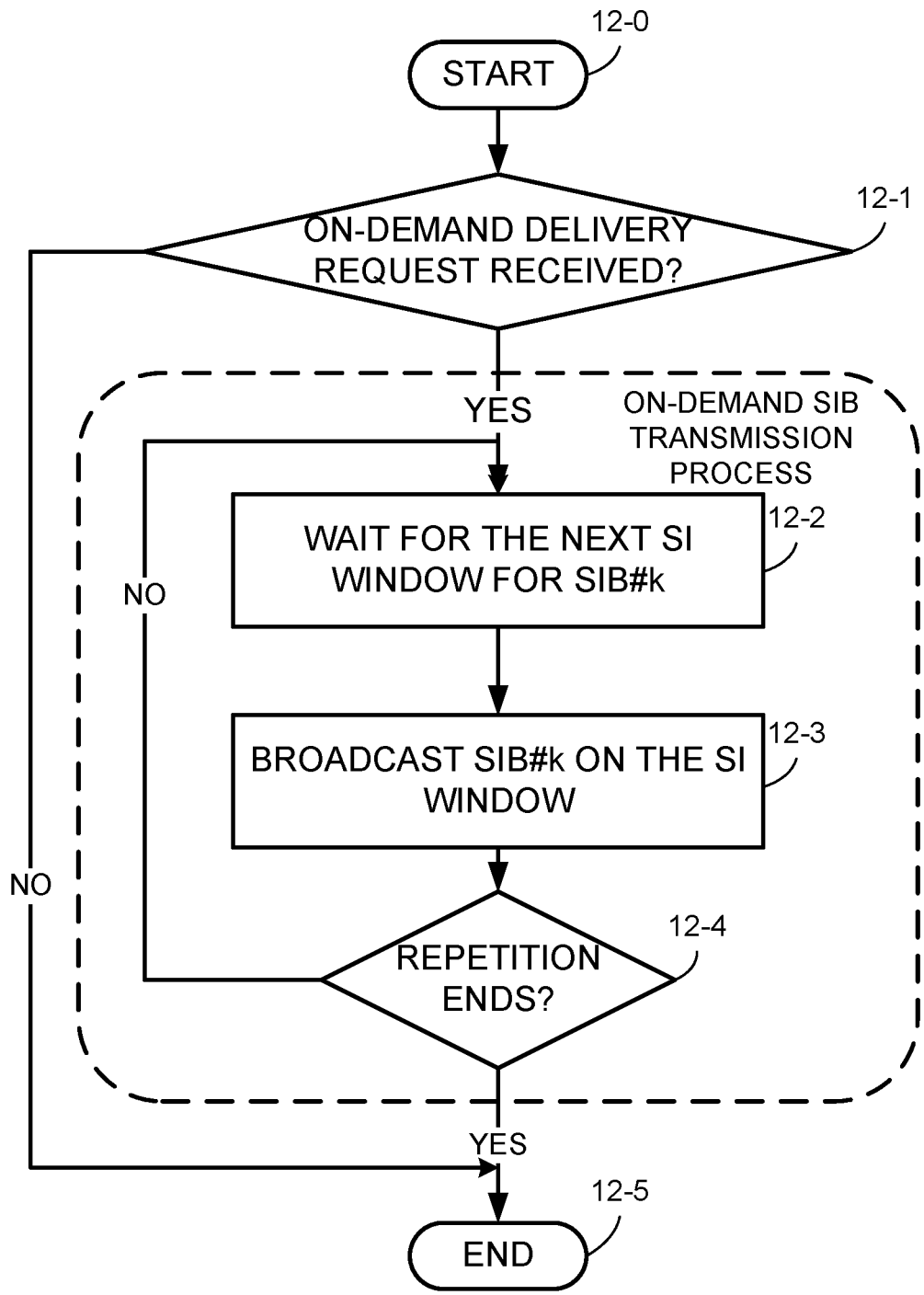
FIG. 12 is a flowchart showing example basic acts or steps executed by an access node upon receiving an on-demand SIB delivery request from a wireless terminal.

FIG. 12 is an example operational flow diagram of the access node 22 receiving an on-demand SIB delivery request from a wireless terminal while periodically broadcasting Minimum SI. If as act 12-1 the access node 22 receives the request for SIB#k, the access node 22 may proceed to the on-demand SIB transmission process as shown by act 12-3. As shown by act 12-2, the access node 22 may wait for the next SI window for SIB#k, then (as act 12-3) broadcast the SIB#k on the window. The access node may repeat broadcasting on the following SIB#k SI windows for multiple times until repetition ends (as shown by act 12-4). The number of repetitions may be pre-configured, or equal to the aforementioned maximum counter value configured to wireless terminals via system information.

Figure 13:
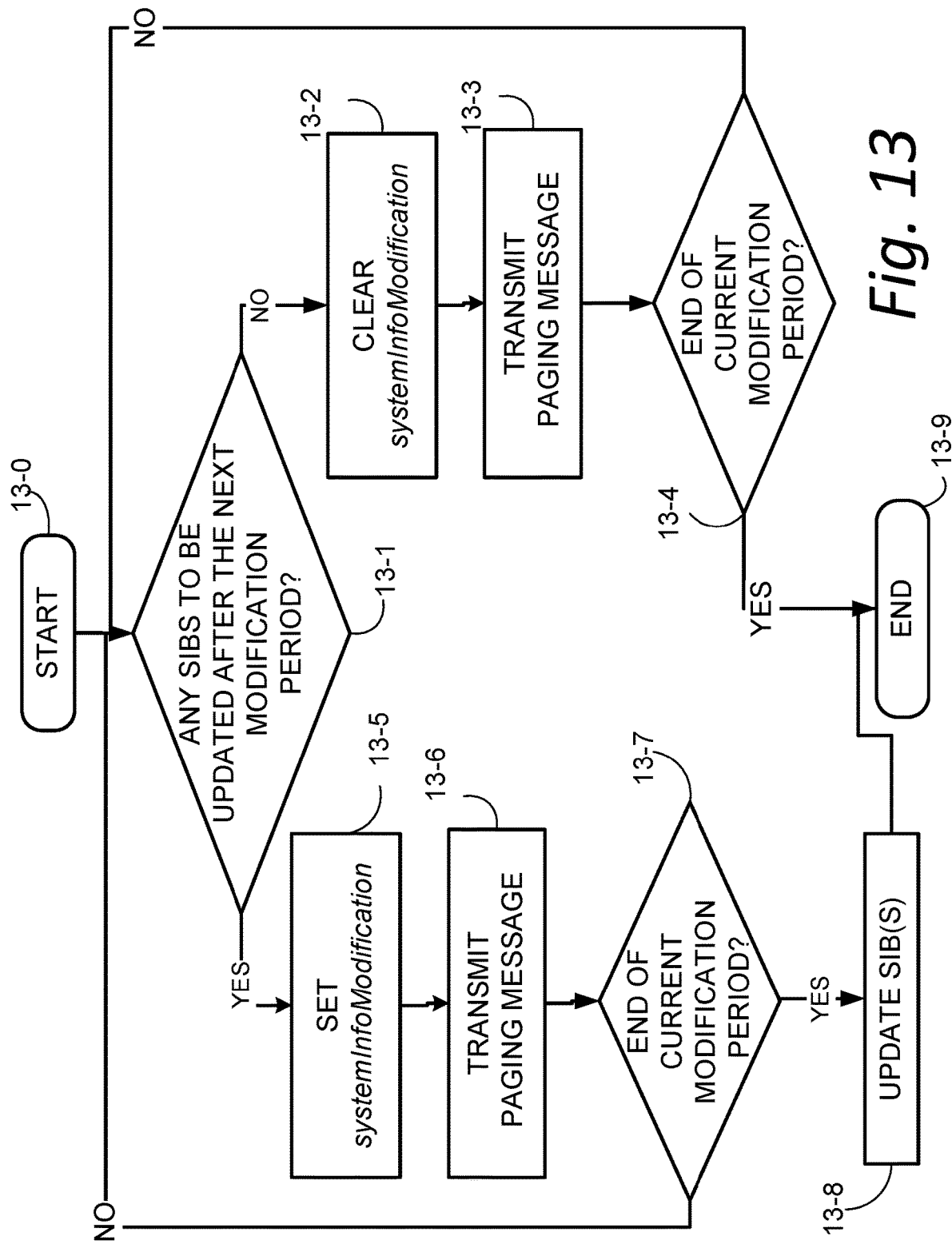
FIG. 13 is a flowchart showing example, representative acts of steps performed by an access node when notifying wireless terminals of upcoming SIB changes.

FIG. 13 is an example operational flow diagram of the access node notifying an upcoming SIB changes to wireless terminals. This operation may start at every modification period boundary. The access node periodically transmits Paging messages at every paging occasion. Act 13-1 of FIG. 13 shows a check to determine if any SIBS are to be updated from the next modification period. When there is no SIB change scheduled, as shown by act 13-2 the systemInfoModification of the message is cleared (no indication of changes). Thereafter a paging message may be transmitted as indicated by act 13-3. When the access node decides to change some of the SIB types, as act 13-5 the information element may be set accordingly to indicate SIB types to be changed, based on the format depicted in FIG. 8A or FIG. 8B. The access node may continue sending the Paging message with the information element set (as indicated by act 13-6) until the end of the current modification period (as determined at act 13-7). At the next modification period boundary, where the SIB changes take effect, the access node may update the contents of the SIB(s) as shown by act 13-8.

First Example Embodiment

Figure 14:
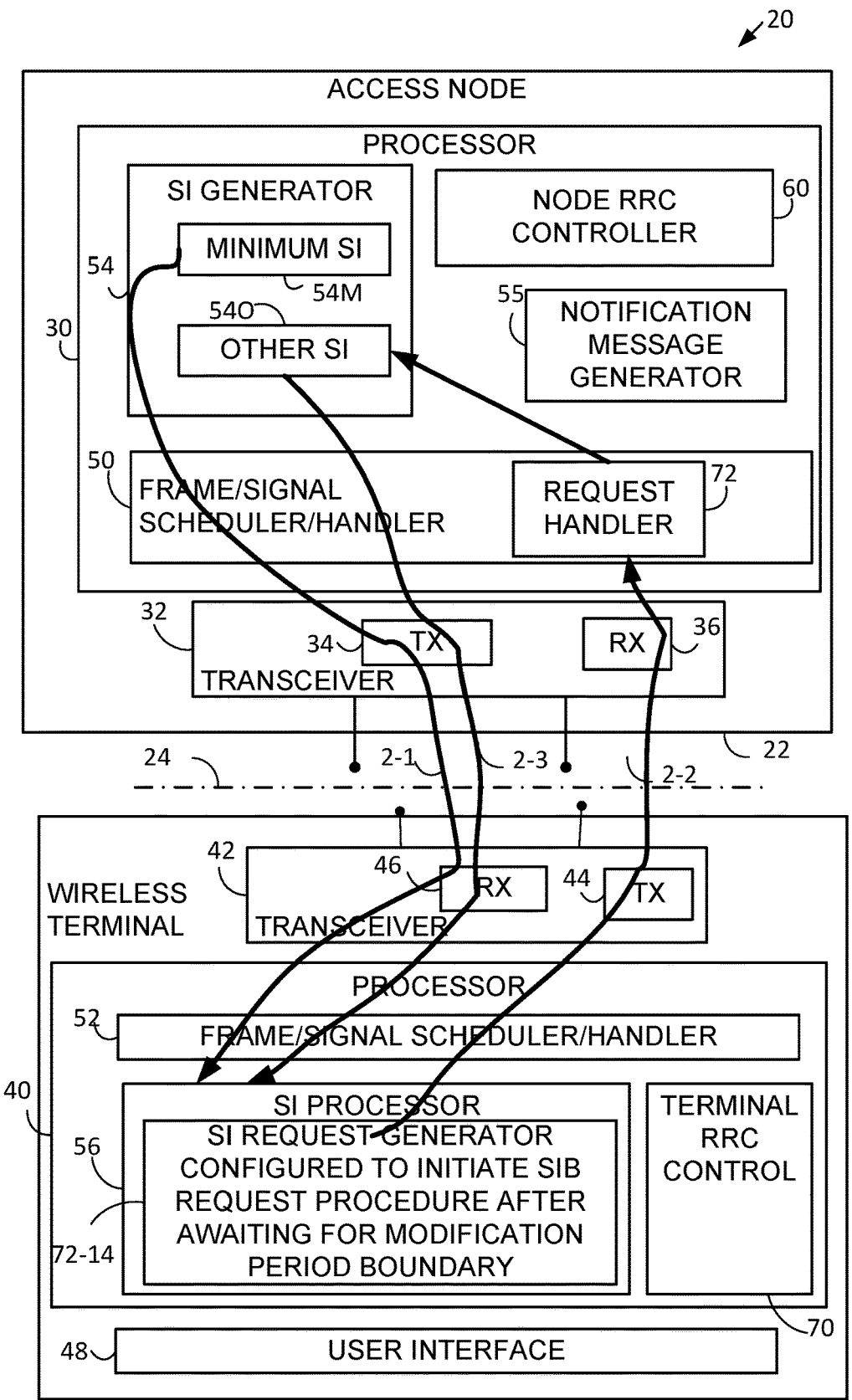
FIG. 14 is a schematic view showing a first embodiment of a communications system comprising a radio access node and a wireless terminal, and wherein the wireless terminal waits for a modification period boundary to initiate an SIB request procedure for an on-demand SIB.

FIG. 14 shows an example communications system wherein wireless terminal 26-14 waits for a modification period boundary to initiate an SIB request procedure for an on-demand SIB. As such, the terminal processor 40 comprises request generator 72-14 which is configured to initiate the SIB request procedure for an on-demand SIB after waiting for a modification period boundary. That is, the wireless terminal 26-14 initiates a request for the changed SIB after the modification period boundary. As explained herein, the SI processor 56 of wireless terminal 26-14 is also configured to receive the requested SIB during the next modification period. Other elements and functions of the wireless terminal 26-14 and the access node 22 are similar to and understood from the preceding description of FIG. 2.

Figure 15:
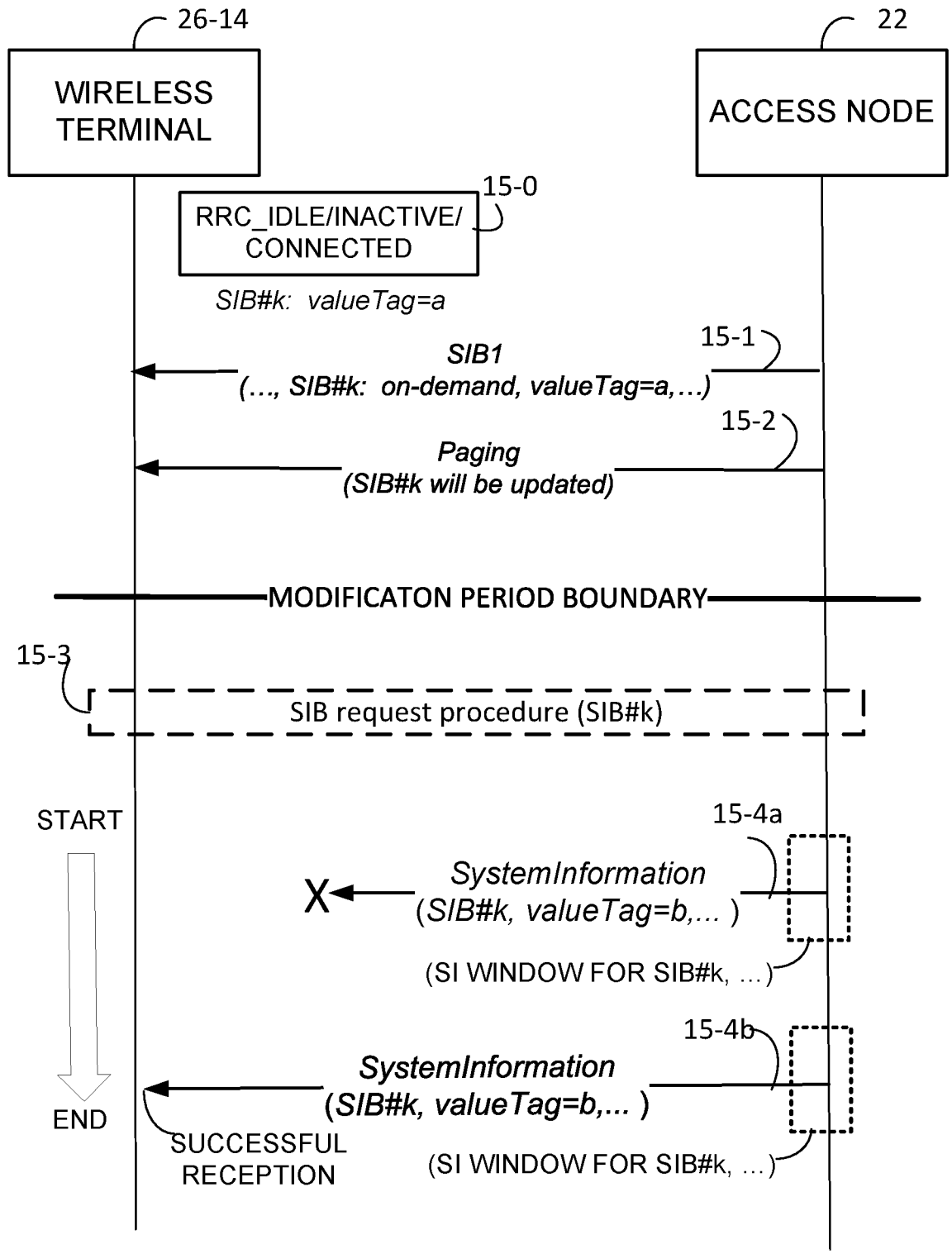
FIG. 15 is a diagrammatic view illustrating an exemplary message flow for the embodiment of FIG. 14.

FIG. 15 shows example, representative acts or steps performed in the communications network of FIG. 14, e.g., by access node 22 and wireless terminal 26-14, and example messages transmitted therebetween. For the first example embodiment and mode, the wireless terminal may be in any of the RRC states, and (as indicated by act 15-0) already stores the content of SIB#k with valueTag=a. In this example, the SIB1 that wireless terminal may receive indicates that the SIB#k is to be delivered on-demand basis, and that the current up-to-date version (value tag) of SIB#k is valueTag=a. Since the wireless terminal already stored the same version of SIB#k, it need not take any action with regard to the acquisition of SIB#k.

Eventually, as indicated by act 15-2, the wireless terminal 26-14 receives a Paging message (corresponding to NM* in FIG. 7) which may indicate that SIB#k will be updated from the next modification period. The wireless terminal 26-14 may wait for the next modification period boundary, and after the next modification boundary may then initiate the SIB request procedure (represented as act 15-3) to request on-demand delivery of SIB#k. If the SIB request procedure is successful, the access node may transmit SIB#k in one or more SI windows associated with SIB#k as part of an SIB reception procedure. The SIB reception procedure has duration indicated by the vertical arrow of FIG. 15, wherein the arrow tail indicates start of the SIB reception procedure and the arrow head indicates end of the SIB reception procedure. Acts 15-4a and 15-4b comprise acts of the SIB reception procedure which is performed as a result of the SIB request procedure. Act 15-4a shows an unsuccessful reception of SIB#k; act 15-4b shows a successful reception of SIB#k. The wireless terminal 26-14 may monitor such SI windows until one of the aforementioned termination conditions satisfies. For example, upon successful receipt of the SystemInformation message of act 15-4 the wireless terminal 26-14 may end its SIB reception procedure, having received the sought SIB#k with valueTag=b.

Figure 16:
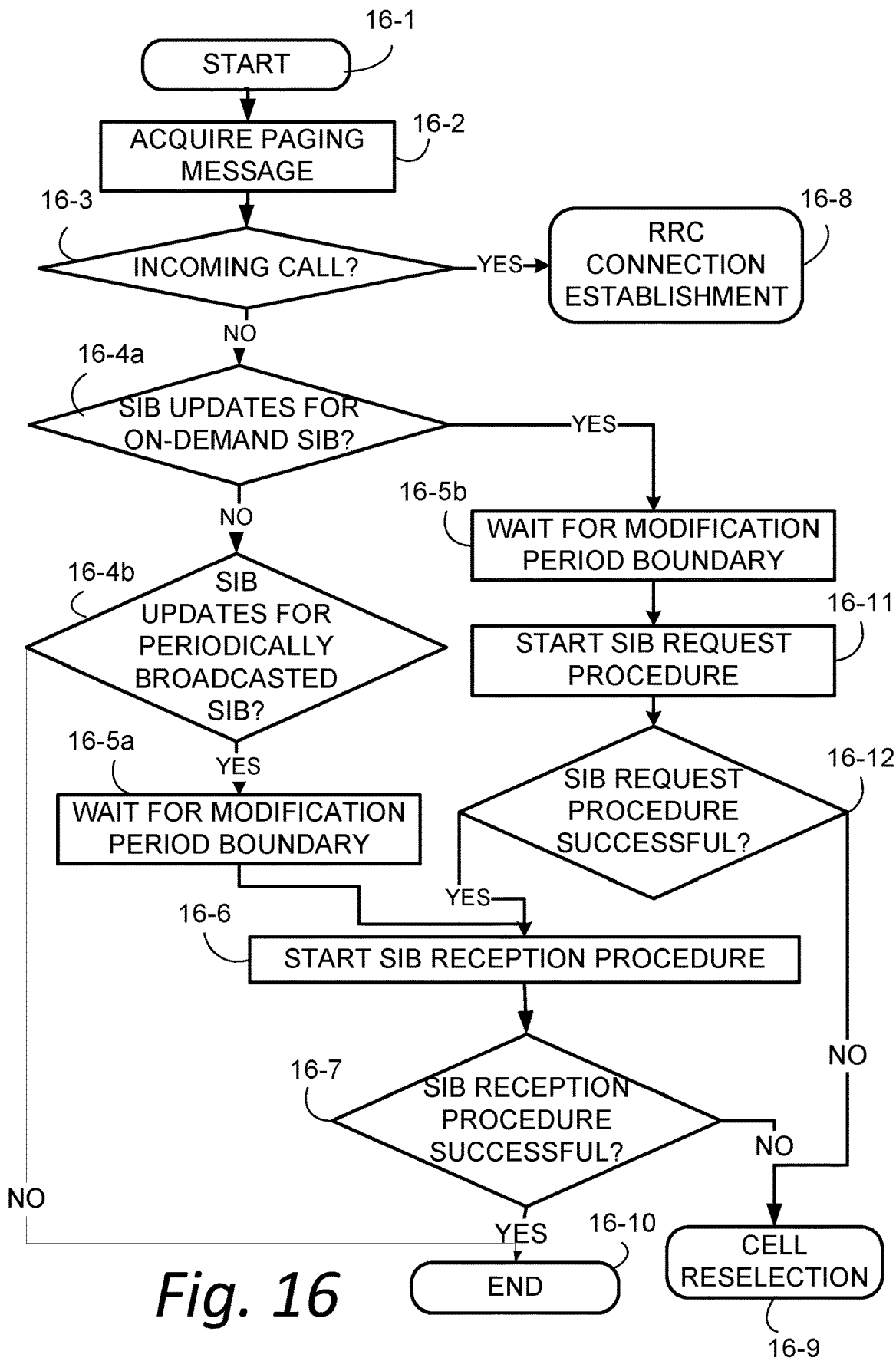
FIG. 16 is flowchart showing example, representative, acts or steps performed by a wireless terminal of FIG. 14 upon receiving the Paging message.

FIG. 16 shows example acts or steps performed wireless terminal 26-14 upon receiving the Paging message for the first embodiment. FIG. 16 resembles FIG. 11, but includes additional steps to handle the case where the SIB updates are scheduled on some of the on-demand SIBs. Act 16-2 of FIG. 16 shows wireless terminal 26-14 receiving a Paging message. As act 16-3 the wireless terminal checks if the Paging message indicates an incoming call to this wireless terminal. If so, then the wireless terminal may proceed to RRC connection establishment (act 16-8). Otherwise the wireless terminal may further check if the message indicates any SIB changes to be scheduled. Two checks may be performed: as act 16-4a the wireless terminal 26-14 may check if the Paging message indicates that the SIB update is for an on-demand SIB; as act 16-4b the wireless terminal 26-14 may check if the Paging message indicates that the SIB update is for a broadcasted SIB. If the Paging message is not for an on-demand SIB, e.g., if the decision of act 16-4a is negative, the check of act 16-4b is performed. Moreover, if the decision of act 16-4b is positive, e.g., if the Paging message is for a broadcasted SIB, as act 16-5a the wireless terminal may wait until the next modification period boundary and then start the SIB reception procedure (as act 16-6) as disclosed earlier. If it were determined at act 16-4a that the Paging message indicating an SIB change is for an on-demand SIB, the wireless terminal 26-14 waits for the next modification period boundary (act 16-5b). After occurrence of the next modification period boundary, as act 16-11 the wireless terminal 26-14 may begin performance of the SIB request procedure (act 16-11). If the SIB request procedure of act 16-11 is successful, the wireless terminal 26-14 may start the SIB reception procedure (act 16-6) for the on-demand SIB. If the SIB request procedure of act 16-11 is unsuccessful, or if the SIB reception procedure is determined (at act 16-7) to be unsuccessful, cell reselection is performed (act 16-9). If the SIB reception procedure is successful, the procedure of FIG. 16 is terminated (act 16-10).

Thus, in the case of FIG. 16, the wireless terminal may wait for the next modification period boundary before starting the SIB request procedure, and then initiate the SIB request procedure (act 16-12). When the SIB request procedure is completed successfully, it may proceed to SIB reception procedure (act 16-7).

It should be understood that concepts and procedures of FIG. 10, FIG. 12 and FIG. 13 may be applicable to the first embodiment.

Second Example Embodiment

Figure 17:
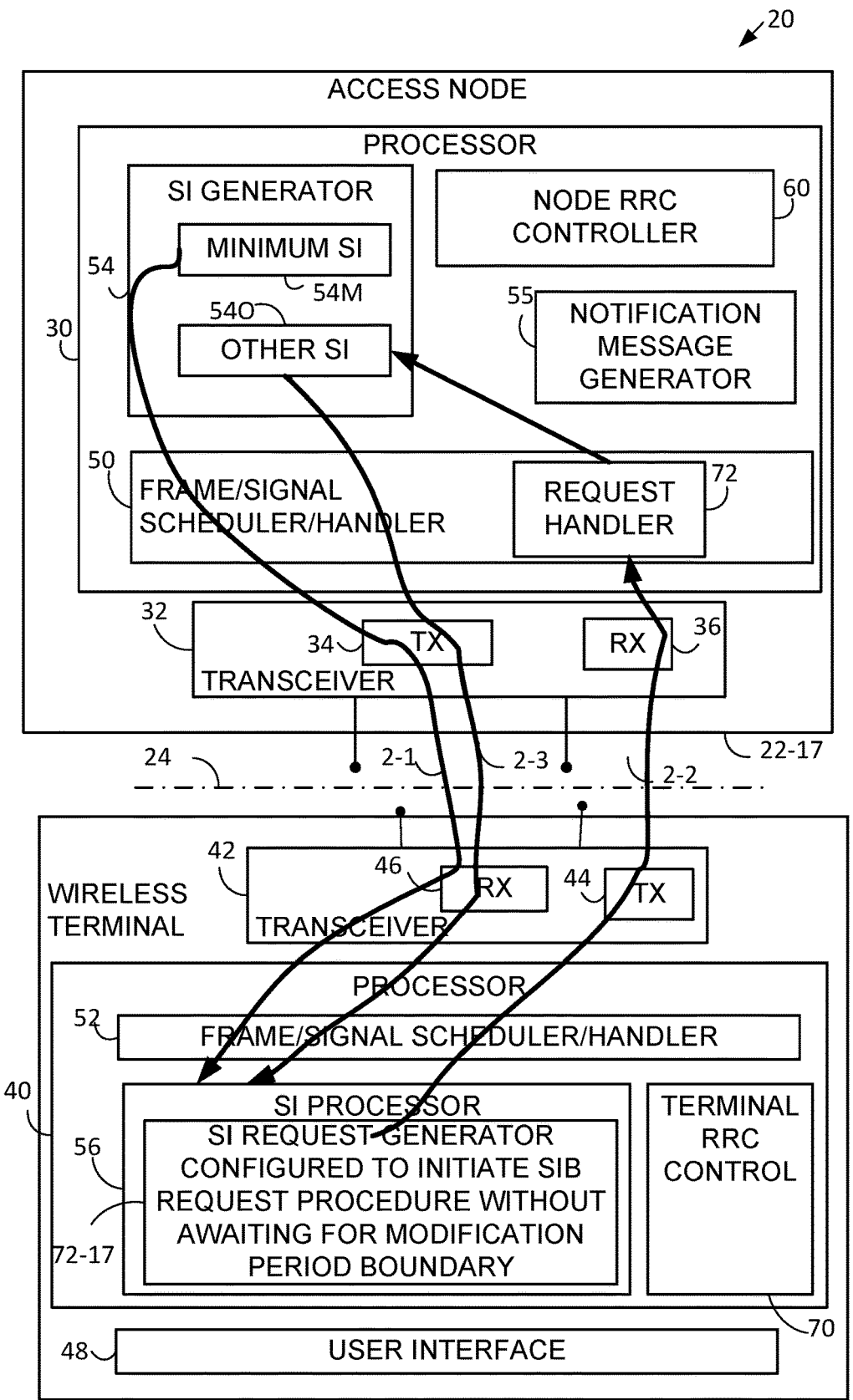
FIG. 17 is a schematic view showing a second embodiment of a communications system comprising a radio access node and a wireless terminal, and wherein the wireless terminal initiates the SIB request procedure without waiting for the next modification period boundary, but after the successful completion of the SIB request procedure waits for the next modification period boundary to start the SIB reception procedure.

FIG. 17 shows an example communications system wherein wireless terminal 26-17 initiates the SIB request procedure without waiting for the next modification period boundary, but after the successful completion of the SIB request procedure the wireless terminal 26-17 waits for the next modification period boundary to start the SIB reception procedure. As such, the terminal processor 40 comprises request generator 72-17 which is configured to initiate the SIB request procedure for an on-demand SIB without waiting for the next modification period boundary. As explained herein, the SI processor 56 of wireless terminal 26-17 may be configured to wait for the next modification period boundary to start the SIB reception procedure. In an example implementation, the wireless terminal 26-17 and the access node 22 may have an agreement that the SIB reception procedure starts after the modification period boundary when an on-demand SIB is to be updated in the next modification period. Such agreement may be pre-configured, or may be configured by the network (e.g., via access node 22) using (for example) system information. Other elements and functions of the wireless terminal 26-17 and the access node 22 are similar to and understood from the preceding description of FIG. 2.

Figure 18:
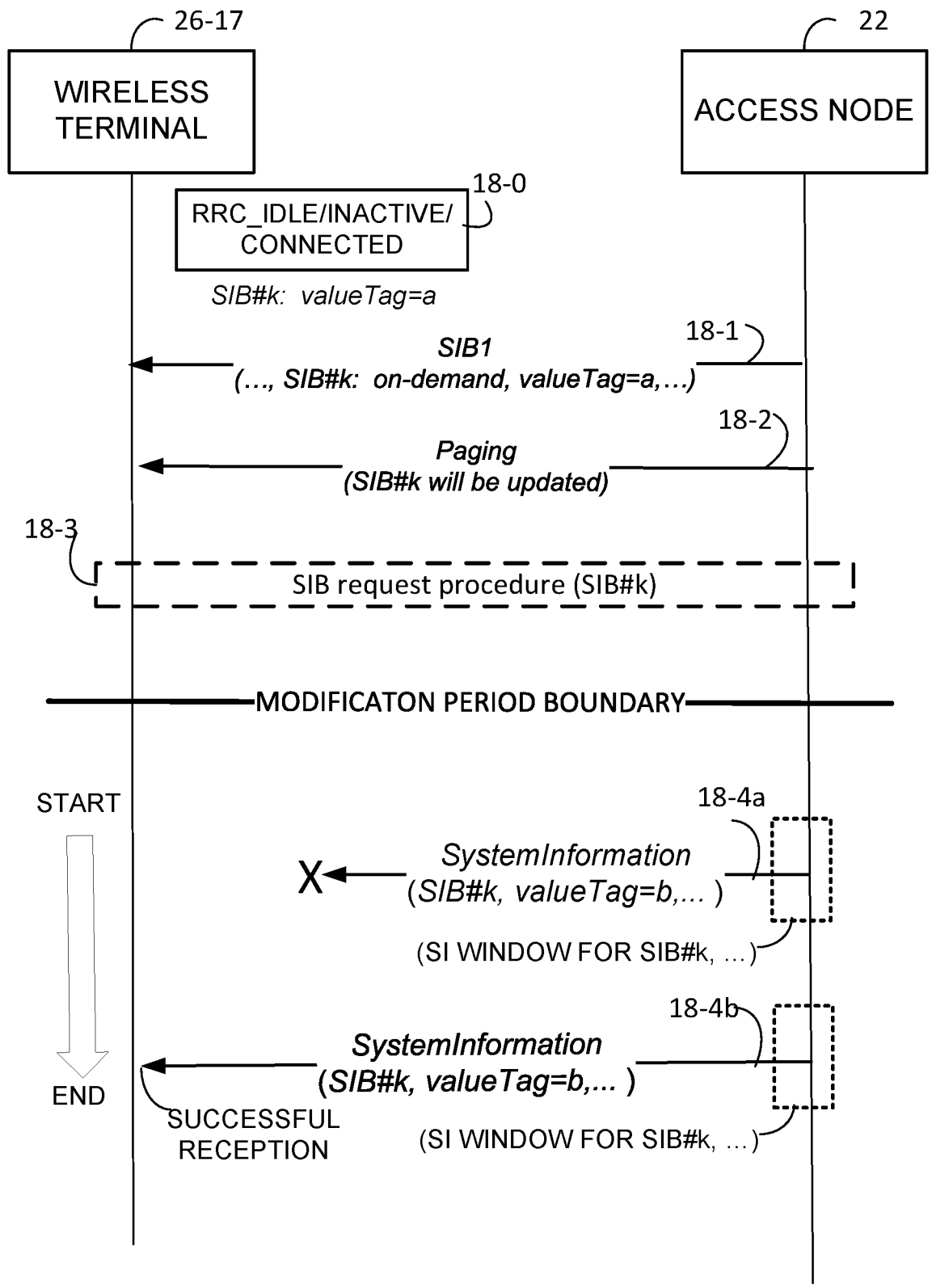
FIG. 18 is a diagrammatic view illustrating an exemplary message flow for the embodiment of FIG. 17.

FIG. 18 shows example, representative acts or steps performed in the communications network of FIG. 14, e.g., by access node 22 and wireless terminal 26-17, and example messages transmitted therebetween. For the second example embodiment and mode, the wireless terminal may be in any of the RRC states, and (as indicated by act 18-0) already stores the content of SIB#k with valueTag=a. In this example, as shown by act 18-1, the SIB1 that wireless terminal may receive indicates that the SIB#k is to be delivered on-demand basis, and that the current up-to-date version (value tag) of SIB#k is valueTag=a. Since the wireless terminal already stored the same version of SIB#k, it need not take any action with regard to the acquisition of SIB#k.

Eventually, as indicated by act 18-2, the wireless terminal 26-17 receives a Paging message (corresponding to NM* in FIG. 7) which may indicate that SIB#k will be updated from the next modification period. The wireless terminal 26-17 does not wait for the next modification period boundary, but before the next modification period boundary begins to initiate the SIB request procedure (represented as act 18-3) to request on-demand delivery of SIB#k. If the SIB request procedure is successful, the access node may transmit SIB#k in one or more SI windows associated with SIB#k as part of an SIB reception procedure after the next modification period boundary. The SIB reception procedure has duration indicated by the vertical arrow of FIG. 18, wherein the arrow tail indicates start of the SIB reception procedure and the arrow head indicates end of the SIB reception procedure. Acts 18-4a and 18-4b comprise acts of the SIB reception procedure which is performed as a result of the SIB request procedure. Act 18-4a shows an unsuccessful reception of SIB#k; act 18-4b shows a successful reception of SIB#k. The wireless terminal 26-17 may monitor such SI windows until one of the aforementioned termination conditions satisfies. For example, upon successful receipt of the System-Information message of act 18-4 the wireless terminal 26-17 may end its SIB reception procedure, having received the sought SIB#k with valueTag=b.

Figure 19:
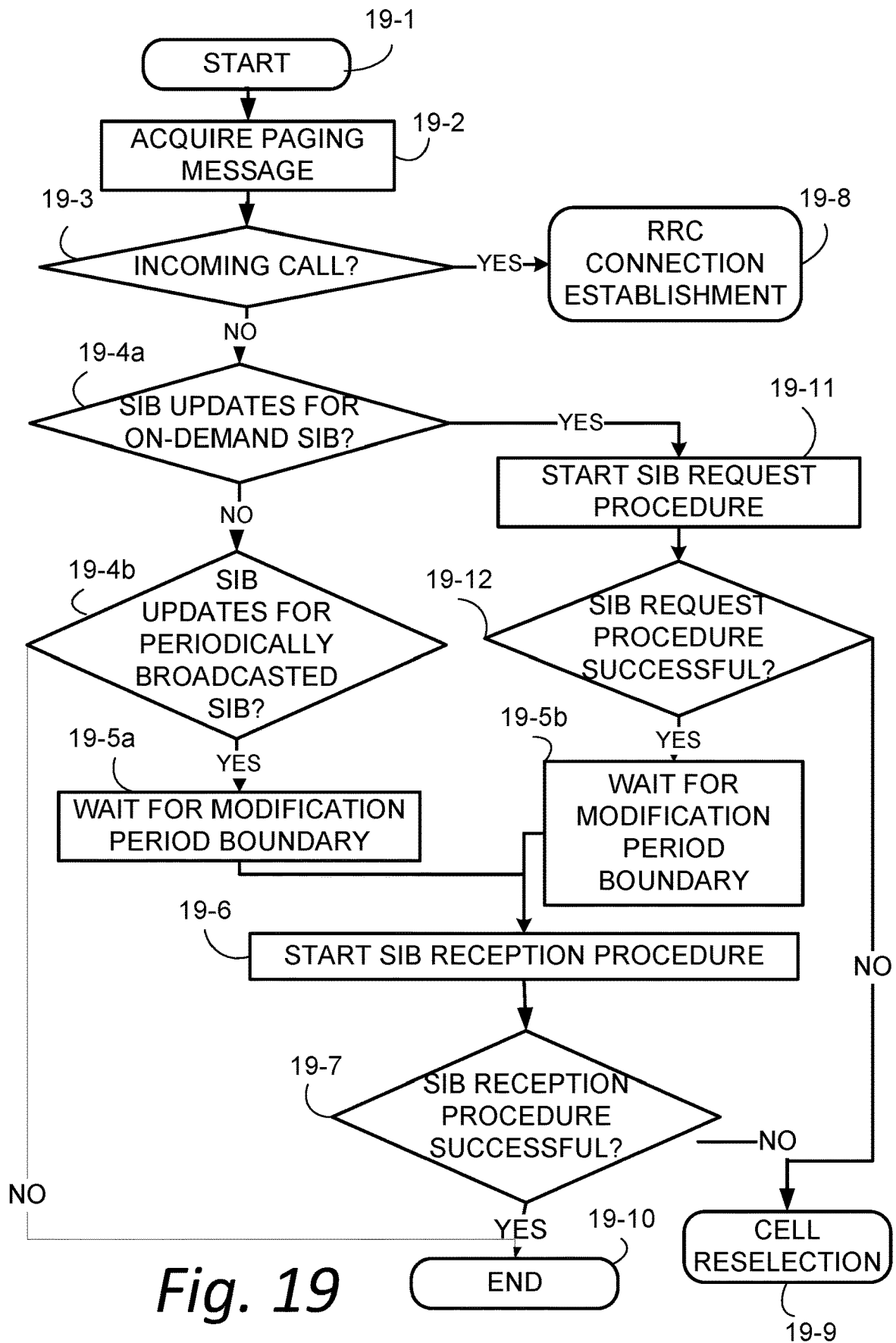
FIG. 19 is flowchart showing example, representative, acts or steps performed by a wireless terminal of FIG. 17 upon receiving the Paging message.

FIG. 19 shows example acts or steps performed by the wireless terminal 26-17 of FIG. 17, and also serves an example operational flow diagram of the wireless terminal for the second embodiment. FIG. 19 is similar to FIG. 16, except that the SIB request procedure is initiated before the next modification period boundary. Act 19-2 of FIG. 19 show wireless terminal 26-17 receiving a Paging message. As act 19-3 the wireless terminal checks if the Paging message indicates an incoming call to this wireless terminal. If so, then the wireless terminal may proceed to RRC connection establishment (act 19-8). Otherwise the wireless terminal may further check if the message indicates any SIB changes to be scheduled. Two checks may be performed: as act 19-4a the wireless terminal 26-17 may check if the Paging message indicates that the SIB update is for an on-demand SIB; as act 19-4b the wireless terminal 26-17 may check if the Paging message indicates that the SIB update is for a broadcasted SIB. If the Paging message is not for an on-demand SIB, e.g., if the decision of act 19-4a is negative, the check of act 19-4b is performed. Moreover, if the decision of act 19-4b is positive, e.g., if the Paging message is for a broadcasted SIB, as act 11-5a the wireless terminal may wait until the next modification period boundary and then start the SIB reception procedure (as act 11-6) as disclosed earlier. If it were determined at act 19-4a that the Paging message indicating an SIB change is for an on-demand SIB, the wireless terminal 26-17 does not wait for the next modification period boundary, but instead begins performance of the SIB request procedure (act 19-11). If the SIB request procedure of act 19-11 is successful (act 19-12), the wireless terminal 26-17 waits for the next modification period boundary (act 19-5b). After occurrence of the next modification period boundary, the wireless terminal 26-17 may start the SIB reception procedure (act 19-6) for the on-demand SIB. If the SIB request procedure of act 19-11 is unsuccessful, or if the SIB reception procedure is determined (at act 19-7) to be unsuccessful, cell reselection is performed (act 19-9). If the SIB reception procedure is successful, the procedure of FIG. 19 is terminated (act 19-10).

Thus, in the case of FIG. 19, the wireless terminal does not wait for the next modification period boundary before starting the SIB request procedure, but initiates the SIB request procedure (act 19-11) before the next modification period boundary. When the SIB request procedure is completed successfully, the wireless terminal 26-17 may proceed to SIB reception procedure (act 19-7).

Figure 20:
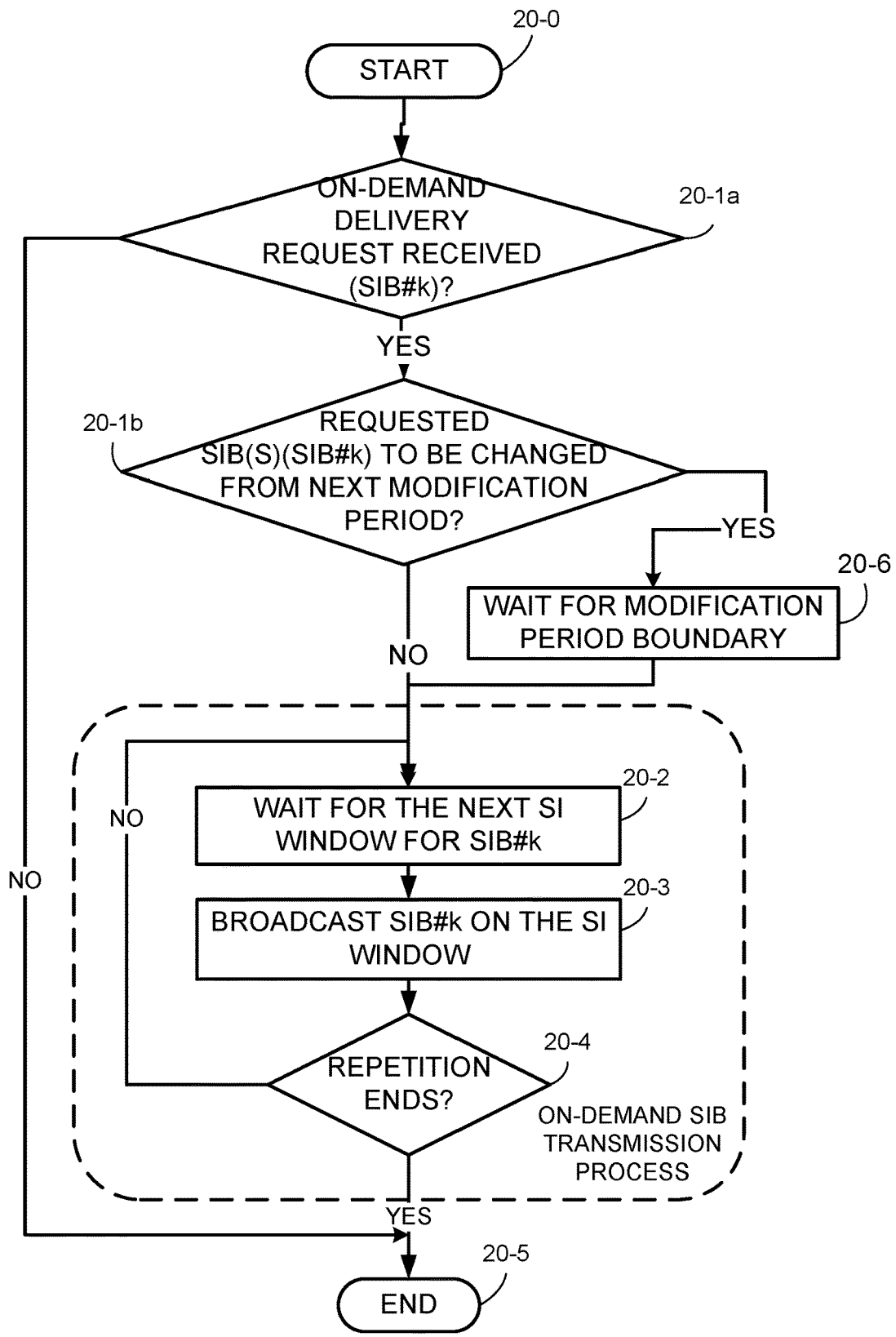
FIG. 20 is a flowchart showing example basic acts or steps executed by an access node of FIG. 17 receiving an on-demand SIB delivery request from a wireless terminal.

FIG. 20 shows example, representative acts or steps performed by the access node 22-17 of FIG. 17. The operation for the access node 22-17 of FIG. 17 is similar to the node 22 of FIG. 2, and the acts thereof resemble those of FIG. 12 but with additional acts as shown in FIG. 20. In particular, if as act 20-1a the access node 22-17 determines that it has not received a request for an on-demand SIB, the access node 22-17 may end the procedure of FIG. 20 (act 20-5). But if the access node 22-17 has received a request for an on-demand SIB (e.g., SIB#k), as act 20-1b the access node 22-17 next determines whether the content of the requested on-demand SIB is to be changed from the next modification period. If the content of the requested on-demand SIB is not to be changed from the next modification period, the access node 22-17 may proceed to the on-demand SIB transmission process as shown by act 20-3. As shown by act 20-2, the access node 22 may wait for the next SI window for SIB#k, then (as act 20-3) broadcast the SIB#k on the window. The access node may repeat broadcasting on the following SIB#k SI windows for multiple times until repetition ends (as shown by act 20-4). The number of repetitions may be pre-configured, or equal to the aforementioned maximum counter value configured to wireless terminals via system information. If, however, the content of the requested on-demand SIB is to be changed from the next modification period, as act 20-6 the access node 22-17 waits for the modification period boundary before performing the on-demand SIB transmission process comprising acts 20-2, 20-3 and 20-4.

Thus, the acts of the access node 22-17 as shown in FIG. 20 are based on FIG. 12 but include, e.g., an act of waiting for the next modification boundary is added in case the requested SIB(s) are to be changed at the next modification period boundary. The update of the contents of SIB#k" at the modification period boundary is performed in the act "Update SIB(s)" (act 13-8) in FIG. 13.

It should be understood that the procedures and acts of FIG. 10 and FIG. 13 are applicable to the second embodiment.

Third Example Embodiment

Figure 21:
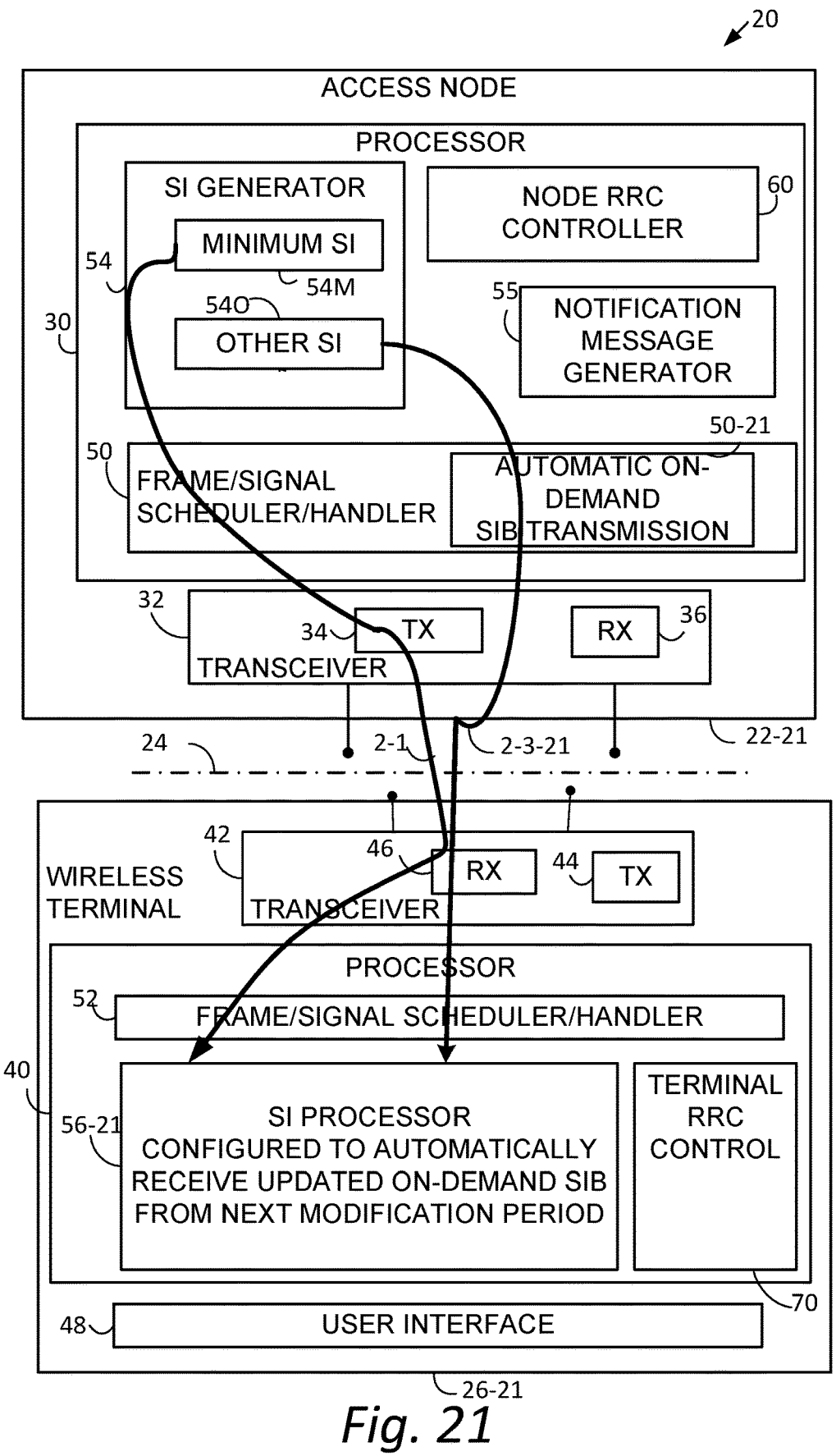
FIG. 21 is a schematic view showing a third embodiment of a communications system comprising a radio access node and a wireless terminal, and wherein the radio access node and the wireless terminal have an agreement that, whenever an on-demand SIB is updated, the access node may notify wireless terminals in the current modification period and automatically transmit the updated SIB at one or more corresponding SI windows from the next modification period, without requiring wireless terminals to send a request.

FIG. 21 shows an example communications system wherein wireless terminal 26-21 and the access node 22-21 have an agreement that whenever an on-demand SIB is updated, the access node 22-21 may notify wireless terminals in the current modification period and automatically transmit the updated SIB at one or more corresponding SI windows from the next modification period, without requiring wireless terminals to send a request. As such, the terminal processor 40 comprises SIB processor 56-21 which is configured to automatically receive (without terminal request) an updated on-demand SIB(s) from the next modification period. FIG. 21 shows such automatic transmission of the updated SIB as message(s) 2-3-21. The access node 22-21 includes functionality 50-21 which, when permitted and/or agreed, automatically transmits on-demand SIBs without requiring terminal request. Other elements and functions of the wireless terminal 26-21 and the access node 22-21 are similar to and understood from the preceding descriptions, e.g., the description of FIG. 2, for example.

In one example implementation and configuration, this agreement may be pre-configured in the wireless terminal 26-21 and the access node 22-21. In another configuration, an information element indicating whether the automatic transmission of the on-demand SIB may take place from the next modification period is present in a signaling message from the access node 22-21. In one implementation such an information element may be in a Paging message, such as paging message of act 22-2 in FIG. 22, or may be in Minimum SI (e.g. MIB, SIB1, etc.)

Figure 22:
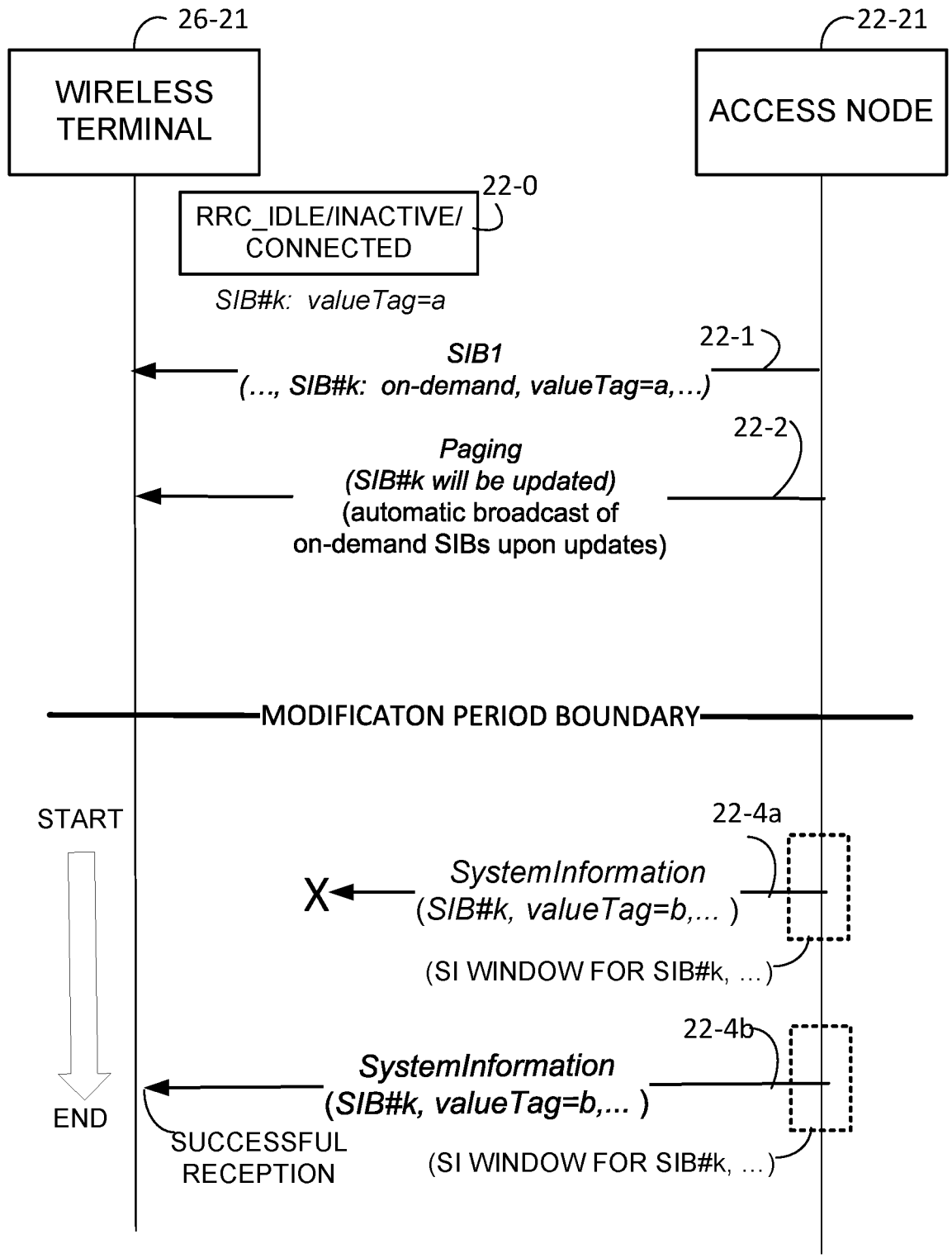
FIG. 22 is a diagrammatic view illustrating an exemplary message flow for the embodiment of FIG. 21.

FIG. 22 shows example, representative acts or steps performed in the communications network of FIG. 21, e.g., by access node 22-21 and wireless terminal 26-21, and example messages transmitted therebetween. For the third example embodiment and mode, the wireless terminal may be in any of the RRC states, and (as indicated by act 22-0) already stores the content of SIB#k with valueTag=a. In this example, as shown by act 22-1, the SIB1 that wireless terminal may receive indicates that the SIB#k is to be delivered on-demand basis, and that the current up-to-date version (value tag) of SIB#k is value Tag=a. Since the wireless terminal already stored the same version of SIB#k, it need not take any action with regard to the acquisition of SIB#k.

Eventually, as indicated by act 22-2, the wireless terminal 26-22 receives a Paging message (which may corresponding somewhat to NM* in FIG. 7) which may indicate that SIB#k will be updated from the next modification period. As discussed above the paging message of act 22-2 may include an indication (e.g., an information element) that specifies that the on-demand SIBs will be automatically broadcast when updated. Therefore, in view of the fact that SIB#k will be updated from the next modification period and in view of the fact that in the FIG. 22 example embodiment and mode the updated SIB will be automatically provided without requiring request by the wireless terminal 22-21, the wireless terminal 26-21 may, after the next modification period boundary, start the SIB reception procedure without having to make any request for the updates. The SIB reception procedure has duration indicated by the vertical arrow of FIG. 22, wherein the arrow tail indicates start of the SIB reception procedure and the arrow head indicates end of the SIB reception procedure. Acts 22-4a and 22-4b comprise acts of the SIB reception procedure which is performed as a result of the SIB request procedure. Act 22-4a shows an unsuccessful reception of SIB#k; act 22-4b shows a successful reception of SIB#k. The wireless terminal 26-21 may monitor such SI windows until one of the aforementioned termination conditions satisfies. For example, upon successful receipt of the SystemInformation message of act 22-4 the wireless terminal 26-21 may end its SIB reception procedure, having received the sought SIB#k with valueTag=b.

Figure 23:
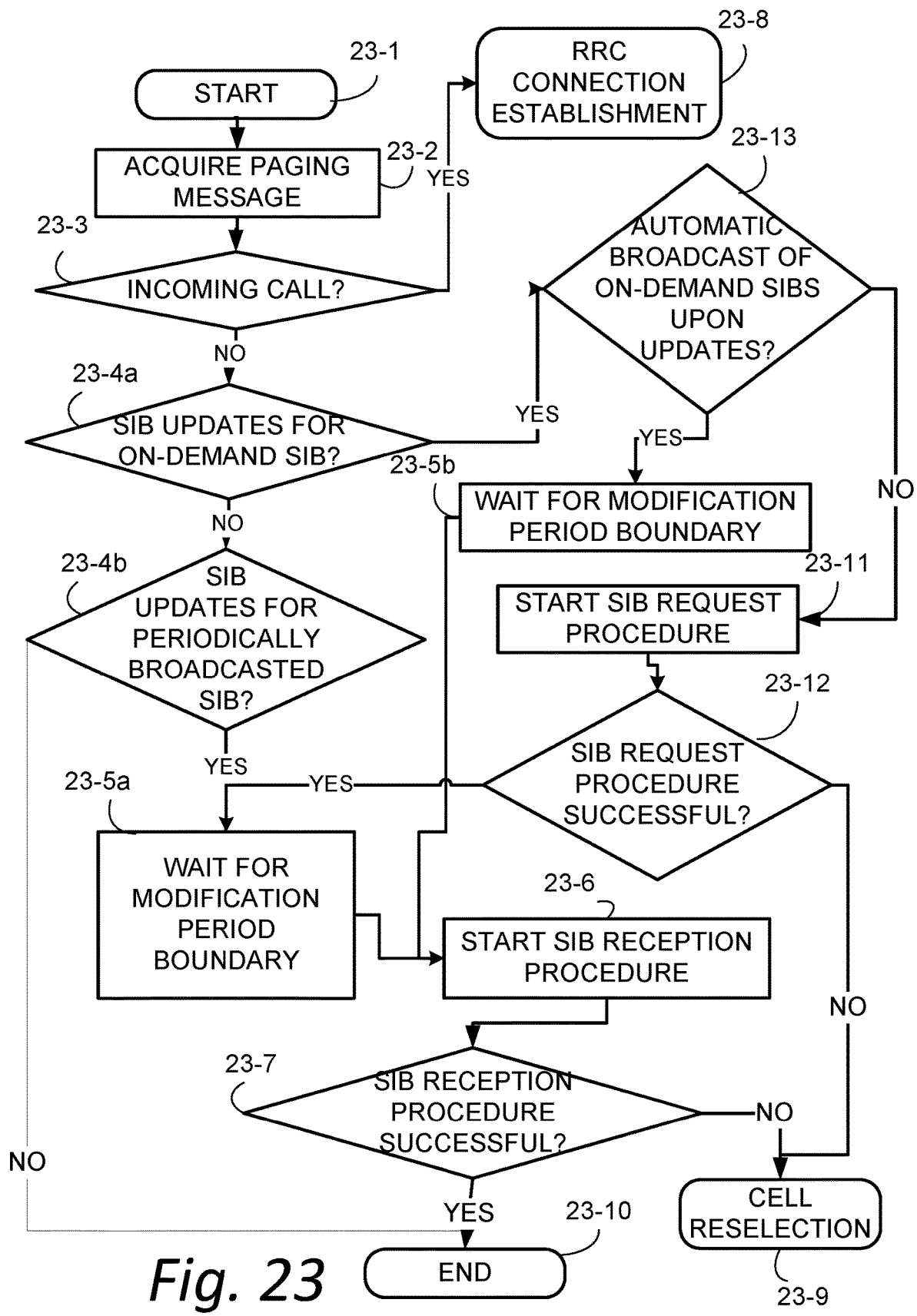
FIG. 23 is flowchart showing example, representative, acts or steps performed by a wireless terminal of FIG. 21 upon receiving the Paging message.

FIG. 23 shows example acts or steps performed by the wireless terminal 26-21 of FIG. 21, and also serves an example operational flow diagram of the wireless terminal for the second embodiment. FIG. 23 resembles FIG. 19 with additional acts. In FIG. 23, if the SIB update notified by the Paging message is on-demand, and the eNB indicates that the automatic broadcast of the SIB(s) will take place after the next modification period boundary, the wireless terminal may simply wait for the boundary and then start the SIB reception process.

In particular, act 23-2 of FIG. 23 show wireless terminal 26-23 receiving a Paging message. As act 23-3 the wireless terminal checks if the Paging message indicates an incoming call to this wireless terminal. If so, then the wireless terminal may proceed to RRC connection establishment (act 23-8). Otherwise the wireless terminal may further check if the message indicates any SIB changes to be scheduled. Two checks may be performed: as act 23-4a the wireless terminal 26-23 may check if the Paging message indicates that the SIB update is for an on-demand SIB; as act 23-4b the wireless terminal 26-23 may check if the Paging message indicates that the SIB update is for a broadcasted SIB. If the Paging message is not for an on-demand SIB, e.g., if the decision of act 23-4a is negative, the check of act 23-4b is performed. Moreover, if the decision of act 23-4b is positive, e.g., if the Paging message is for a broadcasted SIB, as act 23-5a the wireless terminal may wait until the next modification period boundary and then start the SIB reception procedure (as act 23-6) as disclosed earlier.

If it were determined at act 23-4a that the Paging message indicating an SIB change is for an on-demand SIB, as act 23-13 the wireless terminal 26-23 checks whether there is agreement or understanding for an automatic broadcast of on-demand SIBs upon updates. If the check of act 23-13 is positive, i.e., if the access node 22-23 can and does supply such automatic broadcast and the wireless terminal 26-23 can accept same, the wireless terminal 26-23 performs act 23-5b to wait for the next modification period boundary and then, after such boundary, starts the SIB reception procedure (act 23-6). If the check of act 23-13 is negative, i.e., if the access node 22-23 does not or cannot supply such automatic broadcast, as act 23-11 the wireless terminal 26-23 may begin the SIB request procedure. If it is determined at act 23-12 that the SIB request procedure of act 23-11 is successful, the wireless terminal 26-17 waits for the next modification period boundary (act 23-5a). After occurrence of the next modification period boundary, the wireless terminal 26-17 may start the SIB reception procedure (act 23-6) for the on-demand SIB. If the SIB request procedure of act 23-11 is unsuccessful, or if the SIB reception procedure is determined (at act 23-7) to be unsuccessful, cell reselection is performed (act 23-9). If the SIB reception procedure is successful, the procedure of FIG. 23 is terminated (act 23-10).

Figure 24:
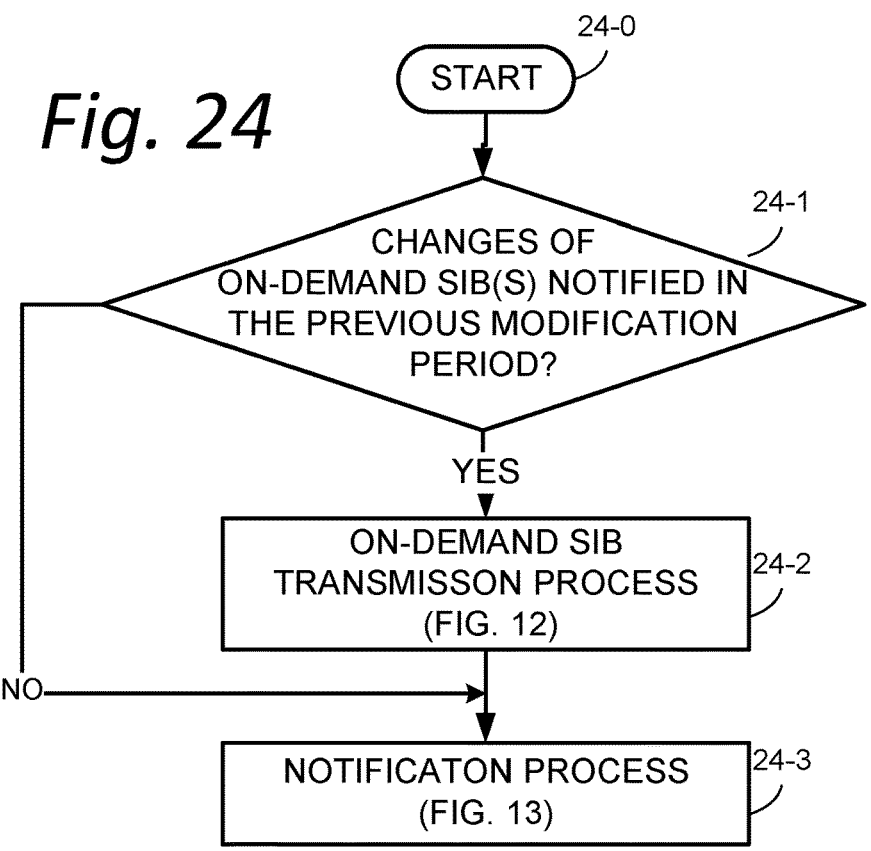
FIG. 24 is a flowchart showing example basic acts or steps executed by an access node of FIG. 21 receiving an on-demand SIB delivery request from a wireless terminal.

FIG. 24 is an example operational flow diagram of the access node notifying an upcoming SIB changes to wireless terminals for this embodiment, which is based on FIG. 13 with additional steps. At the beginning of every modification period, as act 24-1 the access node 22-21 may check if changes of on-demand SIB(s) have been notified in the previous modification period. If so, as act 24-2 the access node 22-21 may initiate the on-demand SIB transmission process shown in FIG. 12, and then proceed to the notification operation shown in FIG. 13 as represented by act 24-3 of FIG. 24. Otherwise, if the determination of act 24-1 is negative, the access node 22-21 may directly proceed to the operation shown in FIG. 13. It should be understood that the on-demand SIB transmission process and the notification operation may be conducted in parallel.

It should be understood that the procedures and acts of FIG. 10 may be applicable to the third embodiment.

Fourth Example Embodiment

Figure 25:
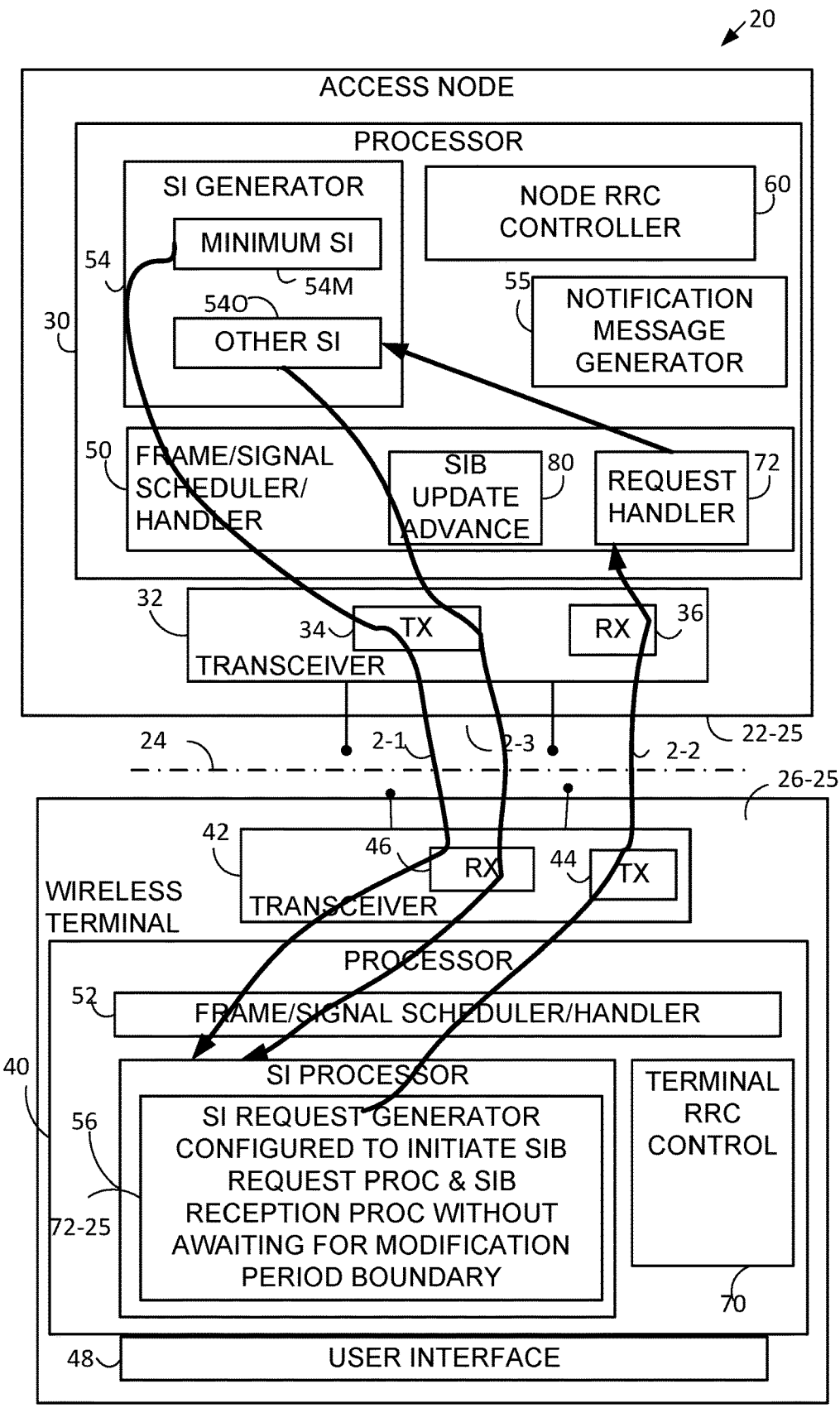
FIG. 25 is a schematic view showing a third embodiment of a communications system comprising a radio access node and a wireless terminal, and wherein the wireless terminal is configured, when appropriate, to initiate both the SIB request procedure and the SIB reception procedure for an on-demand SIB without waiting for the next modification period boundary.

FIG. 25 shows an example communications system wherein, when receiving an on-demand SIB request while the requested SIB(s) is to be changed after the next modification period boundary, the access node 22-25 is allowed, if possible (e.g. if there are SI windows scheduled before the boundary), to transmit the requested SIB(s) with updated contents and new value tag(s) before the next modification period boundary. The wireless terminal of this embodiment and mode, prior to the next modification period boundary, may start the SIB request procedure after receiving the Paging message notifying on-demand SIB changes and may also start the SIB reception procedure following the successful completion of the SIB request procedure. This may result in the wireless terminal monitoring SI windows of the requested SIB(s) even prior to the boundary, and ending the SIB reception process when successfully receiving the requested SIB(s) with the new value tag(s). As such, FIG. 25 shows the terminal processor 40 comprises request generator 72-25 which is configured, when appropriate, to initiate both the SIB request procedure and the SIB reception procedure for an on-demand SIB without waiting for the next modification period boundary.

FIG. 25 further shows access node 22-25 as comprising an SIB update advance feature 80. As indicated above, in the fourth example embodiment and mode the access node 22-25 may transmit the requested SIB(s) with updated contents and new value tag(s) before the next modification period boundary. It should be understood that the updated contents of the SIB(s) will not take effect until the next modification period boundary, and cannot be utilized by the wireless terminal 26-25 until the next modification period boundary. However, in order to give the wireless terminal 26-25 a jump on processing, the access node 22-25 with its SIB update advance feature 80 may provide the requesting wireless terminal 26-25 with the updated SIB contents in advance of the actual change over which will occur at the modification period boundary. Therefore, "updated" in this context does not necessarily imply that the contents is the currently usable contents, but rather the contents that will be usable at the next modification period boundary.

Other elements and functions of the wireless terminal 26-25 and the access node 22 are similar to and understood from the preceding descriptions, e.g., including but not limited to the descriptions of FIG. 2, FIG. 14, FIG. 17, and FIG. 21.

Figure 26:
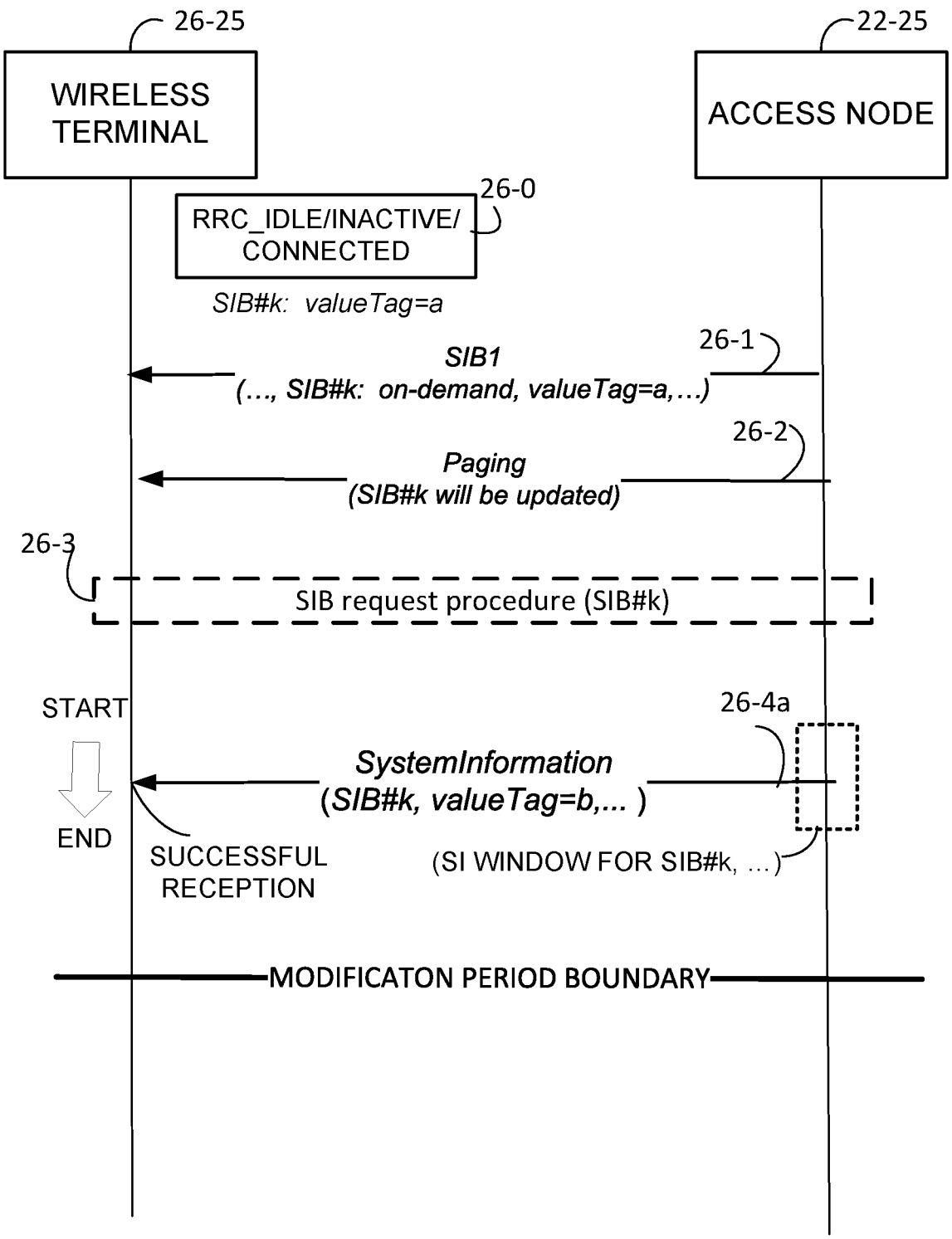
FIG. 26 is a diagrammatic view illustrating an exemplary message flow for the embodiment of FIG. 25.

FIG. 26 shows example, representative acts or steps performed in the communications network of FIG. 25, e.g., by access node 22-25 and wireless terminal 26-25, and example messages transmitted therebetween. In particular, FIG. 26 is an example case where the wireless terminal 26-25 successfully ends the SIB reception process before the next modification period boundary. The SIB reception process, in some scenarios, may continue beyond the boundary until one of the aforementioned termination conditions.

For the fourth example embodiment and mode, the wireless terminal may be in any of the RRC states, and (as indicated by act 26-0) already stores the content of SIB#k with valueTag=a. In this example, as shown by act 26-1, the SIB1 that wireless terminal may receive indicates that the SIB#k is to be delivered on-demand basis, and that the current up-to-date version (value tag) of SIB#k is valueTag=a. Since the wireless terminal already stored the same version of SIB#k, it need not take any action with regard to the acquisition of SIB#k.

Eventually, as indicated by act 26-2, the wireless terminal 26-25 receives a Paging message (corresponding to NM* in FIG. 7) which may indicate that SIB#k will be updated from the next modification period. The wireless terminal 26-25 does not wait for the next modification period boundary, but before the next modification period boundary begins to initiate the SIB request procedure (represented as act 26-3) to request on-demand delivery of SIB#k. If the SIB request procedure is successful, without waiting for the next modification period boundary, the access node may transmit SIB#k in one or more SI windows associated with SIB#k as part of an SIB reception procedure. The SIB reception procedure has duration indicated by the vertical arrow of FIG. 26, wherein the arrow tail indicates start of the SIB reception procedure and the arrow head indicates end of the SIB reception procedure. Without waiting for the next modification period boundary, the wireless terminal 26-25 may monitor such SI windows until one of the aforementioned termination conditions satisfies. For example, upon successful receipt of the SystemInformation message of act 26-4*a* the wireless terminal 26-25 may end its SIB reception procedure, having received the sought SIB#k with valueTag=b.

Figure 27:
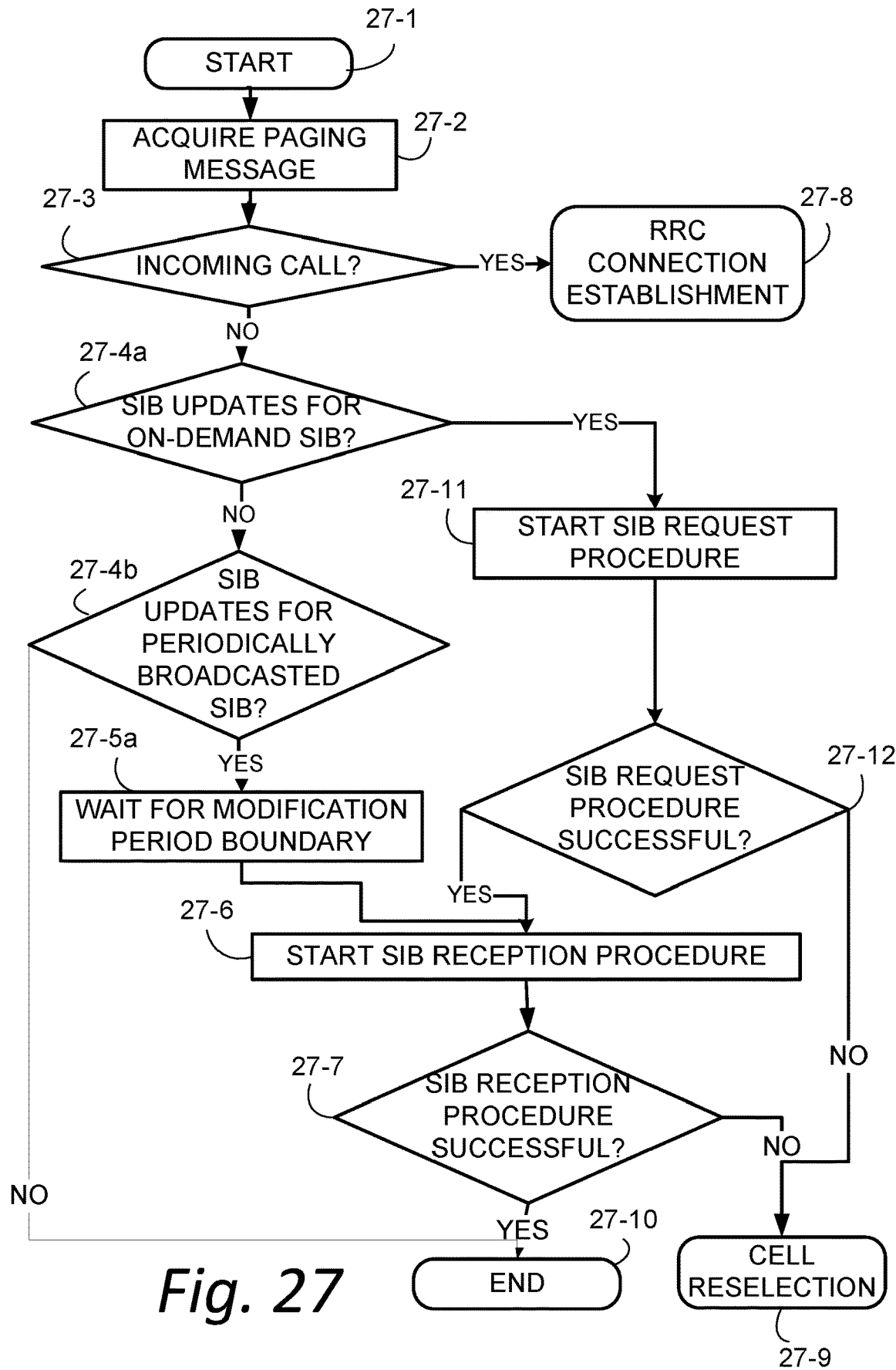
FIG. 27 is flowchart showing example, representative, acts or steps performed by a wireless terminal of FIG. 25 upon receiving the Paging message.

FIG. 27 shows example acts or steps performed by the wireless terminal 26-25 of FIG. 25, and also serves an example operational flow diagram of the wireless terminal for the fourth embodiment. FIG. 27 is similar to FIG. 19, except that both the SIB request procedure and the SIB reception procedure may be initiated before the next modification period boundary. Act 27-2 of FIG. 19 show wireless terminal 26-25 receiving a Paging message. As act 27-3 the wireless terminal checks if the Paging message indicates an incoming call to this wireless terminal. If so, then the wireless terminal may proceed to RRC connection establishment (act 27-8). Otherwise the wireless terminal may further check if the message indicates any SIB changes to be scheduled. Two checks may be performed: as act 27-4*a* the wireless terminal 26-17 may check if the Paging message indicates that the SIB update is for an on-demand SIB; as act 27-4*b* the wireless terminal 26-25 may check if the Paging message indicates that the SIB update is for a broadcasted SIB. If the Paging message is not for an on-demand SIB, e.g., if the decision of act 27-4*a* is negative, the check of act 27-4*b* is performed. Moreover, if the decision of act 27-4*b* is positive, e.g., if the Paging message is for a broadcasted SIB, as act 11-5*a* the wireless terminal may wait until the next modification period boundary and then start the SIB reception procedure (as act 27-6) as disclosed earlier.

If it were determined at act 27-4*a* that the Paging message indicating an SIB change is for an on-demand SIB, the wireless terminal 26-25 does not wait for the next modification period boundary, but instead begins performance of the SIB request procedure (act 27-11). Thereafter, if the SIB request procedure of act 27-11 was successful, the wireless terminal 26-17 may start the SIB reception procedure (act 27-6) for the on-demand SIB without waiting for the modification period boundary. If the SIB request procedure of act 27-11 is unsuccessful, or if the SIB reception procedure is determined (at act 27-7) to be unsuccessful, cell reselection is performed (act 27). If the SIB reception procedure is successful, the procedure of FIG. 19 is terminated (act 27-10).

Thus, in the case of FIG. 27, the wireless terminal does not wait for the next modification period boundary before starting the SIB request procedure, and if the SIB request procedure is successful, need not even wait for the modification period boundary for performing the SIB reception procedure.

Figure 28:
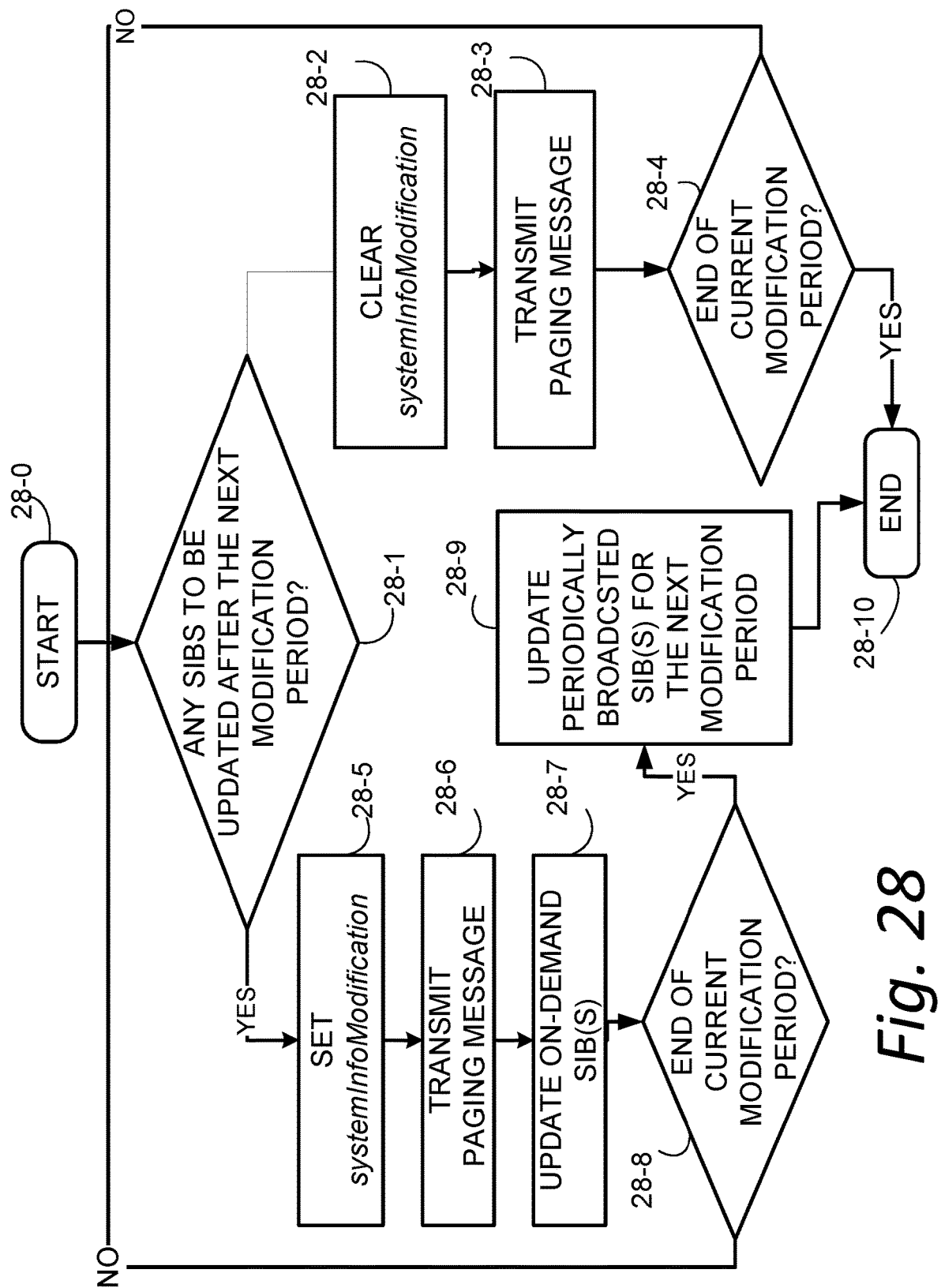
FIG. 28 is a flowchart showing example basic acts or steps executed by an access node of FIG. 25 receiving an on-demand SIB delivery request from a wireless terminal.

FIG. 28 is an example operational flow diagram of the access node 22-25 notifying an upcoming SIB changes to wireless terminals for this embodiment, which is similar to FIG. 13 but with a difference is that the on-demand SIB(s) to be updated is updated without waiting for the end of the current modification boundary. This allows the access node to send, when requested, such on-demand SIB(s) with updated contents even before the next modification boundary. Act 28-1 of FIG. 28 shows a check to determine if any SIBS are to be updated after the next modification period. When there is no SIB change scheduled, as shown by act 28-2 the systemInfoModification of the message is cleared (no indication of changes). Thereafter a paging message may be transmitted as indicated by act 28-3. When the access node decides to change some of the SIB types, as act 28-5 the information element may be set accordingly to indicate SIB types to be changed, based on the format depicted in FIG. 8A or FIG. 8B. Access node 22-25 may continue sending the Paging message with the information element set (as indicated by act 28-6) until the end of the current modification period (as determined at act 28-8). As indicated by act 28-7, the access node 22-25 may update the on-demand SIBs before the next modification period boundary. At the next modification period boundary, where the SIB changes take effective, the access node may update the periodically broadcasted SIBs for the next modification period as shown by act 28-9.

It should be understood that the procedures and acts of FIG. 10 and FIG. 12 may be applicable to the fourth embodiment.

Fifth Example Embodiment

Figure 29:
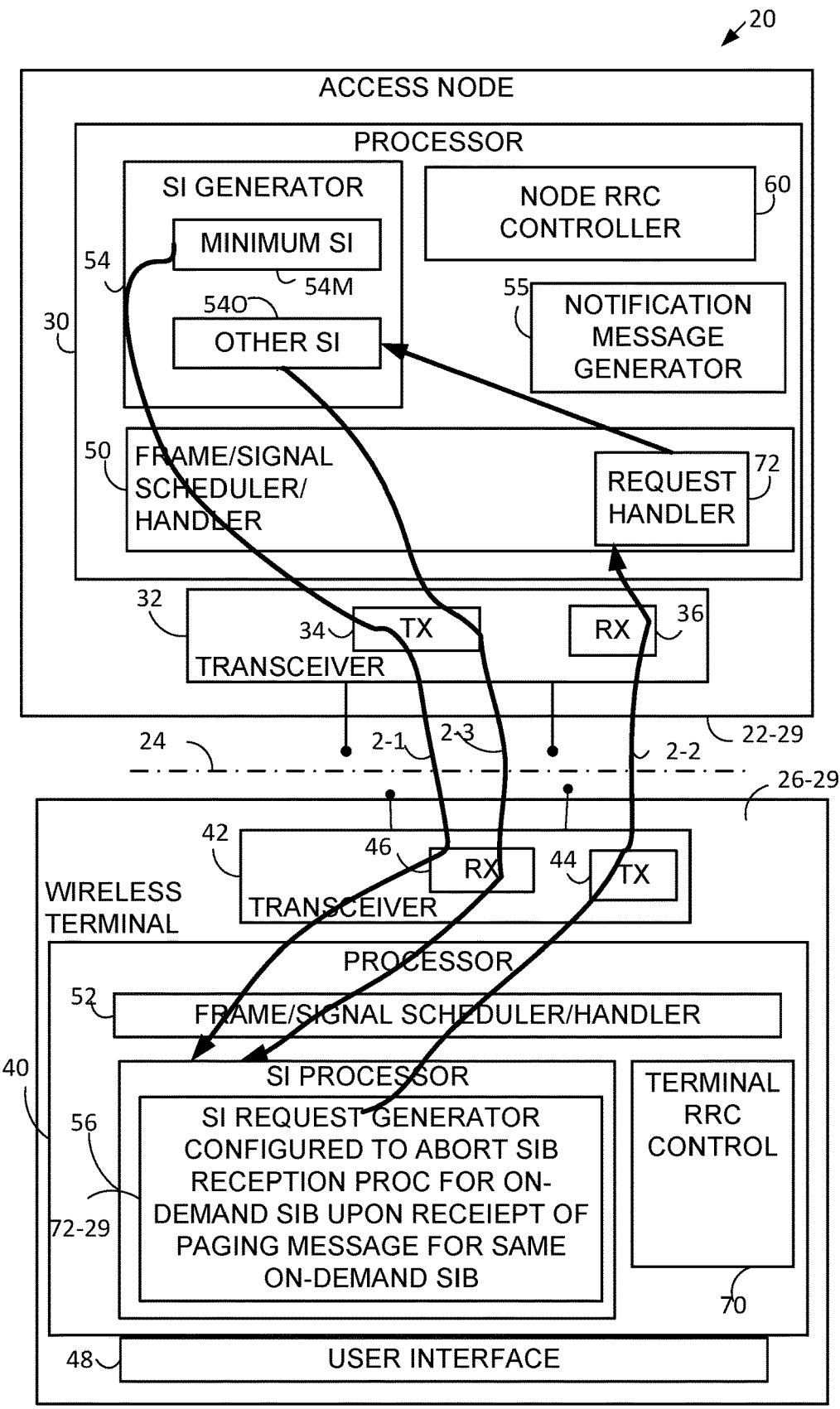
FIG. 29 is a schematic view showing a third embodiment of a communications system comprising a radio access node and a wireless terminal, and wherein a Paging message notifying changes of on-demand SIB(s) is received after an SIB request procedure requesting the same on-demand SIB(s).

FIG. 29 shows an example communications system which deals with a situation in which a Paging message notifying changes of on-demand SIB(s) is received after an SIB request procedure requesting the same on-demand SIB(s). As such, FIG. 29 shows the terminal processor 40 comprises request generator 72-29 which is configured, when appropriate, to abort the SIB reception procedure for an on-demand SIB if, after commence of the SIB reception procedure and before the next modification period boundary, a paging message is received that indicates that the same on-demand SIB will be (further) updated at the next modification period boundary. Other elements and functions of the wireless terminal 26-29 and the access node 22-29 are similar to and understood from the preceding descriptions, e.g., including but not limited to the descriptions of FIG. 2, FIG. 14, FIG. 17, FIG. 21, and FIG. 25.

Figure 30:
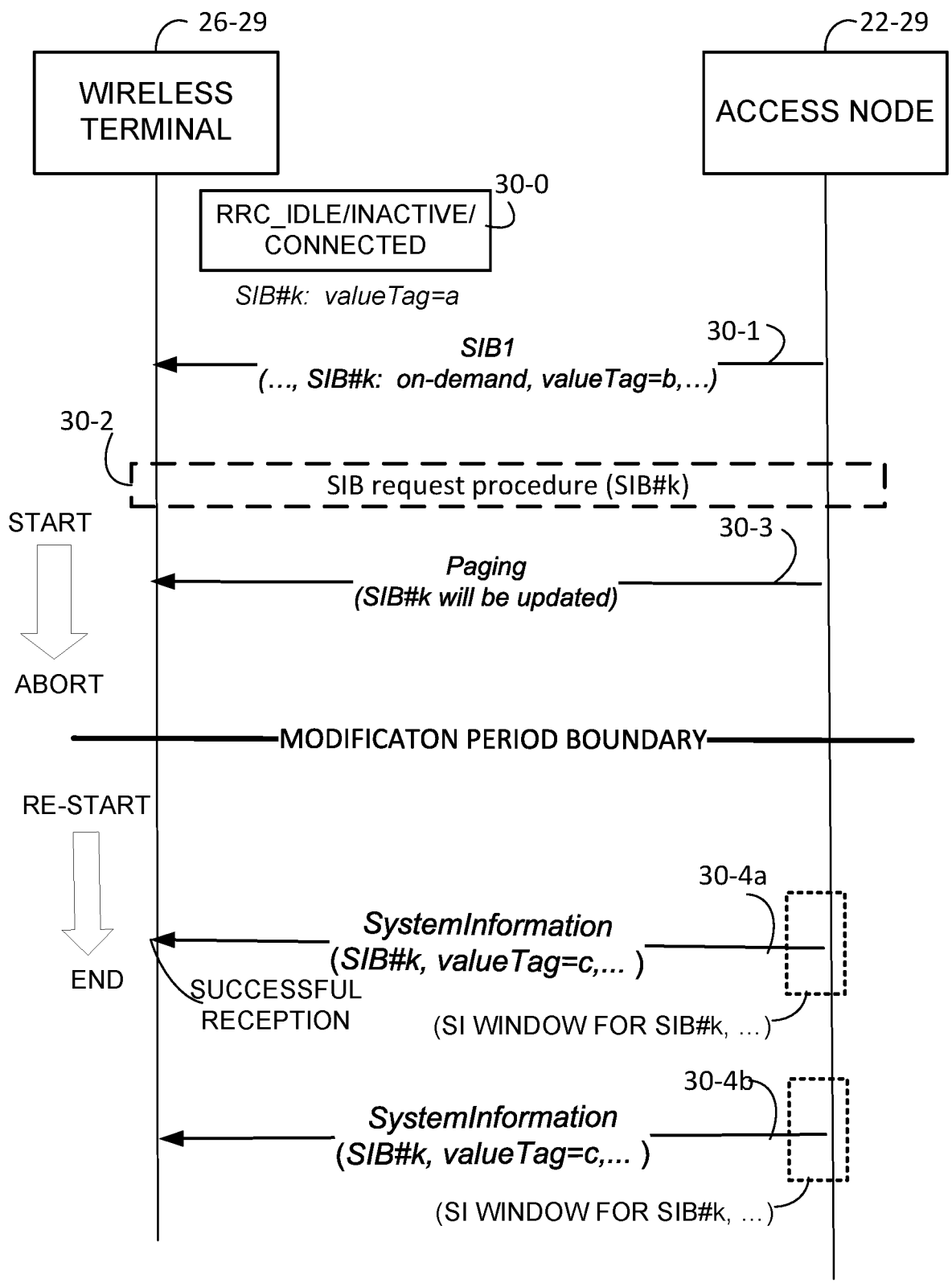
FIG. 30 is a diagrammatic view illustrating an exemplary message flow for the embodiment of FIG. 29.

FIG. 30 shows example, representative acts or steps performed in the communications network of FIG. 29, e.g., by access node 22-29 and wireless terminal 26-29, and example messages transmitted therebetween. In the example message flow shown in FIG. 30, the wireless terminal 26-29 initiates the SIB request procedure of act 30-2 to request SIB#k, since (as shown by act 30-0) this wireless terminal 26-29 previously received and stored SIB#k with valueTag=a and then more recently (as shown by act 30-1) received SIB1 indicating the valueTag=b is the currently valid version for SIB#k. So the SIB request procedure of act 30-2 is intended to obtain the SIB1 with the valueTag=b. The SIB request procedure of act 30-2, being successful, was followed by a first SIB reception procedure which is depicted with reference to the top vertical arrow of FIG. 30. The first SIB reception procedure began at a time corresponding to the tail of the top vertical arrow. But during the first SIB reception procedure, e.g., in the middle of SIB reception procedure following the successful completion of the SIB request procedure, the wireless terminal 26-29 has received the Paging message of act 30-3. The paging message of act 30-3 indicating that SIB#k will be updated at the next modification period boundary. As a result of receiving the paging message of act 30-3, wireless terminal 26-29 may abort the first SIB reception procedure, at a time approximately shown by the head of the top vertical arrow. The wireless terminal 26-29 then waits until the next modification period boundary, and thereafter restart the SIB reception procedure at a time corresponding to the tail of the second vertical arrow of FIG. 30. During the second (re-started) SIB reception procedure the wireless terminal 26-29 is shown as successfully receiving the systemInformation message of act 30-41, which includes the SIB with valueTag=c. Thus, by aborting the first SIB reception procedure, which was only going to provide the SIB with valueTag=b, the wireless terminal 26-29 has been able instead to procure the more updated SIB with valueTag=c, and as a result has saved both time and processing power.

Figure 31:
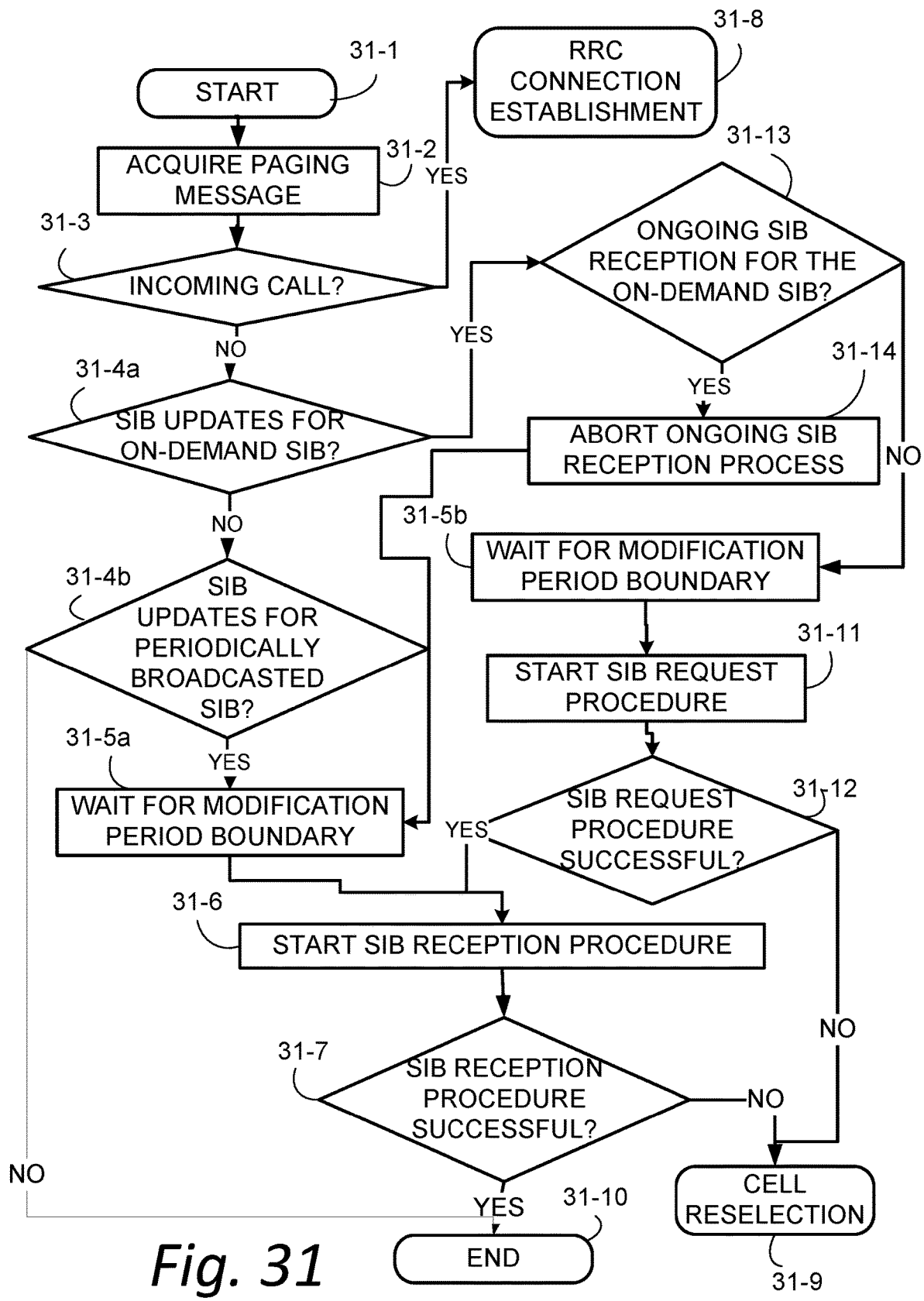
FIG. 31 is flowchart showing example, representative, acts or steps performed by a wireless terminal of FIG. 29 upon receiving the Paging message.

FIG. 31 shows an example operational flow diagram of the wireless terminal upon receiving the Paging message for this embodiment, where additional acts are added to previous procedures in order to abort an ongoing SIB reception procedure if the Paging message indicates upcoming updates of on-demand SIB(s) which the ongoing SIB reception process is currently trying to acquire. In particular, act 31-2 of FIG. 23 show wireless terminal 26-29 receiving a Paging message. As act 31-3 the wireless terminal checks if the Paging message indicates an incoming call to this wireless terminal. If so, then the wireless terminal may proceed to RRC connection establishment (act 31-8). Otherwise the wireless terminal may further check if the message indicates any SIB changes to be scheduled. Two checks may be performed: as act 31-4a the wireless terminal 26-31 may check if the Paging message indicates that the SIB update is for an on-demand SIB; as act 31-4b the wireless terminal 26-31 may check if the Paging message indicates that the SIB update is for a broadcasted SIB. If the Paging message is not for an on-demand SIB, e.g., if the decision of act 31-4a is negative, the check of act 31-4b is performed. Moreover, if the decision of act 31-4b is positive, e.g., if the Paging message is for a broadcasted SIB, as act 31-5a the wireless terminal may wait until the next modification period boundary and then start the SIB reception procedure (as act 31-6) as disclosed earlier.

If it were determined at act 31-4a that the Paging message indicating an SIB change is for an on-demand SIB, as act 31-13 the wireless terminal 26-31 checks whether there is an on-going SIB reception for the (same) on-demand SIB. If the check of act 31-13 is positive, as act 31-14 the wireless terminal 26-31 aborts the on-going SIB reception for the (same) on-demand SIB. Then, as act 31-5*a*, the wireless terminal 26-31 waits for the next modification period boundary. After such boundary, the wireless terminal 26-29 performs the SIB reception procedure (act 31-6). If the check of act 31-13 is negative, i.e., if there is not an on-going SIB reception for the (same) on-demand SIB, the wireless terminal 29-31 continues with the wait of act 31-5*b*, and thereafter starts the SIB request procedure (act 31-11). If the SIB request procedure of act 31-11 is unsuccessful, or if the SIB reception procedure is determined (at act 31-7) to be unsuccessful, cell reselection is performed (act 31-9). If the SIB reception procedure is successful, the procedure of FIG. 31 is terminated (act 31-10).

It should be understood that the procedures and acts of FIG. 11, FIG. 13, and FIG. 20 are applicable to the fifth embodiment.

Sixth Example Embodiment

The technology disclosed in the sixth and seventh example embodiments and modes concerns, e.g., apparatus, methods, and procedures for obtaining and/or updating SIBs in/of Other SI (Other SI SIBs) in an on-demand basis, and particularly when the wireless terminal has received a notification of a change of Minimum SI. For example, a change of Minimum SI may comprise a change in the types of system information that comprise the first type SIB or the SIB1, e.g., a change of format or content of the first system information block SIB1, such as a change in which parameters are included in SIB1 and/or value of a parameter included in SIB1. Such a parameter may be, for an example, an indication of how a particular piece of system information is transmitted (e.g., via periodic broadcast or on-demand). Both the sixth and seventh example embodiments and modes deal with situations in which such notification of a change of Minimum SI is received after a wireless terminal has initiated a SIB request procedure to request (what has at least previously been) an on-demand SIB(s). In the sixth and seventh example embodiments and modes the wireless terminal, having received the notification that of a change of Minimum SI, is at least alerted to the possibility that the change of Minimum SI may affect the on-demand SIB that has been requested. That is, the wireless terminal is at least alerted to the possibility that the sought on-demand SIB may (as a result of the change of Minimum SI) transition from an on-demand SIB to a periodically broadcast SIB. If the sought formerly on-demand SIB is indeed changed to periodically broadcast SIB, then the wireless terminal knows that the sought SIB will henceforth be broadcasted so that no special request need be made for the sought SIB. Likewise, the change of the Minimum SI may affect the transmission timing of the requested on-demand SIB. In this case, the wireless terminal may need to change its reception schedule accordingly.

Figure 32:
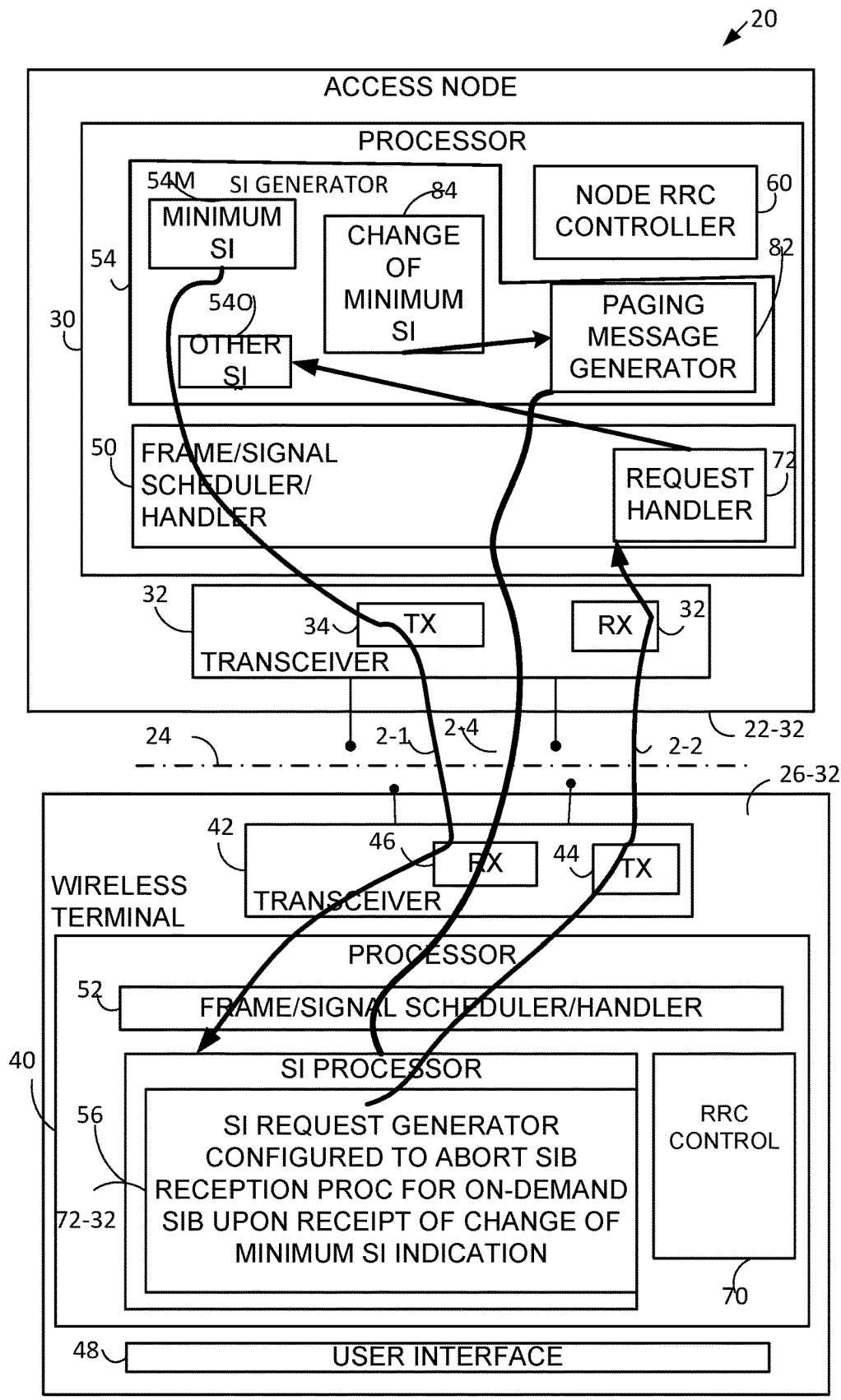
FIG. 32 is a flowchart showing example basic acts or steps executed by an access node of FIG. 29 receiving an on-demand SIB delivery request from a wireless terminal.

FIG. 32 shows an example communications system of the sixth example embodiment and mode which deals with a case wherein a Paging message notifying changes of Minimum SI (e.g. SIB1) is received after the SIB request procedure requesting on-demand SIB(s), and in which the wireless terminal 26-32 may abort the ongoing SIB reception procedure upon receipt of the Paging message. As such, FIG. 32 shows that the access node 22-32 comprises a paging message generator 82 which generates a paging message, as well as a change of Minimum SI functionality 84. When a change in Minimum SI occurs, the Minimum SI functionality 84 causes the paging message generator 82 to include notification of change of Minimum SI in the paging message. An example paging message is shown as message 2-4 in FIG. 32. FIG. 32 further shows the terminal processor 40 comprises request generator 72-32 which is configured, when appropriate, to abort the SIB reception procedure for an on-demand SIB upon reception of a paging message if, after commence of the SIB reception procedure, the paging message indicates a change in Minimum SI. Other elements and functions of the wireless terminal 26-32 and the access node 22-32 are similar to and understood from the preceding descriptions, e.g., including but not limited to the descriptions of FIG. 2, FIG. 14, FIG. 17, FIG. 21, FIG. 25, and FIG. 29.

Figure 33A:
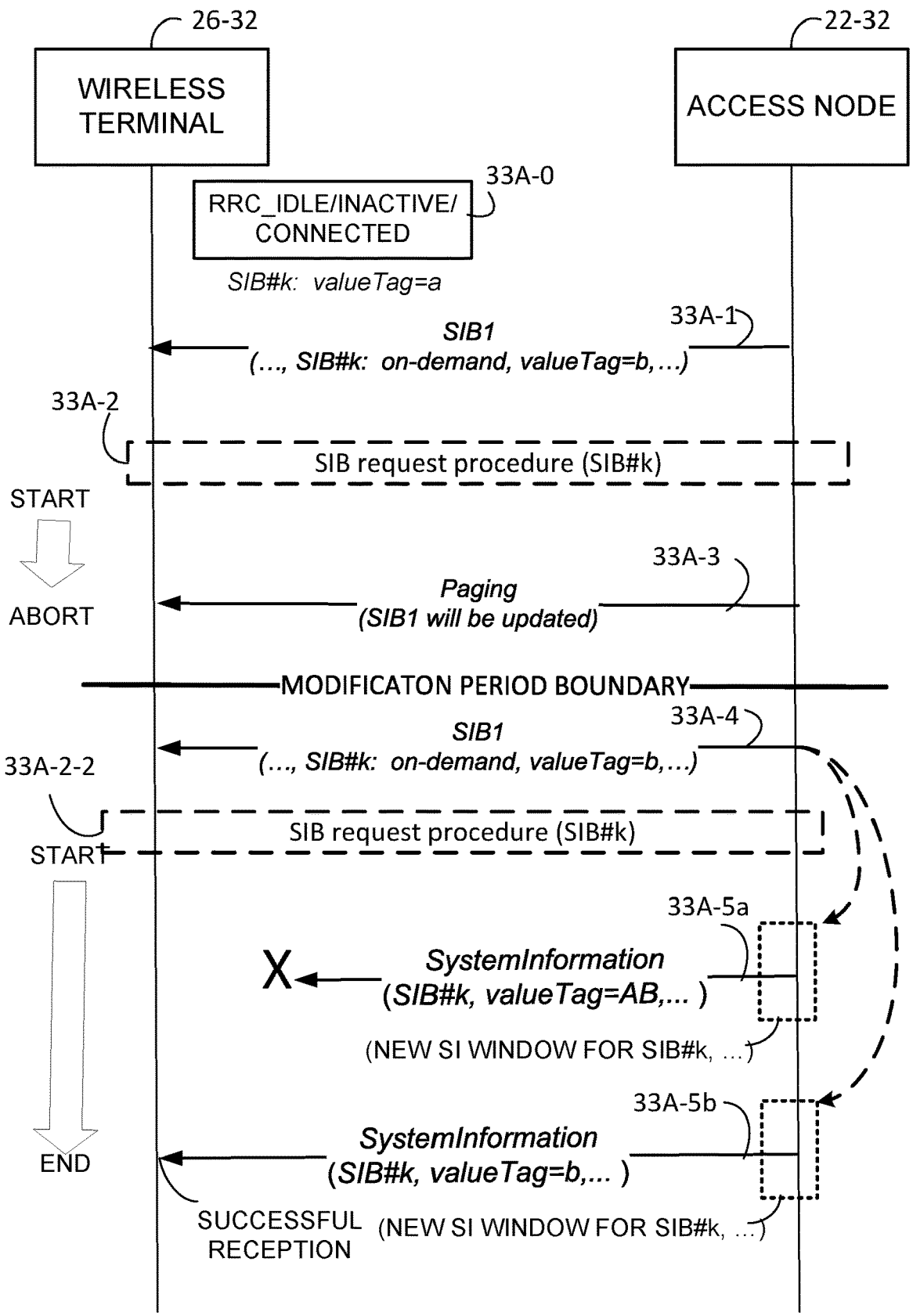
FIG. 33A is a diagrammatic view illustrating an exemplary first scenario message flow for the embodiment of FIG. 32.
Figure 33B:
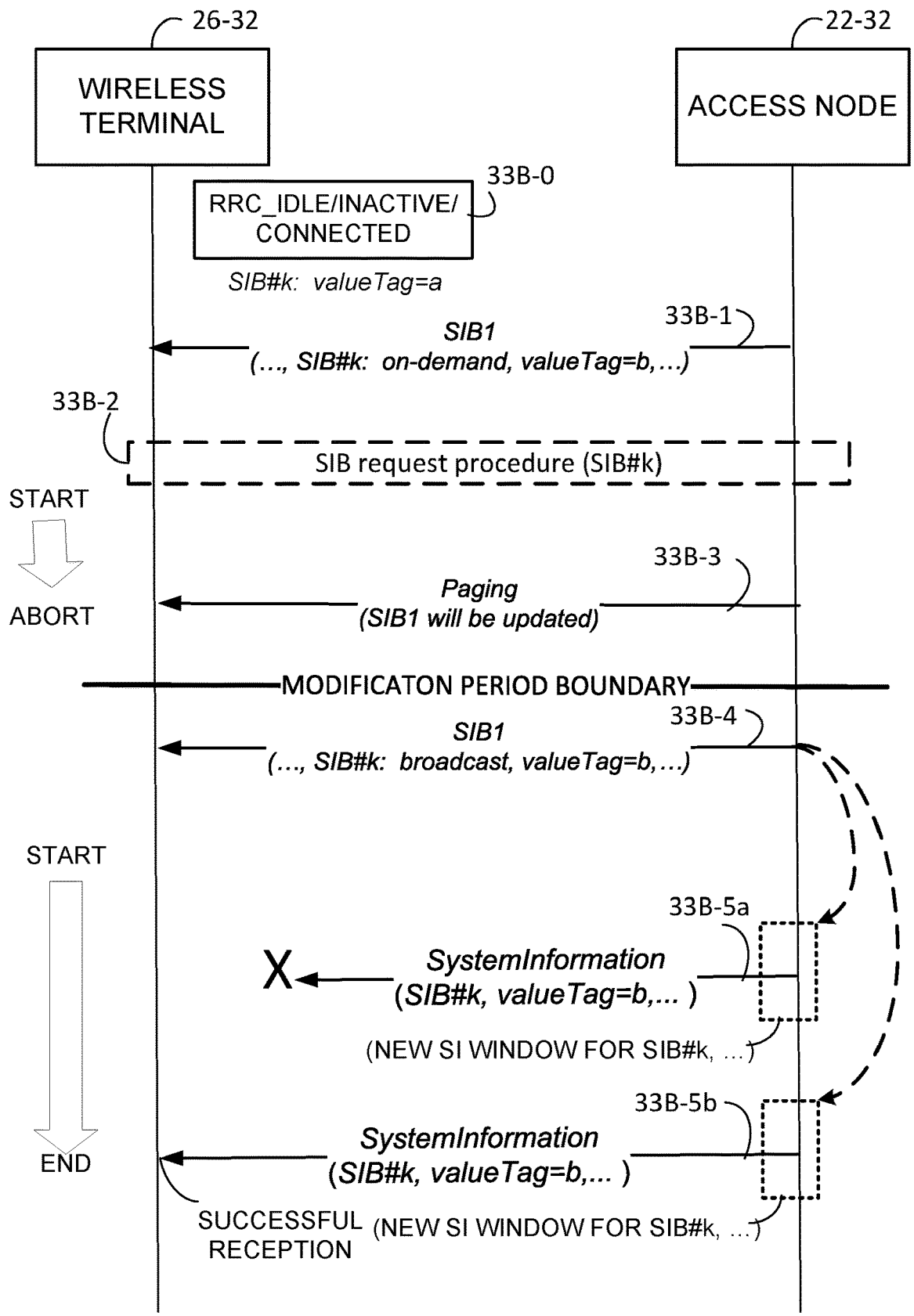
FIG. 33B is a diagrammatic view illustrating an exemplary second scenario message flow for the embodiment of FIG. 32.

Both FIG. 33A and FIG. 33B deal with the case where the Paging message notifying changes of Minimum SI (e.g. SIB1) is received after the SIB request procedure requesting on-demand SIB(s). As shown in FIG. 33A and FIG. 33B, the wireless terminal 26-32 may abort the ongoing SIB reception procedure upon receipt of the Paging message, wait for the next modification boundary then reacquire the updated Minimum SI, which may comprise delivery and scheduling information of the SIB(s) that the wireless terminal has requested in the earlier SIB request procedure. Such information may or may not be the same as the one contained in the previously received Minimum SI. Therefore, the wireless terminal 26-32 may use the information included in this updated Minimum SI regardless. For example, as shown in FIG. 33A, if the delivery method of the requested SIB (SIB#k) is unchanged (on-demand), the wireless terminal 26-32 may re-initiate the SIB requesting procedure, followed by the SIB reception procedure with the scheduling information of the SI windows included in the updated Minimum SI. On the other hand, if the updated Minimum SI indicates that now the requested SIB (SIB#k) will be periodically broadcasted, as shown in FIG. 33B the wireless terminal 26-32 may directly proceed to initiating the SIB reception procedure.

FIG. 33A shows example, representative acts or steps performed in the communications network of FIG. 32, e.g., by access node 22-32 and wireless terminal 26-32, and example messages transmitted therebetween. In the example message flow shown in FIG. 33A, the wireless terminal 26-32 initiates the SIB request procedure of act 33A-2 to request SIB#k, since (as shown by act 33A-0) this wireless terminal 26-32 previously received and stored SIB#k with valueTag=a and then more recently (as shown by act 33A-1) received SIB1 indicating the valueTag=b is the currently valid version for SIB#k. So the SIB request procedure of act 33A-2 is intended to obtain the SIB1 with the valueTag=b. But while the wireless terminal 26-32 is attempting to perform a first SIB reception procedure that follows the SIB request procedure of act 33A-2, the wireless terminal 26-32 receives paging message 33A-3 which indicates a change in Minimum SI, i.e., that the SIB1 will be updated. As a result, upon reception of the paging message 33A-3 the wireless terminal 26-32 aborts the SIB reception procedure (at a time approximately shown by the head of the top vertical arrow of FIG. 33A). At this juncture the wireless terminal 26-32 realizes there is a possibility that the sought SIB#k, having been an on-demand SIB, may hereafter be transitioned to SIB1, e.g., may hereafter be a periodically broadcast SIB. As it turns out, the scenario shown in FIG. 33A the sought SIB#k is not changed to periodically broadcast SIB, as is shown by the SIB1 message 33A-4 which is broadcast after the next modification period boundary. Knowing then that the sought SIB#k is still an on-demand SIB, as act 33A-2-2 the wireless terminal 26-32 begins a second SIB request procedure to request the SIB#k. If the second SIB request procedure of act 33A-2-2 is successful, a second SIB reception procedure is begun. The second SIB reception procedure has duration indicated by the lower vertical arrow of FIG. 33A, wherein the arrow tail indicates start of the second SIB reception procedure and the arrow head indicates end of the second SIB reception procedure. Acts 33A-5*a* and 33A-5*b* comprise acts of the SIB reception procedure which is performed as a result of the SIB request procedure. Act 33A-5*a* shows an unsuccessful reception of SIB#k; act 33A-5*b* shows a successful reception of SIB#k. The wireless terminal 26-32 may monitor such SI windows until one of the aforementioned termination conditions satisfies. For example, upon successful receipt of the SystemInformation message of act 33A-5*b* the wireless terminal 26-32 may end its SIB reception procedure, having received the sought SIB#k with valueTag=b.

Unlike the scenario of FIG. 33A, in the scenario of FIG. 33B the sought SIB#k is changed to a periodically broadcast SIB, as is shown by the SIB1 message 33B-4 which is broadcast after the next modification period boundary. Knowing then that the sought SIB#k is now a periodically broadcast SIB, the wireless terminal 26-32 need not begin a second SIB request procedure to request the SIB#k, but can instead immediately enter a second SIB reception procedure wherein the sought SIB#k will be broadcast. The second SIB reception procedure has duration indicated by the lower vertical arrow of FIG. 33B, wherein the arrow tail indicates start of the second SIB reception procedure and the arrow head indicates end of the second SIB reception procedure. Similar to FIG. 33A, Acts 33B-5*a* and 33B-5*b* comprise acts of the second SIB reception procedure, with act 33B-5*a* showing an unsuccessful reception of SIB#k and act 33B-5*b* showing a successful reception of SIB#k. The wireless terminal 26-32 may monitor such SI windows until one of the aforementioned termination conditions satisfies. For example, upon successful receipt of the SystemInformation message of act 33B-5*b* the wireless terminal 26-32 may end its SIB reception procedure, having received the sought SIB#k with valueTag=b. The scenario of FIG. 33B thus does not require a second SIB request procedure, in view of anticipated broadcast of the now SIB1-included SIB#k. Acts of FIG. 33B occurring before the modification period boundary are similar to those of FIG. 33A.

Figure 34:
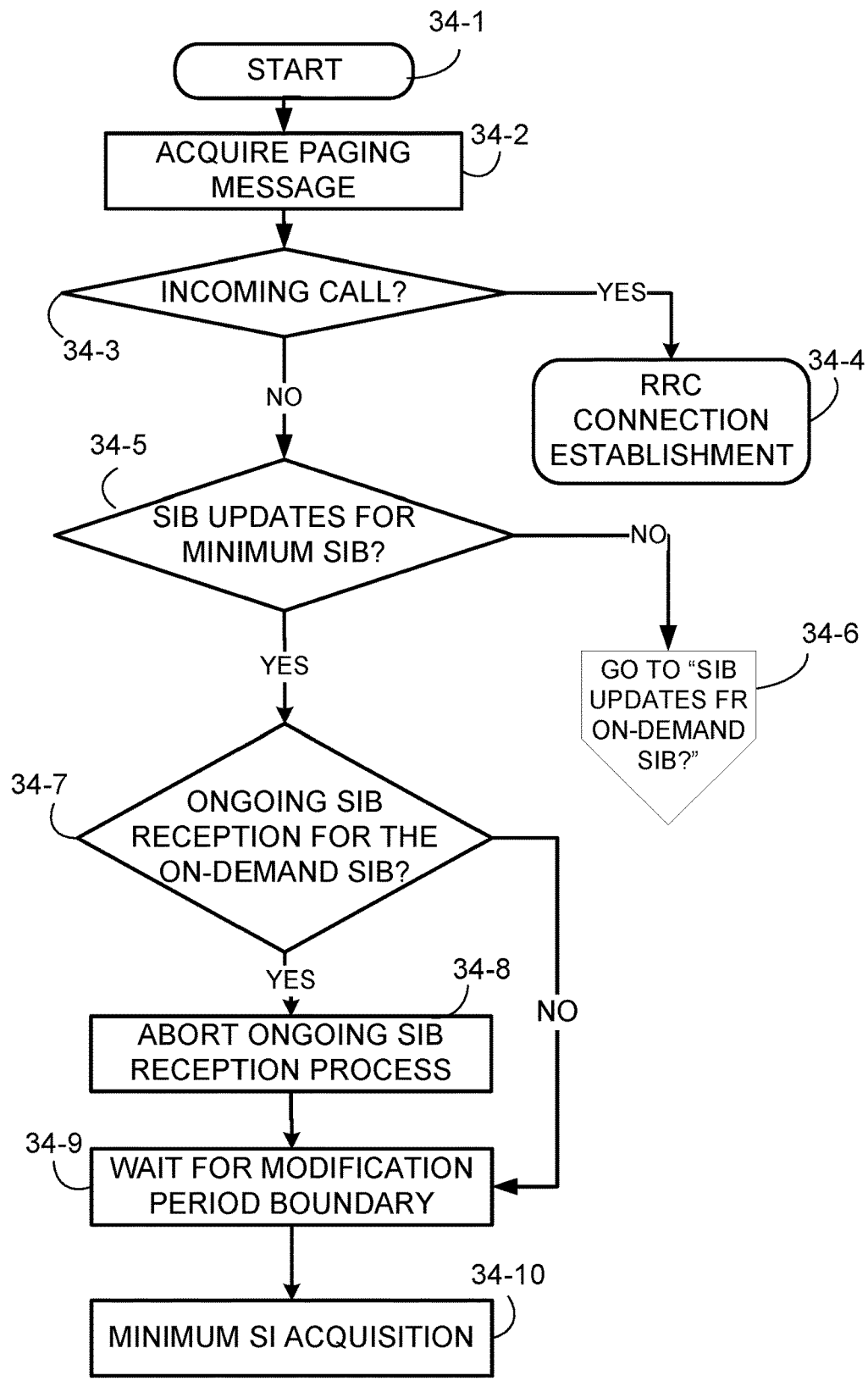
FIG. 34 is flowchart showing example, representative, acts or steps performed by a wireless terminal of FIG. 32 upon receiving the Paging message.

FIG. 34 shows an example operational flow diagram of the wireless terminal upon receiving the Paging message for this embodiment, where additional acts are added to previous procedures in order to abort an ongoing SIB reception procedure if the Paging message indicates a change in Minimum SI. In particular, act 34-2 of FIG. 34 show wireless terminal 26-32 receiving a Paging message. As act 34-3 the wireless terminal checks if the Paging message indicates an incoming call to this wireless terminal. If so, then the wireless terminal 26-32 may proceed to RRC connection establishment (act 34-4). Otherwise the wireless terminal 26-32 checks as act 34-5 if there has been a change in Minimum SI, i.e., if there are any SIB updates for Minimum SI. If not, as indicated by symbol 34-6, the wireless terminal 26-32 proceeds to perform logic associated with and following acts described as "SIB updates for on-demand SIB?" in any appropriate one of FIG. 16, FIG. 19, FIG. 23, FIG. 27, or FIG. 31 described herein. If there has been a change in Minimum SI, as act 34-7 the wireless terminal 26-32 checks there is an on-gong SIB receipt for an on-demand SIB. In other words, the wireless terminal 26-32 determines if it is in the middle of a process of attempting to receive the on-demand SIB which the wireless terminal 26-32 has already requested. If there is an on-going SIB reception procedure, the on-going SIB reception procedure is aborted as act 34-8. If there is no on-going SIB reception procedure, or after the on-going SIB reception procedure is aborted at act 34-8, act 34-9 is performed. Act 34-9 comprises the wireless terminal 26-32 waiting for the next modification period boundary. Thereafter, as act 34-10, the wireless terminal 26-32 acquires the Minimum SI as understood with reference to FIG. 10.

FIG. 34 thus shows that, upon acquiring the Paging message (such as paging message 33B-3 of FIG. 33, an extra condition checking of act 34-5 is added to see if changes on the Minimum SI will be taking place at the next modification period boundary. If not, the wireless terminal 26-34 may fall back to one of the previous embodiments, specifically proceeding to the step "SIB updates for on-demand SIB?" as shown in an appropriate one of FIG. 16, 19, 23, 27, or 31. Otherwise, the wireless terminal 26-32 may abort the ongoing SIB reception process (if any), wait for the next modification period boundary, then attempt to acquire the updated Minimum SI as shown in FIG. 10.

Figure 35:
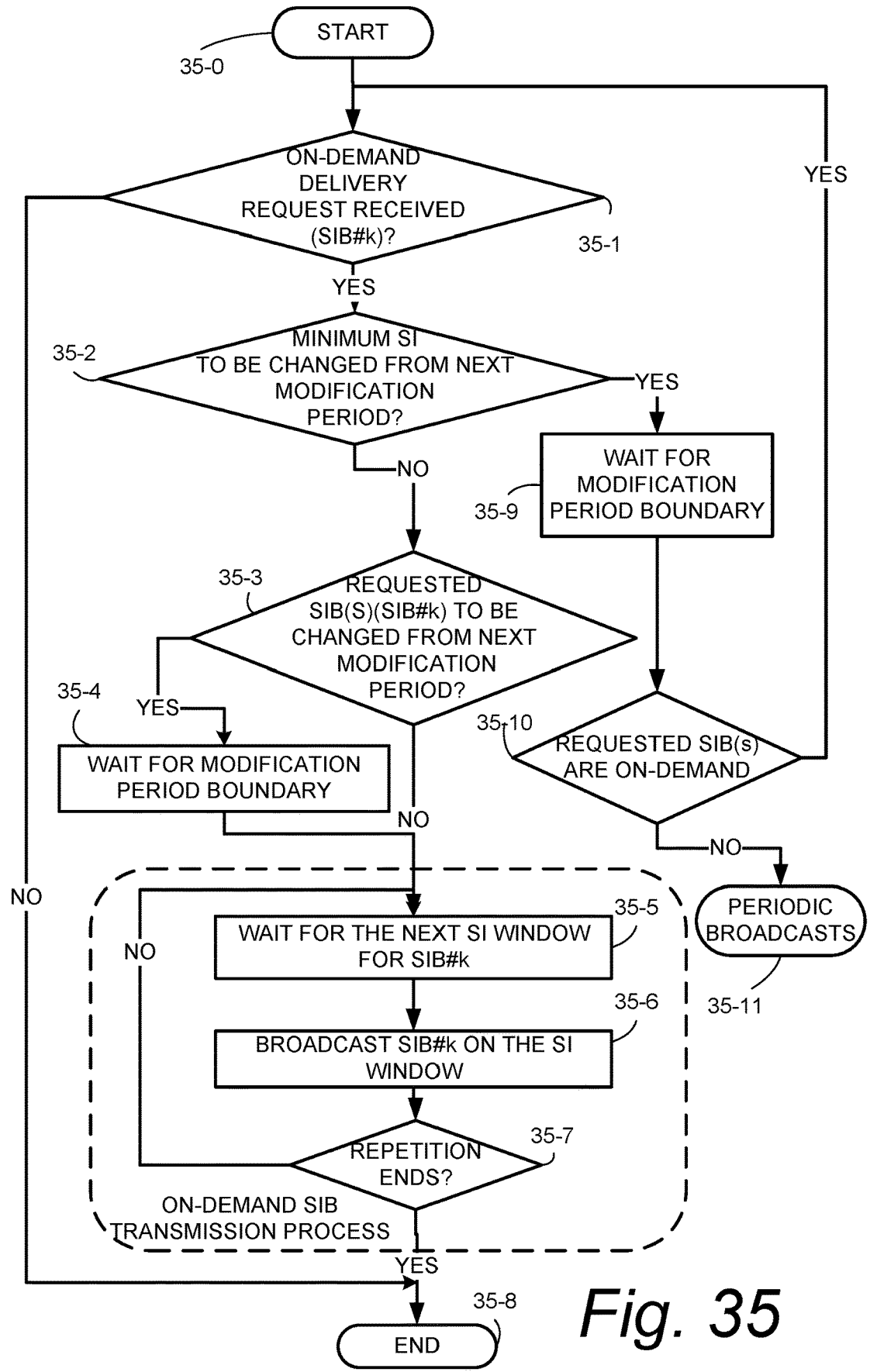
FIG. 35 is a flowchart showing example basic acts or steps executed by an access node of FIG. 32 receiving an on-demand SIB delivery request from a wireless terminal.

FIG. 35 is an example operational flow diagram of the access node 22-32 receiving an on-demand SIB delivery request from a wireless terminal and includes a step (act 35-2) to check if changes on the Minimum SI are scheduled from the next modification period. If that is the case, the access node 22-32 may postpone transmissions of the requested SIB(s) even if there are SI windows for the SIB(s) before the next modification boundary. After the next modification boundary, the access node re-evaluate the delivery method of the requested SIB(s); if it remains on-demand, then it may wait for a new request from wireless terminals, otherwise it may initiate periodic broadcast of the SIB(s), comprising repeating transmission of the SIB(s) in every designated SI window.

In particular, as act 35-1 the access node 22-32 determines that it has not received a request for an on-demand SIB, the access node 22-32 may end the procedure of FIG. 35 (act 35-8). As act 35-2 the access node 22-32 determines there is to be a change of Minimum SI (i.e., that the Minimum SI is to be changed from the next modification period boundary). The network, e.g. the access node 22-32, may make a decision when and how to change the configuration parameters in Minimum SI (SIB1), based on such factors (for example) as operation environmental changes, network configuration changes, network traffic changes, network congestion, and the like. If there is not a change of Minimum SI, as act 35-3 the access node 22-32 next determines whether the content of the requested on-demand SIB is to be changed from the next modification period. If the content of the requested on-demand SIB is not to be changed from the next modification period, the access node 22-32 may proceed to the on-demand SIB transmission process, where the access node 22-32 may (as act 35-5) wait for the next SI window for SIB#k, then (as act 35-6) transmit the SIB#k on the window. The access node 22-32 may repeat transmitting on the following SIB#k SI windows for multiple times until repetition ends (as shown by act 35-7). The number of repetitions may be pre-configured, or equal to the aforementioned maximum counter value configured to wireless terminals via system information. If, however, the content of the requested on-demand SIB is to be changed from the next modification period, as act 35-4 the access node 22-32 waits for the modification period boundary before performing the on-demand SIB transmission process comprising acts 35-5, 35-6 and 35-7. But if it were determined at act 35-2 that there is to be a change of Minimum SI, the access node 22-32 performs acts 35-9 and 35-10. Act 35-9 comprises the access node 22-32 waiting for the next modification period boundary. Act 35-10 comprises the access node 22-32 making a determination if the requested SIB(s) are on-demand. If the requested SIB(s) are not on-demand, the requested SIBs are periodically broadcast as generally indicated by act 35-11. If the requested SIB(s) are on-demand, execution loops back to act 35-1.

It should be understood that the procedures and acts of FIG. 10 and FIG. 13 may be applicable to the sixth embodiment.

Seventh Example Embodiment

Figure 36:
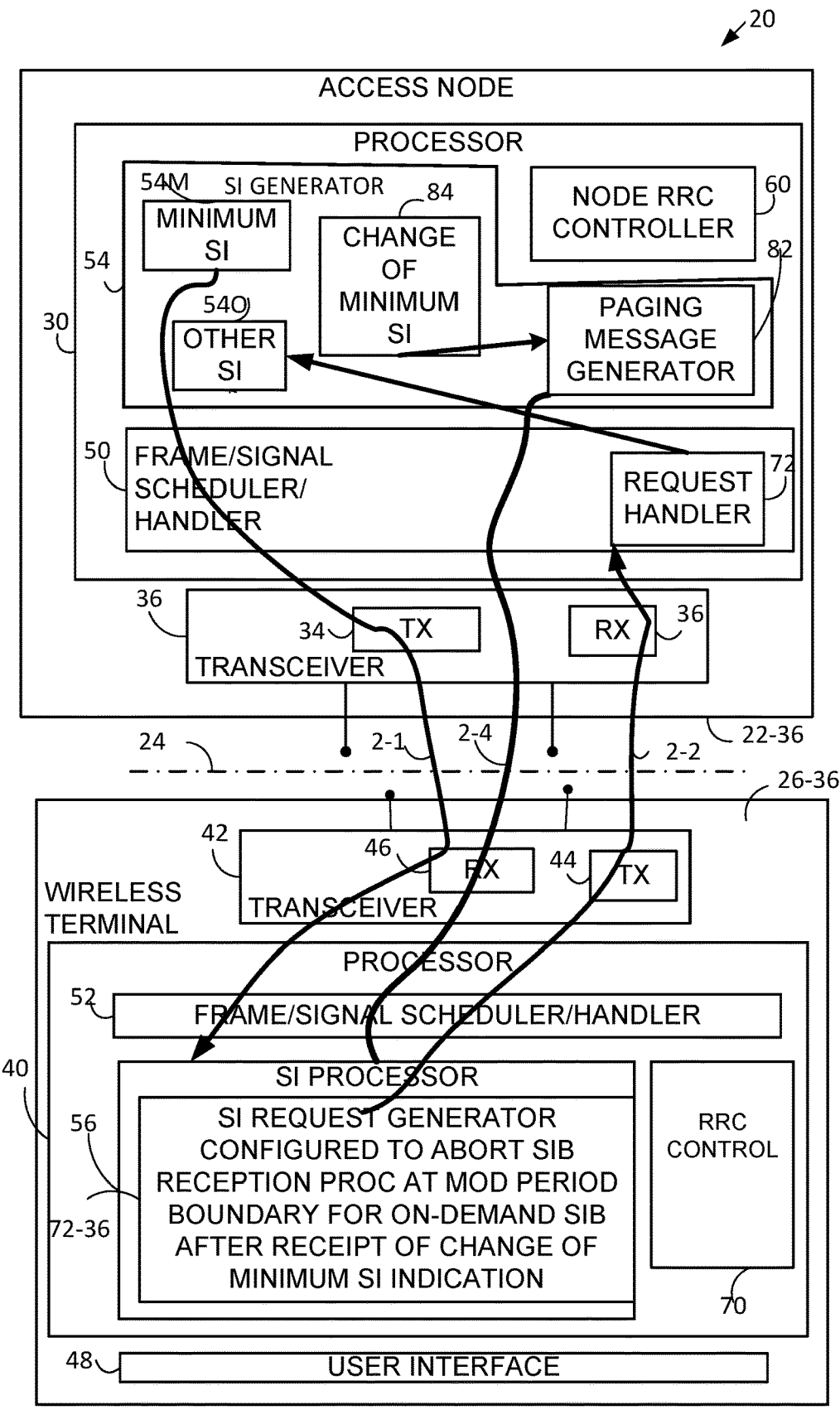
FIG. 36 is a schematic view showing a seventh embodiment of a communications system comprising a radio access node and a wireless terminal, and wherein a Paging message notifying changes of membership of Minimum SI is received after an SIB request procedure requesting the same on-demand SIB(s) and the wireless terminal may or may not abort the SIB reception procedure at a next modification period boundary.

FIG. 36 shows an example communications system of the seventh example embodiment and mode which deals with a case wherein a Paging message notifying changes of Minimum SI (e.g. SIB1) is received after the SIB request procedure requesting on-demand SIB(s), and in which the wireless terminal 26-36 may abort the ongoing SIB reception procedure at a modification period boundary. As such, FIG. 36 shows that the access node 22-36 comprises a paging message generator 82 which generates a paging message, as well as a change of Minimum SI functionality 84. When a change in Minimum SI occurs, the Minimum SI functionality 84 causes the paging message generator 82 to include notification of change of Minimum SI in the paging message. An example paging message is shown as message 2-4 in FIG. 36. FIG. 36 further shows the terminal processor 40 comprises request generator 72-36 which is configured, when appropriate, to abort the SIB reception procedure for an on-demand SIB at a next modification period boundary if, after commencing of the SIB reception procedure, the paging message indicates a change in Minimum SI. Other elements and functions of the wireless terminal 26-36 and the access node 22-36 are similar to and understood from the preceding descriptions, e.g., including but not limited to the descriptions of FIG. 2, FIG. 14, FIG. 17, FIG. 21, FIG. 25, FIG. 29, and FIG. 32.

The seventh embodiment is thus a variation of the sixth embodiment and mode, wherein the wireless terminal 26-36 continues the SIB reception procedure even when receiving the Paging message indicating changes of Minimum SI from the next modification period. The wireless terminal 26-36 of the FIG. 36 embodiment and mode may abort the SIB reception process at the next modification period boundary if it has not successfully received the requested SIB(s) during the current modification period, e.g., the modification period occurring before the modification boundary depicted in FIG. 37A. At the next modification period boundary the wireless terminal 26-36 of FIG. 36 may then attempt to acquire the updated Minimum SI, which may comprise delivery and scheduling information of the SIB(s) that the wireless terminal has requested in the earlier SIB request procedure. As already explained in the sixth embodiment, the wireless terminal 26-36 may use the information included in this updated Minimum SI regardless.

Figure 37A:
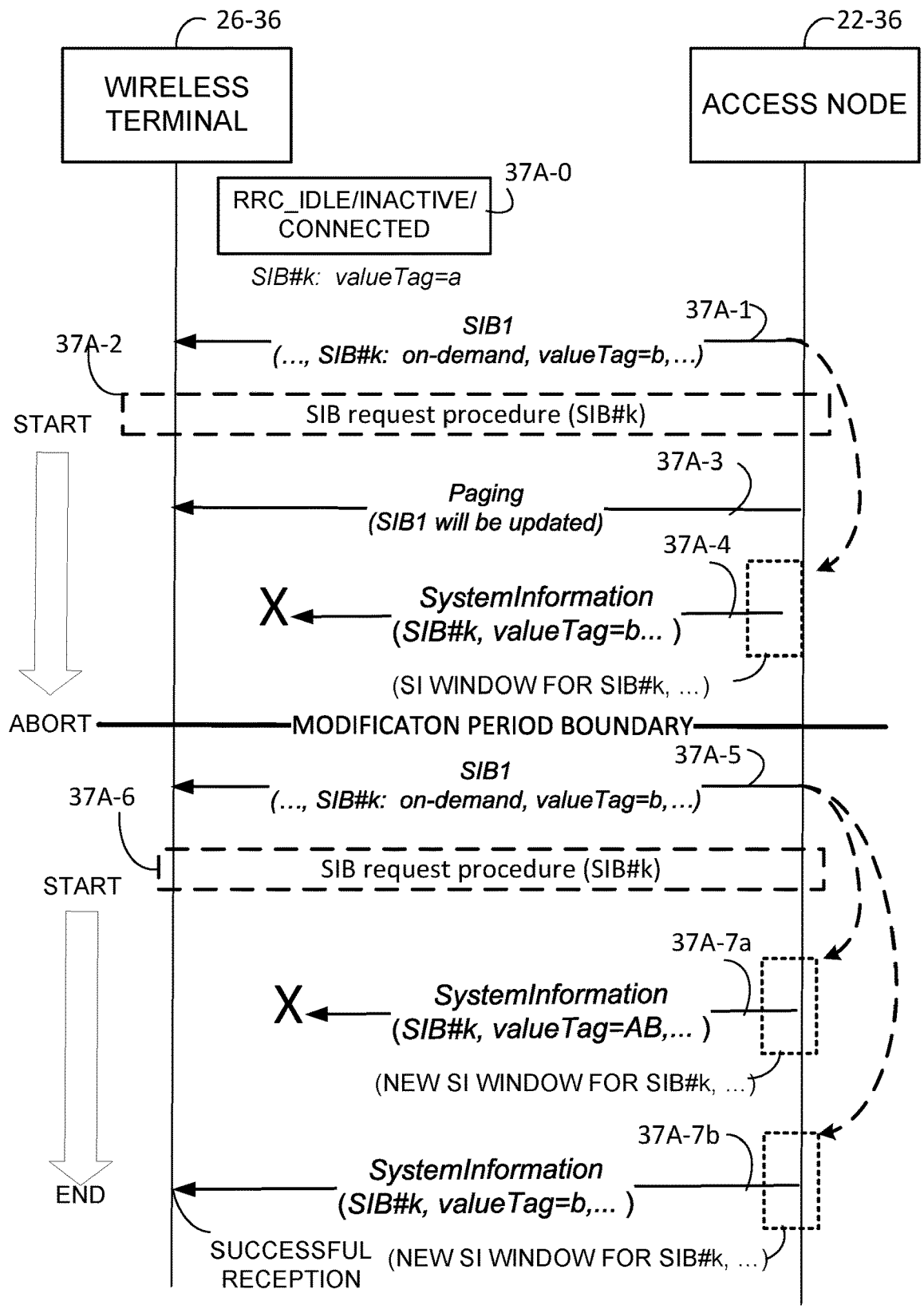
FIG. 37A is a diagrammatic view illustrating an exemplary first scenario message flow for the embodiment of FIG. 36.

FIG. 37A illustrates a case where the updated Minimum SI indicates the previously requested SIB(s) (e.g. SIB#k) is on-demand basis, which may have the wireless terminal restart the SIB request procedure, followed by the SIB reception procedure. FIG. 37A shows example, representative acts or steps performed in the communications network of FIG. 36, e.g., by access node 22-36 and wireless terminal 26-36, and example messages transmitted therebetween. In the example message flow shown in FIG. 37A, the wireless terminal 26-36 initiates the SIB request procedure of act 37A-2 to request SIB#k, since (as shown by act 37A-0) this wireless terminal 26-36 previously received and stored SIB#k with valueTag=a and then more recently (as shown by act 37A-1) received SIB1 indicating the valuetag=b is the currently valid version for SIB#k. So the SIB request procedure of act 37A-2 is intended to obtain the SIB1 with the valueTag=b. But while the wireless terminal 26-36 is attempting to perform a first SIB reception procedure that follows the SIB request procedure of act 37A-2, the wireless terminal 26-36 receives paging message 37A-3 which indicates a change in Minimum SI, i.e., that the SIB1 will be updated. But unlike in the sixth example embodiment and mode, the wireless terminal 26-36 does not immediately abort the SIB reception procedure upon reception of the paging message 37A-3. Rather, as shown by other acts before occurrence of the modification period boundary in FIG. 37A, e.g., during the current modification period, the wireless terminal 26-36 continues to attempts to acquire the sought SIB#k in a SIB reception procedure indicated by the top vertical arrow of FIG. 37A until the next modification period. It so happens that in the SIB reception procedure shown in FIG. 37A, the wireless terminal 26-36 is not successful in receiving the sought SIB#k, as indicated by failed SystemInformation message 37A-4. The SIB reception procedure is only then aborted at the next modification period boundary, as it was mentioned above that wireless terminal 26-36 of the FIG. 36 embodiment and mode may abort the SIB reception process at the next modification period boundary if it has not successfully received the requested SIB(s). Then, after the occurrence of the modification period boundary, the wireless terminal 26-36 receives the SIB1 message 37A-5 which is broadcast after the next modification period boundary. The SIB1 message 37A-5 in the case of FIG. 37A indicates that the sought SIB#k, is still on-demand, i.e., that the sought SIB#k has not changed to be a periodically broadcast SIB. Knowing then that the sought SIB#k is still an on-demand SIB, as act 37A-6 the wireless terminal 26-36 begins a second SIB request procedure to request the SIB#k. If the second SIB request procedure of act 37A-6 is successful, a second SIB reception procedure is begun. The second SIB reception procedure has duration indicated by the lower vertical arrow of FIG. 37A, wherein the arrow tail indicates start of the second SIB reception procedure and the arrow head indicates end of the second SIB reception procedure. Acts 37A-7a and 37A-7b comprise acts of the SIB reception procedure which is performed as a result of the SIB request procedure. Act 37A-7a shows an unsuccessful reception of SIB#k; act 37A-7b shows a successful reception of SIB#k. The wireless terminal 26-36 may monitor such SI windows until one of the aforementioned termination conditions satisfies. For example, upon successful receipt of the SystemInformation message of act 37A-7b the wireless terminal 26-36 may end its SIB reception procedure, having received the sought SIB#k with valueTag=b.

Figure 37B:
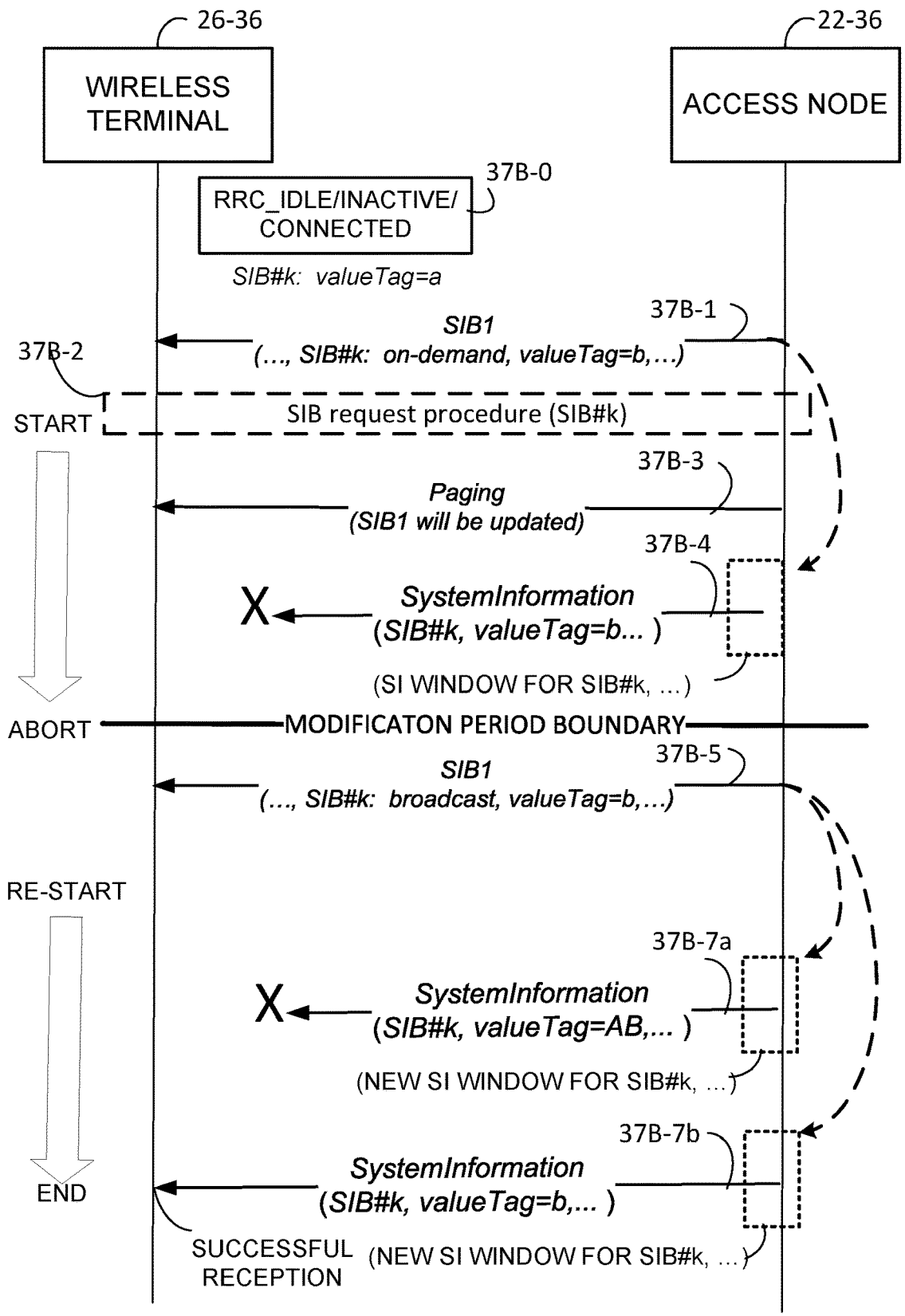
FIG. 37B is a diagrammatic view illustrating an exemplary second scenario message flow for the embodiment of FIG. 36.

Unlike the scenario of FIG. 37A, in the scenario of FIG. 37B the sought SIB#k is changed to Minimum SI, as is shown by the SIB1 message 37B-5 which is broadcast after the next modification period boundary. Knowing then that the sought SIB#k is now a periodically broadcasted SIB, the wireless terminal 26-36 need not begin a second SIB request procedure to request the SIB#k, but can instead immediately enter a second SIB reception procedure wherein the sought SIB#k will be broadcast. The second SIB reception procedure has duration indicated by the lower vertical arrow of FIG. 37B, wherein the arrow tail indicates start of the second SIB reception procedure and the arrow head indicates end of the second SIB reception procedure. Similar to FIG. 37A, Acts 37B-7*a* and 37B-7*b* comprise acts of the second SIB reception procedure, with act 37B-7*a* showing an unsuccessful reception of SIB#k and act 37B-7*b* showing a successful reception of SIB#k. The wireless terminal 26-36 may monitor such SI windows until one of the aforementioned termination conditions satisfies. For example, upon successful receipt of the SystemInformation message of act 37B-7*b* the wireless terminal 26-36 may end its SIB reception procedure, having received the sought SIB#k with valueTag=b. The scenario of FIG. 37B thus does not require a second SIB request procedure, in view of anticipated broadcast of the now SIB1-included SIB#k. Acts of FIG. 37B occurring before the modification period boundary are similar to those of FIG. 37B.

Thus, FIG. 37B is a case where at the modification period boundary the delivery method of the requested SIB(s) changes from on-demand to periodic broadcast. In this case, the wireless terminal 26-36 may directly proceed to the SIB reception procedure.

Figure 37C:
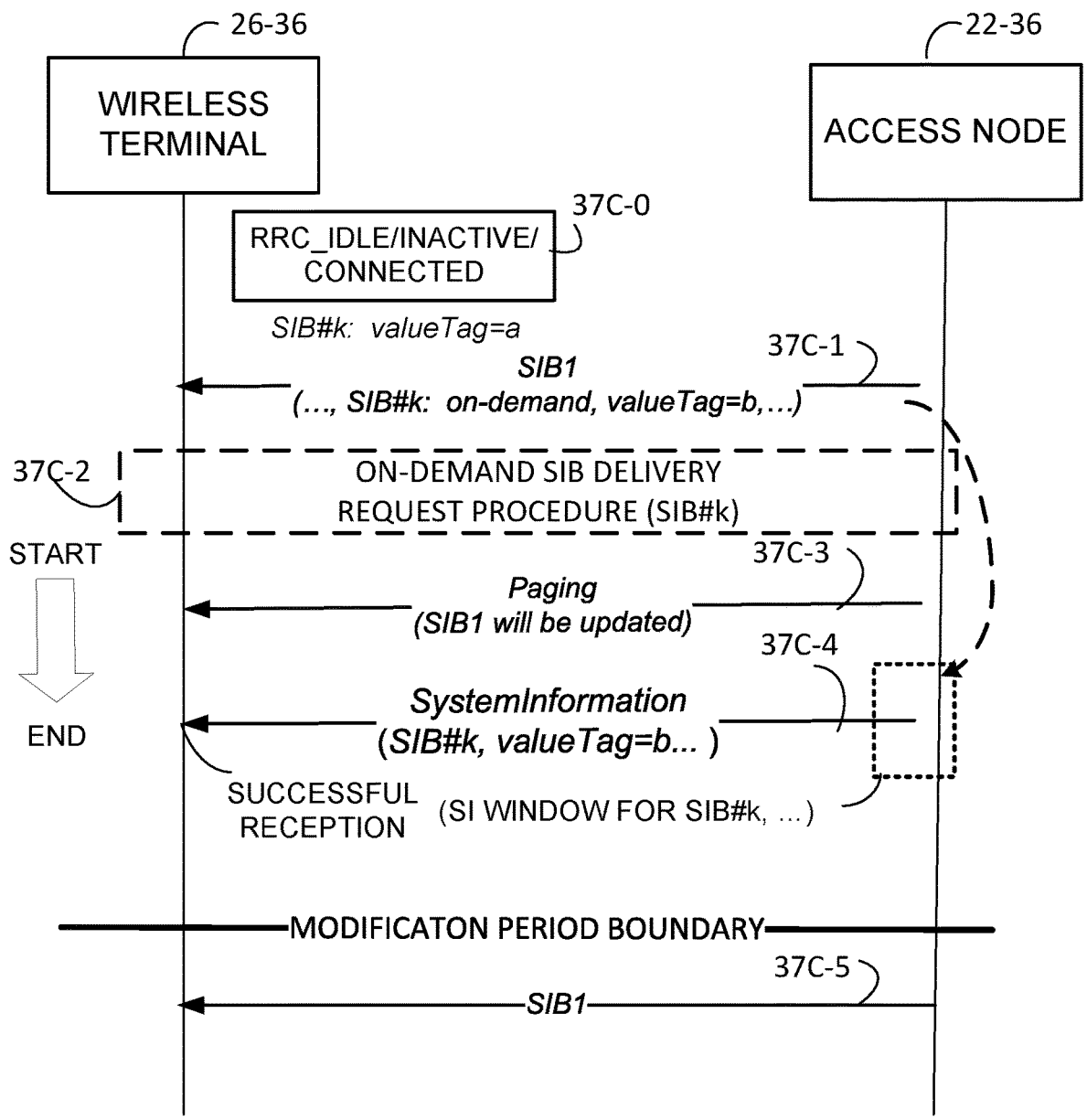
FIG. 37C is a diagrammatic view illustrating an exemplary second scenario message flow for the embodiment of FIG. 36.

If the wireless terminal 26-36 happens to receive the requested SIB(s) successfully before the next modification period boundary, then wireless terminal 26-36 may end the SIB reception procedure, as shown in FIG. 37C. In particular, in the scenario of FIG. 37C, after performance of the SIB request procedure of act 37C-2, the wireless terminal 26-36 performs a SIB reception procedure as indicated by the top arrow of FIG. 37C. During the SIB reception procedure the wireless terminal 26-36 receives the paging message of act 37C-3 which indicates that the SIB1 will be updated. As in the scenarios of FIG. 37A and FIG. 37B, the wireless terminal 26-36 does not abort the SIB reception procedure, but rather continues the SIB reception procedure in an attempt to receive the sought SIB#k in the current modification period. The scenario of FIG. 37C differs from the scenarios of FIG. 37A and FIG. 37C in that in the SIB reception procedure of FIG. 37C the wireless terminal 26-36 is successful in receiving the sought SIB#k in the current modification period, e.g., before the modification period boundary, as indicated by act 37C-4. After the modification period boundary the wireless terminal 26-36 may continue to receive other SIB1 messages, as indicated by message 37C-5. In the scenario of FIG. 37C, the wireless terminal 26-36 may eventually acquire the updated Minimum SI, and make a decision of further actions (if any) based on the contents of the updated Minimum SI.

Figure 38:
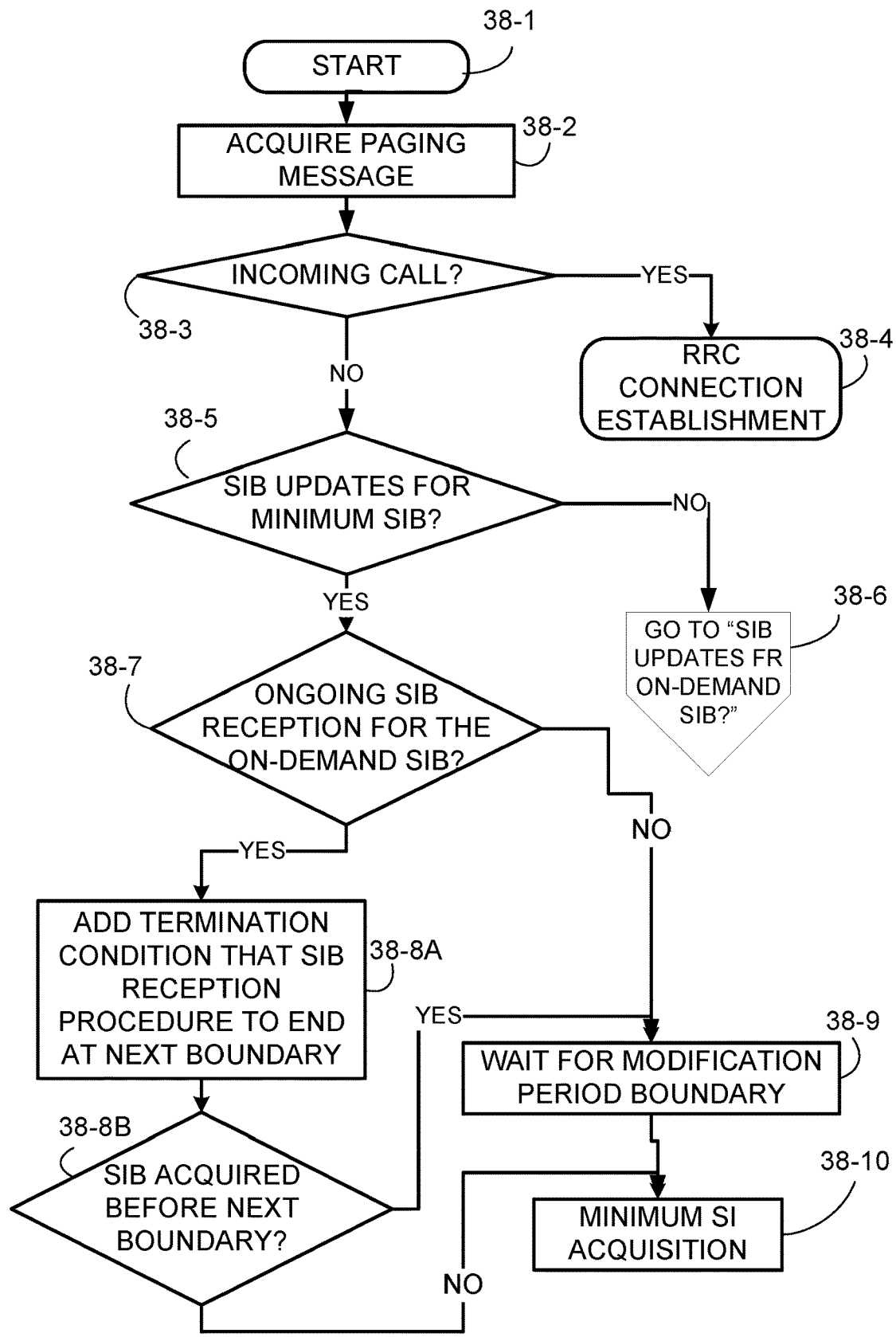
FIG. 38 is flowchart showing example, representative, acts or steps performed by a wireless terminal of FIG. 36 upon receiving the Paging message.

FIG. 38 shows an example operational flow diagram of the wireless terminal upon receiving the Paging message for this embodiment, where additional acts are added to previous procedures in order to abort an ongoing SIB reception procedure if the Paging message indicates a change in Minimum SI. In particular, act 38-2 of FIG. 38 show wireless terminal 26-36 receiving a Paging message. As act 38-3 the wireless terminal checks if the Paging message indicates an incoming call to this wireless terminal. If so, then the wireless terminal 26-36 may proceed to RRC connection establishment (act 38-4). Otherwise the wireless terminal 26-36 checks as act 38-5 if there has been a change in Minimum SI, i.e., if there are any SIB updates for Minimum SI. If not, as indicated by symbol 38-6, the wireless terminal 26-36 proceeds to perform logic associated with and following acts described as "SIB updates for on-demand SIB?" in any appropriate one of FIG. 16, FIG. 19, FIG. 23, FIG. 27, or FIG. 31 described herein. If there has been a change in Minimum SI, as act 38-7 the wireless terminal 26-36 checks there is an on-gong SIB receipt for an on-demand SIB. In other words, the wireless terminal 26-36 determines if it is in the middle of a process of attempting to receive the on-demand SIB which the wireless terminal 26-36 has already requested.

If there is an on-going SIB reception procedure, the wireless terminal 26-36 does not immediately abort the on-going SIB reception procedure. Rather, as act 38-8A the wireless terminal 26-36 adds a termination condition: that the SIB reception procedure is to end at the next modification period boundary. As act 38-8B, a check is then made whether the sought SIB#k has been acquired before the next modification period boundary. If the sought SIB#k has been acquired before the next modification period boundary, the wireless terminal 26-36 waits for the next modification period boundary (act 38-9) and thereafter performs Minimum SI acquisition (act 38-10). If the sought SIB#k has not been acquired before the next modification period boundary, the wireless terminal 26-36 performs Minimum SI acquisition (act 38-10). If there is no on-going SIB reception procedure, as act 38-9 the wireless terminal 26-36 (act 38-9) and thereafter performs Minimum SI acquisition (act 38-10).

FIG. 38 thus shows that, upon acquiring the Paging message, wherein after checking an incoming call for this wireless terminal, an extra step (act 38-5) is added to check if the Paging message indicates upcoming changes on the Minimum SI from the next modification period. If not, then similar to the sixth embodiment, the flow may proceed to the step "SIB updates for on-demand SIB?" as shown in an appropriate one of FIG. 16, 19, 23, 27, or 31. Otherwise, the wireless terminal 26-36 further check if there is any SIB reception process currently ongoing for on-demand SIB(s) (act 38-7). If not, the wireless terminal may simply wait for the next modification period (act 38-9) and then start to acquire the Minimum SI (act 38-10) as shown in FIG. 10. Otherwise, the wireless terminal 26-36 may continue the ongoing SIB reception procedure, in which, one new termination condition (act 38-8A) is now added to the aforementioned termination conditions; the SIB reception procedure ends at the next modification period boundary. As a result, if the wireless terminal 26-36 fails to receive the requested SIB(s) before the modification period boundary, it may terminate the ongoing SIB reception procedure unsuccessfully. After the termination of the (successful or unsuccessful) SIB reception procedure, the wireless terminal may wait for the next modification period boundary (act 38-9) if it is before the boundary and proceed to the Minimum SI acquisition shown in FIG. 9, or directly proceed to the Minimum SI acquisition if already after the boundary (act 38-10).

Figure 39:
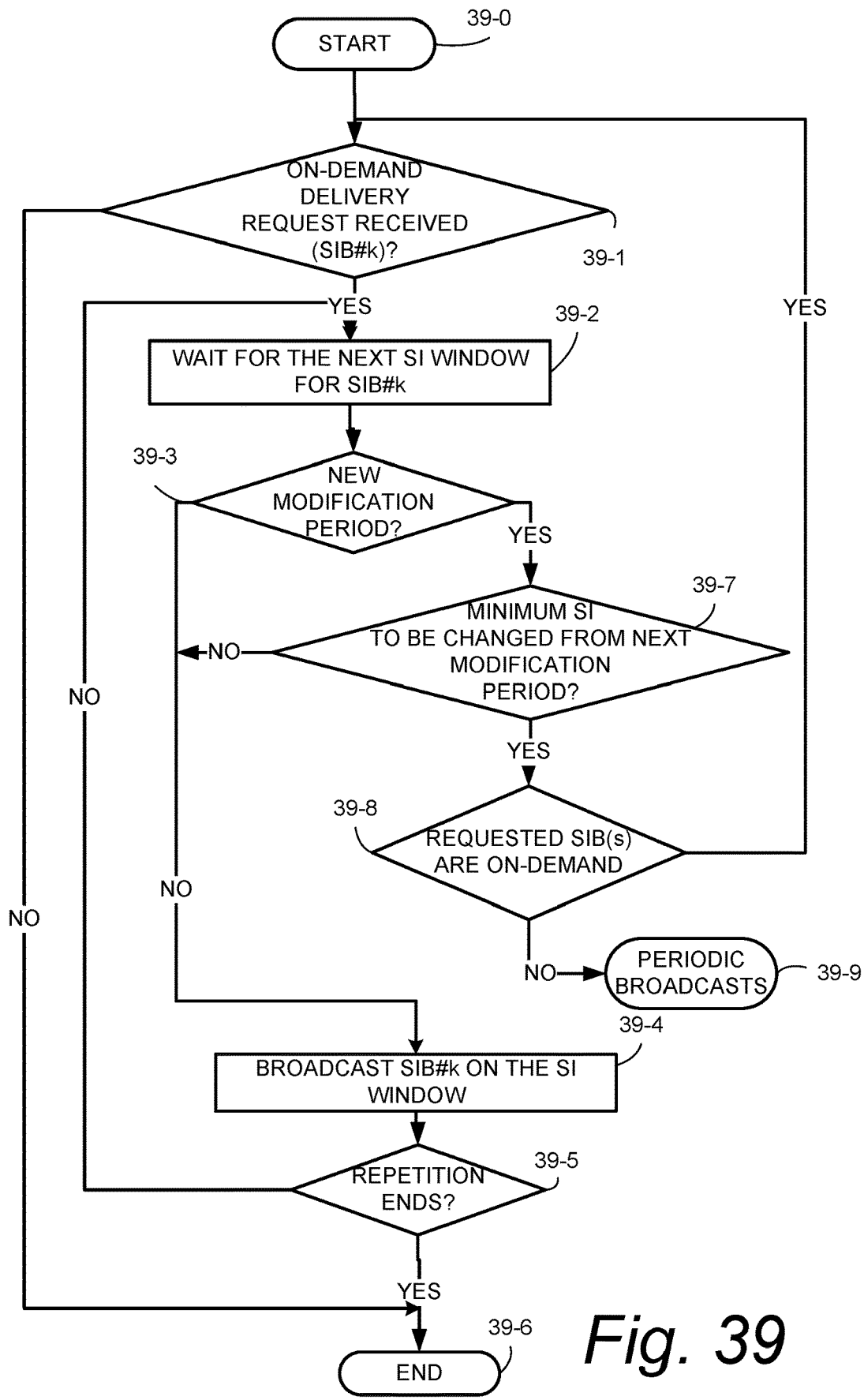
FIG. 39 is a flowchart showing example basic acts or steps executed by an access node of FIG. 36 receiving an on-demand SIB delivery request from a wireless terminal.

FIG. 39 is an example operational flow diagram of the access node 22-36 receiving an on-demand SIB delivery request from a wireless terminal, which is based on FIG. 12 with an extra act after waiting for the next SI window for the requested SIB(s) (e.g. SIB#k) to check (act 39-3) to see if now it is in a new modification period. If so, access node 22-36 may further check if the Minimum SI has changed in this modification period (act 39-7). If not, the flow may resume the ongoing (repetitive) transmission cycle of the requested SIB(s). Otherwise the transmission cycle is terminated, and the access node may further checks if the requested SIB(s) remain on-demand after the Minimum SI change (act 39-8). If this is the case, the access node may wait for a next request (act 39-1). On the other hand, if the delivery method of the requested SIB(s) has changed to periodic broadcast, the access node may initiate the periodic broadcast procedure as understood with respect to FIG. 35, for example.

In particular, as act 39-1 if the access node 22-36 determines that it has not received a request for an on-demand SIB, the access node 22-36 may end the procedure of FIG. 39 (act 39-8). If a request for an on-demand SIB has been received, as act 39-2 the wireless terminal 26-36 waits for the next SI window for the requested SIB(s) (e.g. SIB#k), and then as act 39-3 checks to see if now it is in a new modification period. If it is not a new modification period, as act 39-7 the access node 22-36 may proceed to the on-demand SIB transmission process, where the access node 22-36 may (as act 39-4) transmit the SIB#k on the window. The access node 22-36 may repeat transmitting on the following SIB#k SI windows for multiple times until repetition ends (as shown by act 39-5). The number of repetitions may be pre-configured, or equal to the aforementioned maximum counter value configured to wireless terminals via system information. If it is a new modification period, as act 39-7 the access node 22-36 determines if there is to be a change of Minimum SI (i.e., that the Minimum SI is to be changed from the next modification period boundary). As mentioned above, the network, e.g. the access node 22-32, may make a decision when and how to change the configuration parameters in Minimum SI (SIB1), based on such factors (for example) as operation environmental changes, network configuration changes, network traffic changes, network congestion, and the like. If there is not a change of Minimum SI, as act 39-3 the access node 22-36 may proceed to the on-demand SIB transmission process, where the access node 22-36 may (as act 39-4) transmit the SIB#k on the window, as described above. If there is a change of Minimum SI, as act 39-8 the access node 22-36 makes a determination if the requested SIB(s) are on-demand. If the requested SIB(s) are not on-demand, the requested SIBs are periodically broadcast as generally indicated by act 39-9. If the requested SIB(s) are on-demand, execution loops back to act 39-1.

It should be understood that the procedures and acts of FIG. 10 and FIG. 13 may be applicable to the seventh embodiment.

Certain units and functionalities of node 22 and wireless terminal 26 are, in example embodiments, implemented by electronic machinery, computer, and/or circuitry. For example, the node processors 30 and terminal processors 40 of the example embodiments herein described and/or encompassed may be comprised by the computer circuitry of FIG. 32. FIG. 32 shows an example of such electronic machinery or circuitry, whether node or terminal, as comprising one or more processor(s) circuits 190; program instruction memory 192; other memory 194 (e.g., RAM, cache, etc.); input/output interfaces 196; peripheral interfaces 198; support circuits 199; and busses 200 for communication between the aforementioned units.

The program instruction memory 192 may comprise coded instructions which, when executed by the processor(s), perform acts including but not limited to those described herein. Thus is understood that each of node processor 30 and terminal processor 40, for example, comprise memory in which non-transient instructions are stored for execution.

The memory 194, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 199 are coupled to the processors 190 for supporting the processor in a conventional manner. These circuits include cache, power supplies, clock circuits, input/output circuitry and subsystems, and the like.

Further, it should be understood that, when a processor or processor circuitry is mentioned in conjunction with any of the preceding example embodiments and modes, it should be understood that the device hosting the processor, whether wireless terminal or access node, may comprise at least one processor and at least one memory including computer program code, the memory and the computer program code being configured to, working with the at least one processor, to cause the host device to perform the functions aforedescribed.

For a first example, the first example embodiment and mode of wireless terminal 26-14 comprises at least one processor and at least one memory including computer program code, the memory and the computer program code being configured to, working with the at least one processor, to cause the wireless terminal to wait for a modification period boundary to initiate an SIB request procedure for an on-demand SIB.

For a second example, the second example embodiment and mode of wireless terminal 26-17 comprises at least one processor and at least one memory including computer program code, the memory and the computer program code being configured to, working with the at least one processor, to cause the wireless terminal to initiate the SIB request procedure without waiting for the next modification period boundary, but after the successful completion of the SIB request procedure to wait for the next modification period boundary to start the SIB reception procedure.

For a third example, the third example embodiment and mode of wireless terminal 26-21 comprises at least one processor and at least one memory including computer program code, the memory and the computer program code being configured to, working with the at least one processor, to cause the wireless terminal to whenever an on-demand SIB is updated, receive from the access node an automatic transmission of the updated SIB at one or more corresponding SI windows from the next modification period, without the wireless terminal being required to send a request.

For a fourth example, the fourth example embodiment and mode of wireless terminal 26-25 comprises at least one processor and at least one memory including computer program code, the memory and the computer program code being configured to, working with the at least one processor, to cause the wireless terminal, when appropriate, to initiate both the SIB request procedure and the SIB reception procedure for an on-demand SIB without waiting for the next modification period boundary.

For a fifth example, the fifth example embodiment and mode of wireless terminal 26-29 comprises at least one processor and at least one memory including computer program code, the memory and the computer program code being configured to, working with the at least one processor, to cause the wireless terminal, when a Paging message notifying changes of on-demand SIB(s) is received after initiating an on-going SIB request procedure requesting the same on-demand SIB(s), to abort the on-going SIB request procedure.

For a sixth example, the sixth example embodiment and mode of wireless terminal comprises at least one processor and at least one memory including computer program code, the memory and the computer program code being configured to, working with the at least one processor, to cause the wireless terminal to abort an ongoing SIB reception procedure upon receipt of the Paging message that indicates a change in Minimum SI.

For a seventh example, the seventh example embodiment and mode of wireless terminal comprises at least one processor and at least one memory including computer program code, the memory and the computer program code being configured to, working with the at least one processor, to cause the wireless terminal continue, at least to a next modification period boundary, an ongoing SIB reception procedure upon receipt of the Paging message that indicates a change in Minimum SI.

Thus, the technology disclosed herein solves problems in the field of telecommunications, including problems in telecommunications nodes such wireless terminals and access nodes, as well as computers/processors and hardware comprising such nodes. System information is of utmost importance to the operation of telecommunication nodes, so that each node can obtain the necessary network information to coordinate and communicate with other nodes and to perform its desired functions. The system information is quite extensive and complex, and may be changeable/updateable due to network and operating conditions, for example. Efficiently obtaining and using the system information is challenging, particularly in view of numerous other telecommunications functions that may be simultaneously on-going based on the system information. The technology disclosed herein affords the communications nodes the computerized and other configuration in order to obtain the system information earlier and more efficiently, thereby avoiding waste of time and processing resources.

The technology of this application thus encompasses but is not limited to the following example embodiments, example features, and example advantages:

Example Embodiment 1

A wireless terminal which communicates over a radio interface with access nodes of a radio access network (RAN), the wireless terminal comprising:
  receiver circuitry configured to receive first type system information from an access node, the first type system information including availability of second type system information blocks (SIBs) and an indication of a delivery mode for each available second type SIB, the delivery mode being either periodic broadcast or on-demand basis;
  processor circuitry configured to:
    receive a notification message indicating identities of on-demand basis second type SIBs, whose contents to be updated at the next boundary of repeating time periods configured by the access node;
    initiate a reception process to attempt to receive some of the updated on-demand basis second type SIBs.

Example Embodiment 2

The wireless terminal of example embodiment 1, wherein the reception process ends upon successful reception of the updated on-demand basis second type SIBs.

Example embodiment 3

The wireless terminal of example embodiment 1, wherein the reception process ends after a maximum number of reception attempts for the updated on-demand basis second type SIBs.

Example Embodiment 4

The wireless terminal of example embodiment 1, wherein the reception process ends after a timer expires.

Example Embodiment 5

The wireless terminal of example embodiment 1, wherein the wireless terminal is configured to transmit a request message to the access node to request broadcast of the updated on-demand basis second type SIBs.

Example Embodiment 6

The wireless terminal of example embodiment 5, wherein the wireless terminal is further configured to transmit the request message after the next boundary.

Example Embodiment 7

The wireless terminal of example embodiment 5, wherein the wireless terminal is further configured to initiate the reception process after the next boundary.

Example Embodiment 8

The wireless terminal of example embodiment 1, wherein the wireless terminal further receives configuration information from the access node indicating that the updated on-demand basis second type SIBs will be broadcasted by the access node after the next boundary without a presence of a request message.

Example Embodiment 9

The wireless terminal of example embodiment 8, wherein the configuration information applies to all of the SIBs to be updated after the next boundary.

Example Embodiment 10

The wireless terminal of example embodiment 8, wherein the configuration information selectively indicates the types of SIBs to be broadcasted without a presence of a request message.

Example Embodiment 11

The wireless terminal of example embodiment 8, wherein the configuration information is included in the notification message.

Example Embodiment 12

The wireless terminal of example embodiment 8, wherein the configuration information is included in the first type system information.

Example Embodiment 13

The wireless terminal of example embodiment 1, wherein upon receiving the notification message the wireless terminal aborts the reception procedure attempting to acquire an on-demand basis second type SIB if the notification message indicates the on-demand basis second type SIB is to be updated in the next boundary.

Example Embodiment 14

The wireless terminal of example embodiment 13, wherein the wireless terminal is further configured to restart the reception procedure for the on-demand basis second type SIB after the next boundary.

Example Embodiment 15

A method in a wireless terminal which communicates over a radio interface with access nodes of a radio access network (RAN), the method comprising:

receiving first type system information from an access node, the first type system information including availability of second type system information blocks (SIBs) and an indication of a delivery mode for each available second type SIB, the delivery mode being either periodic broadcast or on-demand basis;

receiving a notification message indicating identities of on-demand basis second type SIBs, whose contents to be updated at the next boundary of repeating time periods configured by the access node;

initiating a reception process to attempt to receive some of the updated on-demand basis second type SIBs.

Example Embodiment 16

The method of example embodiment 15, wherein the reception process ends upon successful reception of the updated on-demand basis second type SIBs.

Example Embodiment 17

The method of example embodiment 15, wherein the reception process ends after a maximum number of reception attempts for the updated on-demand basis second type SIBs.

Example Embodiment 18

The method of example embodiment 15, wherein the reception process ends after a timer expires.

Example Embodiment 19

The method of example embodiment 15, wherein comprising transmitting a request message to the access node to request broadcast of the updated on-demand basis second type SIBs.

Example Embodiment 20

The method of example embodiment 19, wherein further comprising transmitting the request message after the next boundary.

Example Embodiment 21

The method of example embodiment 19, wherein further comprising initiating the reception process after the next boundary.

Example Embodiment 22

The method of example embodiment 15, wherein further comprising receiving configuration information from the access node indicating that the updated on-demand basis second type SIBs will be broadcasted by the access node after the next boundary without a presence of a request message.

Example Embodiment 23

The method of example embodiment 22, wherein the configuration information applies to all of the SIBs to be updated after the next boundary.

Example Embodiment 24

The method of example embodiment 22, wherein the configuration information selectively indicates the types of SIBs to be broadcasted without a presence of a request message.

Example Embodiment 25

The method of example embodiment 22, wherein the configuration information is included in the notification message.

Example Embodiment 26

The method of example embodiment 22, wherein the configuration information is included in the first type system information.

Example Embodiment 26

The method of example embodiment 15, wherein comprising upon receiving the notification message aborting the reception procedure attempting to acquire an on-demand basis second type SIB if the notification message indicates the on-demand basis second type SIB is to be updated in the next boundary.

Example Embodiment 27

The method of example embodiment 26, wherein the wireless terminal is further configured to restart the reception procedure for the on-demand basis second type SIB after the next boundary.

Example Embodiment 28

An access node of a radio access network comprising:
transmitter circuitry configured to transmit first type system information and second type system information over a radio interface, the first type system information including availability of second type system information blocks (SIBs) and an indication of a delivery mode for each available second type SIB, the delivery mode being either periodic broadcast or on-demand basis;
processor circuitry configured to:
transmit a notification message indicating identities of on-demand basis second type SIBs, whose contents to be updated at the next boundary of repeating time periods configured by the access node;
broadcast the updated on-demand basis second type SIBs in one or more broadcast occasions.

Example Embodiment 29

The access node of example embodiment 28, wherein the access node is configured to trigger broadcasting the updated on-demand basis second type SIBs when receiving a request message from the wireless terminal.

Example Embodiment 30

The access node of example embodiment 29, wherein the access node is configured to start broadcasting the updated on-demand basis second type SIBs after the next boundary.

Example Embodiment 31

The access node of example embodiment 29, wherein the access node further sends configuration information to the wireless terminal indicating that the updated on-demand basis second type SIBs will be broadcasted after the next boundary without a presence of a request message.

Example Embodiment 32

The access node of example embodiment 31, wherein the configuration information applies to all of the SIBs to be updated after the next boundary.

Example Embodiment 33

The access node of example embodiment 31, wherein the configuration information selectively indicates the types of SIBs to be broadcasted without a presence of a request message.

Example Embodiment 34

The access node of example embodiment 33, wherein the configuration information is included in the notification message.

Example Embodiment 35

The access node of example embodiment 33, wherein the configuration information is included in the first type system information.

Example Embodiment 36

A method in an access node of a radio access network comprising:
  transmitting first type system information and second type system information over a radio interface, the first type system information including availability of second type system information blocks (SIBs) and an indication of a delivery mode for each available second type SIB, the delivery mode being either periodic broadcast or on-demand basis;
  transmitting a notification message indicating identities of on-demand basis second type SIBs, whose contents to be updated at the next boundary of repeating time periods configured by the access node;
  broadcasting the updated on-demand basis second type SIBs in one or more broadcast occasions.

Example Embodiment 37

The method of example embodiment 36, wherein comprising broadcasting the updated on-demand basis second type SIBs when receiving a request message from the wireless terminal.

Example Embodiment 38

The method of example embodiment 37, wherein comprising starting broadcasting the updated on-demand basis second type SIBs after the next boundary.

Example Embodiment 39

The method of example embodiment 36, wherein further comprising sending configuration information to the wireless terminal indicating that the updated on-demand basis second type SIBs will be broadcasted after the next boundary without a presence of a request message.

Example Embodiment 40

The method of example embodiment 39, wherein the configuration information applies to all of the SIBs to be updated after the next boundary.

Example Embodiment 41

The method of example embodiment 39, wherein the configuration information selectively indicates the types of SIBs to be broadcasted without a presence of a request message.

Example Embodiment 42

The method of example embodiment 39, wherein the configuration information is included in the notification message.

Example Embodiment 43

The access node of example embodiment 39, wherein the configuration information is included in the first type system information.

Example Embodiment 44

A wireless terminal which communicates over a radio interface with access nodes of a radio access network (RAN), the wireless terminal comprising:
  receiver circuitry configured to receive first type system information from an access node, the first type system information including availability of second type system information blocks (SIBs) and an indication of a delivery mode for each available second type SIB, the delivery mode being either periodic broadcast or on-demand basis;
  processor circuitry configured to:
    initiate a reception procedure comprising one or more attempts to receive on-demand basis second type SIBs
    while running the ongoing reception procedure receive a notification message including at least one identity of first type SIBs, whose contents to be updated at the next boundary of repeating time periods configured by the access node;
    abort the reception procedure.

Example Embodiment 45

The wireless terminal of Example Embodiment 44, wherein prior to the reception process the wireless terminal is configured to perform a request procedure comprising sending a request message to request an on-demand delivery of at least one second type SIB.

Example Embodiment 46

The wireless terminal of Example Embodiment 44, wherein the wireless terminal is configured to abort the ongoing reception procedure upon receiving the notification message.

Example Embodiment 47

The wireless terminal of Example Embodiment 44, wherein the wireless terminal is configured to abort the ongoing reception procedure at the next boundary.

Example Embodiment 48

A method in a wireless terminal which communicates over a radio interface with access nodes of a radio access network (RAN), the method comprising:
receiving first type system information from an access node, the first type system information including availability of second type system information blocks (SIBs) and an indication of a delivery mode for each available second type SIB, the delivery mode being either periodic broadcast or on-demand basis;
initiating a reception procedure comprising one or more attempts to receive on-demand basis second type SIBs;
while running the ongoing reception procedure receiving a notification message including at least one identity of first type SIBs, whose contents to be updated at the next boundary of repeating time periods configured by the access node;
aborting the reception procedure.

Example Embodiment 49

The method of Example Embodiment 48, further comprising prior to the reception process performing a request procedure comprising sending a request message to request an on-demand delivery of at least one second type SIB, and receiving an acknowledgement from the access node.

Example Embodiment 50

The method of Example Embodiment 48, further comprising aborting the ongoing reception procedure upon receiving the notification message.

Example Embodiment 51

The method of Example Embodiment 48, further comprising aborting the ongoing reception procedure at the next boundary.

Example Embodiment 52

An access node of a radio access network comprising:
transmitter circuitry configured to transmit first type system information and second type system information over a radio interface, the first type system information including availability of second type system information blocks (SIBs) and an indication of a delivery mode for each available second type SIB, the delivery mode being either periodic broadcast or on-demand basis;
processor circuitry configured to:
transmit a notification message including at least one identity of first type SIBs, whose contents to be updated at the next boundary of repeating time periods configured by the access node;
receive a message from the wireless terminal, the message requesting an on-demand delivery of at least one second type SIB;
schedule broadcast of the requested second type SIB(s) comprising one or more broadcast occasions.

Example Embodiment 53

The access node of Example Embodiment 52, wherein the access node is configured to defer the broadcast of the second type SIB(s) until the next boundary.

Example Embodiment 54

The access node of Example Embodiment 36, wherein at the boundary the delivery method of the second type SIB(s) changes from on-demand to periodic broadcast and the broadcasting of the second type SIB(s) starts after the next boundary.

Example Embodiment 55

The access node of Example Embodiment 36, wherein the access node is configured to start broadcasting the second type SIBs if receiving the message from the wireless terminal after the next boundary.

Example Embodiment 56

The access node of Example Embodiment 52, wherein the access node is configured to start the broadcast of the second type SIB(s) upon receipt the request message and stop the broadcast after the next boundary.

Example Embodiment 57

A method in an access node of a radio access network comprising:
transmitting first type system information and second type system information over a radio interface, the first type system information including availability of second type system information blocks (SIBs) and an indication of a delivery mode for each available second type SIB, the delivery mode being either periodic broadcast or on-demand basis;
transmitting a notification message including at least one identity of first type SIBs, whose contents to be updated at the next boundary of repeating time periods configured by the access node;
scheduling broadcast of the requested second type SIB(s) comprising one or more broadcast occasions.

Example Embodiment 58

The method of Example Embodiment 57, further comprising deferring the broadcast of the second type SIB(s) until the next boundary.

Example Embodiment 59

The method of Example Embodiment 41, further comprising at the boundary the delivery method of the second type SIB(s) changing from on-demand to periodic broadcast and the broadcasting of the second type SIB(s) starting after the next boundary.

Example Embodiment 60

The method of Example Embodiment 41, further comprising starting broadcasting the second type SIBs if receiving the message from the wireless terminal after the next boundary.

Example Embodiment 61

The method of Example Embodiment 57, further comprising starting the broadcast of the second type SIB(s) upon receipt the request message and stop the broadcast after the next boundary.

Example Embodiment 62

A wireless terminal comprising:
receiver circuitry configured to receive, from a base station apparatus, a first type system information (SI) block including scheduling information used for configuring SI window(s), the SI window(s) being periodic broadcast occasion(s) for corresponding one or more second type system information blocks (SIBs);
processor circuitry configured to determine the SI window(s) based on the scheduling information;
the receiver circuitry further configured to perform a reception procedure to attempt to receive at least one of the second type SIBs within the SI window(s) of a current modification period;
wherein in a case that the at least one of the second type SIBs is not received within the SI window(s), the receiver circuitry is configured to continue the reception procedure in the current modification period.

Example Embodiment 63

The wireless terminal of Example Embodiment 62, wherein the current modification period is one of plural modification periods configured by the base station apparatus, the plural modification periods being repeating time durations.

Example Embodiment 64

The wireless terminal of Example Embodiment 62, wherein the receiver circuitry is further configured to abort the reception procedure at a next modification period.

Example Embodiment 65

The wireless terminal of Example Embodiment 62, wherein the receiver circuitry is configured to continue the reception procedure in the current modification period, even if the receiver circuitry receives a notification message notifying a change in the content of the first type system information (SI) block or one or more of the second type system information blocks (SIBs).

Example Embodiment 66

A base station apparatus comprising:
processor circuitry configured to generate a first type system information (SI) block including scheduling information used for configuring SI window(s), the SI window(s) being periodic broadcast occasion(s) for corresponding one or more second type system information blocks (SIBs); wherein the SI window(s) of a current modification period are configured to enable a wireless terminal to attempt to receive at least one of the second type SIBs during a reception procedure performed by the wireless terminal, and in a case that the at least one of the second type SIBs is not received within one or more SI window(s), the reception procedure may be continued by the wireless terminal in the current modification period;
transmitter circuitry configured to transmit the first type system information (SI) block and the one more second type system information blocks (SIBs) to the wireless terminal.

Example Embodiment 67

The base station of Example Embodiment 66, wherein the current modification period is one of plural modification periods configured by the base station apparatus, the plural modification periods being repeating time durations.

Example Embodiment 68

A method in a wireless terminal comprising:
receiving, from a base station apparatus, a first type system information (SI) block including scheduling information used for configuring SI window(s), the SI window(s) being periodic broadcast occasion(s) for corresponding one or more second type system information blocks (SIBs);
determining the SI window(s) based on the scheduling information;
performing a reception procedure to attempt to receive at least one of the second type SIBs within the SI window(s) of a current modification period; and
in a case that the at least one of the second type SIBs is not received within the SI window(s), continuing the reception procedure in the current modification period.

Example Embodiment 69

The method of Example Embodiment 68, wherein the current modification period is one of plural modification periods configured by the base station apparatus, the plural modification periods being repeating time durations.

Example Embodiment 70

The method of Example Embodiment 68, further comprising aborting the reception procedure at the next modification period.

Example Embodiment 71

The method of Example Embodiment 68, wherein comprising continuing the reception procedure in the current modification period, even if receiving a notification message notifying a change in the content of the first type SI block or the second type SIBs.

Example Embodiment 72

A method for a base station apparatus comprising;
transmitting, to a wireless terminal, a first type system information (SI) block including scheduling information used for configuring SI window(s), the SI window(s) being periodic broadcast occasion(s) for corresponding one or more second type system information blocks (SIBs); wherein
the SI window(s) is determined, by the wireless terminal, based on the scheduling information;
a reception procedure to attempt to receive at least one of the second type SIBs within the SI window(s) of a current modification period is performed by the wireless terminal; and in a case that the at least one of the second type SIBs is not received within the SI window(s), the reception procedure is continued, by the wireless terminal, in the current modification period.

Example Embodiment 73

The method of Example Embodiment 72, wherein the current modification period is one of plural modification periods configured by the base station apparatus, the plural modification periods being repeating time durations.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wireless terminal comprising:
    receiver circuitry configured to receive, from a base station apparatus, in a modification period, a first type system information (SI) block including scheduling information associated with a specific second type system information block (SIB), the scheduling information being used for configuring one or more SI window(s) of the modification period, the one or more SI window(s) being periodic broadcast occasion(s) for the specific second type SIB;
    processor circuitry configured to determine the one or more SI window(s) based on the scheduling information;
    the receiver circuitry further configured to perform a reception procedure to attempt to receive the specific second type SIB within the one or more SI window(s) of the modification period;
    wherein the reception procedure:
        ends in a case that the specific second type SIB is successfully received, and continues until an end of the modification period in a case that the specific second type SIB is not received within any of the one or more SI window(s) of the modification period.

2. The wireless terminal of claim 1, wherein the modification period is one of plural modification periods configured by the base station apparatus, the plural modification periods being repeating time durations.

3. The wireless terminal of claim 1, wherein the receiver circuitry is further configured to abort the reception procedure at a next modification period right after the modification period.

4. The wireless terminal of claim 1, wherein the receiver circuitry is configured to continue the reception procedure in the modification period, even if the receiver circuitry receives a notification message notifying a change in content of the first type SI block or the specific second type SIB.

5. A base station apparatus comprising:
processor circuitry configured to generate a first type system information (SI) block including scheduling information associated with a specific second type system information block (SIB), the scheduling information being used for configuring one or more SI window(s) of a modification period, the one or more SI window(s) being periodic broadcast occasion(s) for the specific second type SIB;
transmitter circuitry configured to transmit, to a wireless terminal, in the modification period, the first type SI block and the specific second type SIB;
wherein the one or more SI window(s) of the modification period is configured to enable the wireless terminal to attempt to receive the specific second type SIB during a reception procedure;
wherein the reception procedure:
ends in a case that the specific second type SIB is successfully received, and
continues until an end of the modification period in a case that the specific second type SIB is not received within any of the one or more SI window(s) of the modification period.

6. The base station of claim 5, wherein the modification period is one of plural modification periods configured by the base station apparatus, the plural modification periods being repeating time durations.

7. A method in a wireless terminal comprising:
receiving, from a base station apparatus, in a modification period, a first type system information (SI) block including scheduling information associated with a specific second type system information block (SIB), the scheduling information being used for configuring one or more SI window(s) of the modification period, the one or more SI window(s) being periodic broadcast occasion(s) for the specific second type SIB;
determining the one or more SI window(s) based on the scheduling information;
performing a reception procedure to attempt to receive the specific second type SIB within the one or more SI window(s) of the modification period; and
wherein the reception procedure:
ends in a case that the specific second type SIB is successfully received, and
continues until an end of the modification period in a case that the specific second type SIB is not received within any of the one or more SI window(s) of the modification period.

8. The method of claim 7, wherein the modification period is one of plural modification periods configured by the base station apparatus, the plural modification periods being repeating time durations.

9. The method of claim 7, further comprising aborting the reception procedure at a next modification period right after the modification period.

10. The method of claim 7, further comprising continuing the reception procedure in the modification period, even if receiving a notification message notifying a change in the content of the first type SI block or the specific second type SIB.

11. A method for a base station apparatus comprising:
generating a first type system information (SI) block including scheduling information associated with a specific second type system information block (SIB), the scheduling information being used for configuring one or more SI window(s) of a modification period, the one or more SI window(s) being periodic broadcast occasion(s) for the specific second type SIB;
transmitting, to a wireless terminal, in the modification period, the first type SI block and the specific second type SIB; wherein
the one or more SI window(s) of the modification period is configured to enable the wireless terminal to attempt to receive the specific second type SIB during a reception procedure;
wherein the reception procedure:
ends in a case that the specific second type SIB is successfully received, and
continues until an end of the modification period in a case that the specific second type SIB is not received within any of the one or more SI window(s) of the modification period.

12. The method of claim 11, wherein the modification period is one of plural modification periods configured by the base station apparatus, the plural modification periods being repeating time durations.

* * * * *